SUB-GROUP 21 (100 LINES)
2100—2199
INWARD MARKING GATES

INVENTOR
LIONEL R.F. HARRIS
by Hall & Houghton
Attorney

INVENTOR
LIONEL R. F. HARRIS
by Hall & Houghton
Attorney.

SUB GROUP 21 (100 LINES)
2100 – 2199
OUTWARD MARKING GATES

INVENTOR
LIONEL R. F. HARRIS
by Hall & Houghton
Attorney

INVENTOR
LIONEL R.F. HARRIS
by Hall & Houghton
Attorney.

TIME DIVISION MULTIPLEX COMMUNICATION SYSTEMS

Filed Oct. 23, 1961

55 Sheets-Sheet 5

INVENTOR,
LIONEL R.F. HARRIS.
by Hall & Houghton
Attorney.

TIME DIVISION MULTIPLEX COMMUNICATION SYSTEMS

Filed Oct. 23, 1961

55 Sheets-Sheet 6

INVENTOR,
LIONEL R. F. HARRIS
by Hall & Houghton, Attorney.

INVENTOR.
LIONEL R. F. HARRIS
by Hall & Houghton Attorney.

INVENTOR
LIONEL R.F. HARRIS
by Hall & Houghton
Attorney.

INVENTOR
LIONEL R. F. HARRIS
by Hall & Houghton
Attorney

Aug. 10, 1965 L. R. F. HARRIS 3,200,202

TIME DIVISION MULTIPLEX COMMUNICATION SYSTEMS

Filed Oct. 23, 1961 55 Sheets-Sheet 10

INVENTOR
LIONEL R. F. HARRIS
by Hall & Houghton
Attorney.

INVENTOR.
LIONEL R.F. HARRIS,
by
Attorney.

INVENTOR
LIONEL R.F. HARRIS
by Hall & Houghton
Attorney

INVENTOR
LIONEL R.F. HARRIS
by Hall & Houghton
Attorney

Aug. 10, 1965 L. R. F. HARRIS 3,200,202

TIME DIVISION MULTIPLEX COMMUNICATION SYSTEMS

Filed Oct. 23, 1961

55 Sheets-Sheet 14

INVENTOR
LIONEL R.F. HARRIS
by Hall & Houghton
Attorney

INVENTOR,
LIONEL R.F. HARRIS
by Hall & Houghton
Attorney

INVENTOR
LIONEL R. F. HARRIS
by Hall & Houghton
Attorney

INVENTOR
LIONEL R.F. HARRIS.
by Hall & Houghton
Attorney.

Aug. 10, 1965 L. R. F. HARRIS 3,200,202

TIME DIVISION MULTIPLEX COMMUNICATION SYSTEMS

Filed Oct. 23, 1961

55 Sheets-Sheet 18

INVENTOR
LIONEL R.F. HARRIS
by Hall & Houghton
Attorney.

INVENTOR
LIONEL R.F. HARRIS
by Hall & Houghton
Attorney.

INVENTOR,
LIONEL R.F. HARRIS
by Hall & Houghton
Attorney

INVENTOR
LIONEL R.F. HARRIS
by Hall & Houghton
Attorney

INVENTOR
LIONEL R.F. HARRIS
by Hall & Houghton
Attorney

INVENTOR
LIONEL R.F. HARRIS
by Hall & Houghton
Attorney

Aug. 10, 1965 L. R. F. HARRIS 3,200,202

TIME DIVISION MULTIPLEX COMMUNICATION SYSTEMS

Filed Oct. 23, 1961 55 Sheets-Sheet 24

INVENTOR
LIONEL R. F. HARRIS
by Hall — [signature]
Attorney

INVENTOR
LIONEL R.F. HARRIS
by Hall + Houghton
Attorney

INVENTOR
LIONEL R.F. HARRIS
by Hall & Houghton
Attorney

INVENTOR
LIONEL R.F. HARRIS
by Hall & Houghton
Attorney.

INVENTOR
LIONEL R. F. HARRIS
by Hall & Houghton
Attorney.

INVENTOR
LIONEL R. F. HARRIS
by Hall & Houghton
Attorney.

INVENTOR
LIONEL R.F. HARRIS
by Hall & Houghton
Attorney.

INVENTOR
LIONEL R. F. HARRIS
by Hall & Houghton
Attorney

INVENTOR
LIONEL R.F. HARRIS
by Hall & Houghton
Attorney.

Inventor
Lionel R. F. Harris
by Hall & Houghton
Attorney

INVENTOR
LIONEL R. F. HARRIS
by Hall & Houghton
Attorney

Inventor
Lionel R. F. Harris,
by Hall & Houghton
Attorney.

Inventor
Lionel R. F. Harris
by Hall & Houghton
Attorney.

Inventor
Lionel R. F. Harris
by Hall & Houghton
Attorney

INVENTOR
LIONEL R. F. HARRIS,
by Hall & Houghton
Attorney.

INVENTOR
LIONEL R. F. HARRIS
by Hall & Houghton
Attorney

Aug. 10, 1965 L. R. F. HARRIS 3,200,202

TIME DIVISION MULTIPLEX COMMUNICATION SYSTEMS

Filed Oct. 23, 1961 55 Sheets-Sheet 40

INVENTOR
LIONEL R. F. HARRIS
by Hall & Houghton
Attorney

INVENTOR.
LIONEL R. F. HARRIS
by Hall & Houghton
Attorney

INVENTOR
LIONEL R. F. HARRIS
by Hall & Houghton
Attorney.

INVENTOR
LIONEL R.F. HARRIS
by Hall & Houghton
Attorney.

Aug. 10, 1965 L. R. F. HARRIS 3,200,202

TIME DIVISION MULTIPLEX COMMUNICATION SYSTEMS

Filed Oct. 23, 1961 55 Sheets-Sheet 44

INVENTOR
LIONEL R.F. HARRIS
by Hall & Houghton
Attorney.

Aug. 10, 1965 L. R. F. HARRIS 3,200,202

TIME DIVISION MULTIPLEX COMMUNICATION SYSTEMS

Filed Oct. 23, 1961 55 Sheets-Sheet 45

INVENTOR
LIONEL R.F. HARRIS
by Hall & Houghton
Attorney

INVENTOR
LIONEL R. F. HARRIS
by Hall & Houghton
Attorney

Aug. 10, 1965 L. R. F. HARRIS 3,200,202

TIME DIVISION MULTIPLEX COMMUNICATION SYSTEMS

Filed Oct. 23, 1961 55 Sheets-Sheet 47

INVENTOR
LIONEL R. F. HARRIS,
by Hall & Houghton
Attorney.

INVENTOR.
LIONEL R. F. HARRIS
by Hall & Houghton
Attorney

INVENTOR
LIONEL R. F. HARRIS
by Hall & Houghton
Attorney

INVENTOR
LIONEL R. F. HARRIS
by Hall & Haughton
Attorney

INVENTOR
LIONEL R. F. HARRIS
by Hall & Houghton
Attorney

INVENTOR,
LIONEL R. F. HARRIS
by Hall & Houghton
Attorney.

INVENTOR
LIONEL R.F. HARRIS
by Hall + Houghton
Attorney.

INVENTOR
LIONEL R.F. HARRIS
by Hall & Houghton
Attorney.

| | | | | | | | |
|---|---|---|---|---|---|---|---|
| FIG.24. | FIG.25. | FIG.26. | FIG.27. | FIG.28. | FIG.29. | FIG.30. | FIG.31. |
| FIG.32. | FIG.33. | FIG.34. | FIG.35. | FIG.36. | FIG.37. | FIG.38. | FIG.39. |
| FIG.40. | FIG.41. | FIG.42. | FIG.43. | FIG.44. | FIG.45. | FIG.46. | FIG.47. |
| FIG.48. | FIG.49. | FIG.50. | FIG.51. | FIG.52. | FIG.53. | FIG.54. | FIG.55. |

FIG. 56.

INVENTOR
LIONEL R.F. HARRIS
by Hall & Houghton
Attorney

United States Patent Office 3,200,202
Patented Aug. 10, 1965

3,200,202

TIME DIVISION MULTIPLEX COMMUNICATION SYSTEMS

Lionel Roy Frank Harris, Kenton, England, assignor to Her Majesty's Postmaster General, London, England Filed Oct. 23, 1961, Ser. No. 146,916
Claims priority, application Great Britain, Oct. 27, 1960, 37,004/60
16 Claims. (Cl. 179—18)

Figure 1:
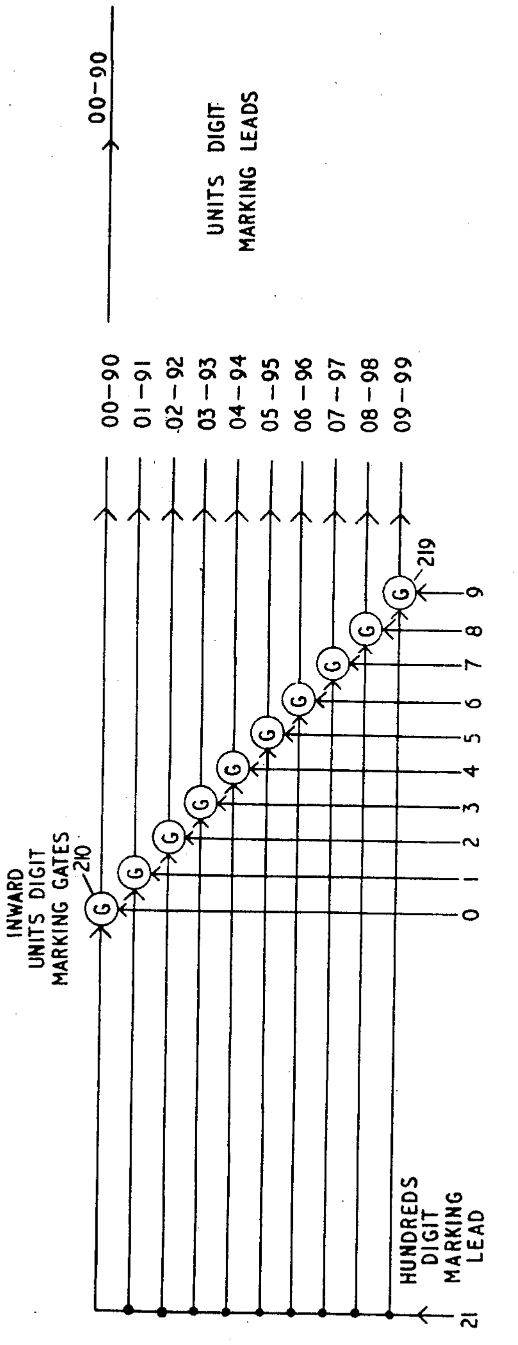

This invention relates to time division multiplex communication systems and has particular although not exclusive reference to telephone exchanges operating on the time division multiplex principle.

In this specification, the term "line" is intended to include not only subscribers where the system is a telephone exchange but also other forms of connection from other communication systems.

In a communication system embodying the invention communication between two lines is set up via channels provided by one of a number of time division multiplex bothway transmisison means hereinafter referred to as "cords." Each cord may comprise a GO communication path and a RETURN communication path. The cords may be so arranged that any one can be taken into use for communication between any two lines.

Each cord has associated with it a storage system which stores information concerning the calling and called lines between which communication is to be established. Thus, there is provided a plurality of storage sytems all of which may be available to every connection to be set up.

Information concerning the identity of both calling and called lines is stored in the storage system of a cord, for example, using one pulse time for the calling line identity and another pulse time for the called line identity.

In a particular embodiment of the invention lines are allocated directory numbers on the basis of a four-digit numbering scheme and in that case each thousand lines with the same thousand digit constitutes what is hereinafter referred to as a "block." With 1000 line blocks, the storage systems of the cords have separate stores for the thousands, hundreds, tens and units digits. The identity of a line is stored by storing a pulse at the one pulse time in a combination of storage devices for each digit.

Communication inwards to the communication system and outwards from the latter is provided by alternate channels of the time division multiplex channels available in the cord so that if each cord has 100 time spaced communication channels, it can provided a maximum of 50 bothway connections. In practice, only 49 bothway connections are available because the remaining pair of channels is used for operation purposes within the system. The identity of the calling line may be stored in the storage system of a cord at the time of one of the channels and that of the called line at the time of another channel.

The lines are scanned continually under the control of a cord in order to determine whether a line is calling for connection and where the lines are divided into blocks as described above, a different cord is associated with each block, all blocks being scanned together. Scanning may be achieved by using one of the channel pulse trains of the remaining channel pair mentioned above and may be effected by storing a pulse of the pulse train of the channel in the storage system of the appropriate cord in the combination of storage devices representing a particular line and then changing the combination at each occurrence of the pulse to progress the scan.

Where the lines are divided into blocks which are scanned together, means may be provided for establishing an order of precedence of connection in the event that corresponding lines in each block are found simultaneously to be in a calling condition. One line is selected according to the prearranged order of precedence, the remaining calling line or lines being locked out whilst the selected calling line is dealt with, the scan continuing meanwhile but further calling lines being ignored. After the selected calling line has been dealt with, and regardless of the point reached by the scan the next, in precedence, of the locked out calling lines is dealt with, and so on. Information concerning a calling line is made available at the same time instant as the line scan.

Information concerning a called line stored in the storage system of a cord is used to set up the connection and this may be achieved in stages, information concerning a stage being transmitted to that stage through previous stages already set up.

A separate multiplex path may be provided for the signalling of information concerning lines. For example, an N.U. tone multiplex may be provided with provision for marking by means of straps or other suitable means any line or number of lines as N.U.

Figure 19:
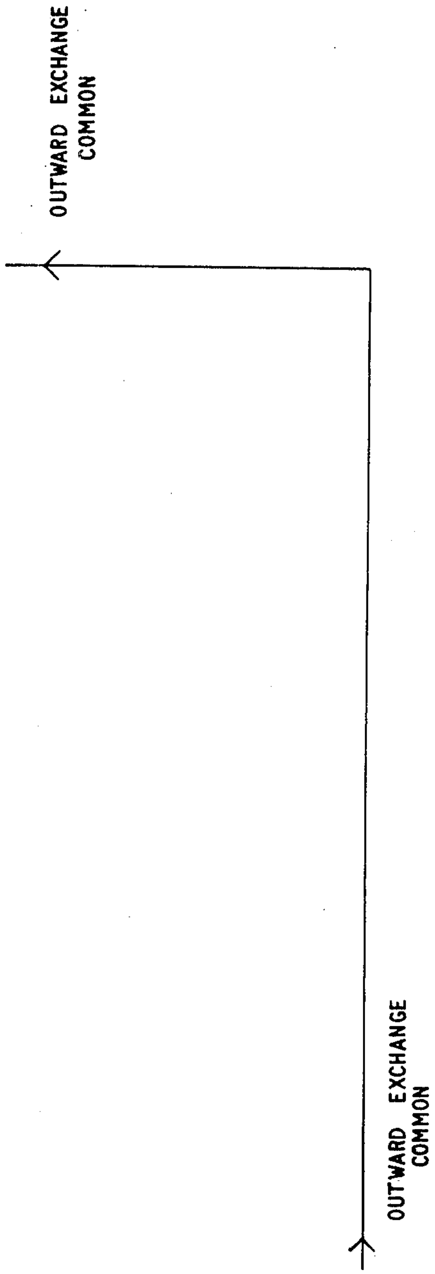
Figure 20:
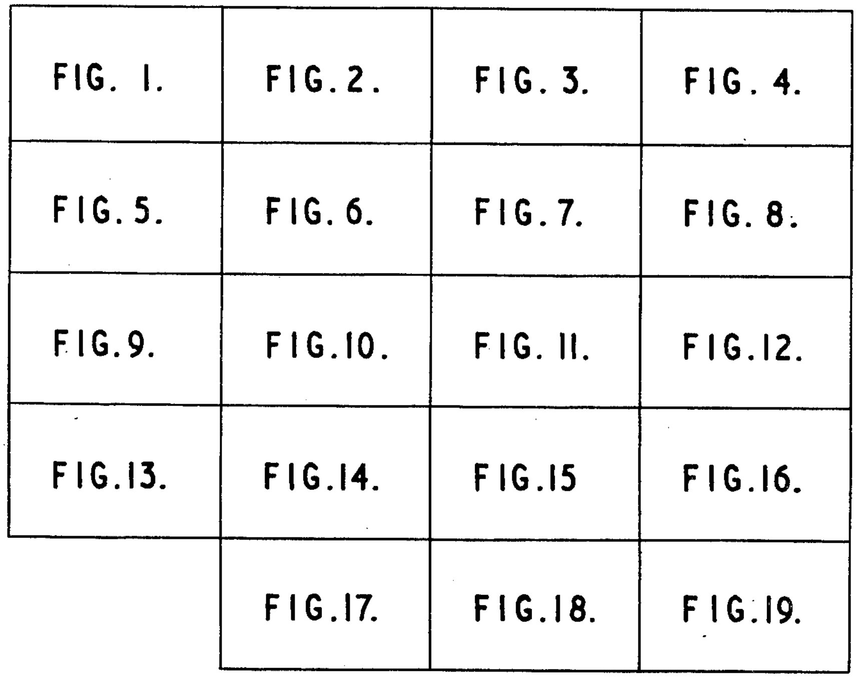
Figure 21:
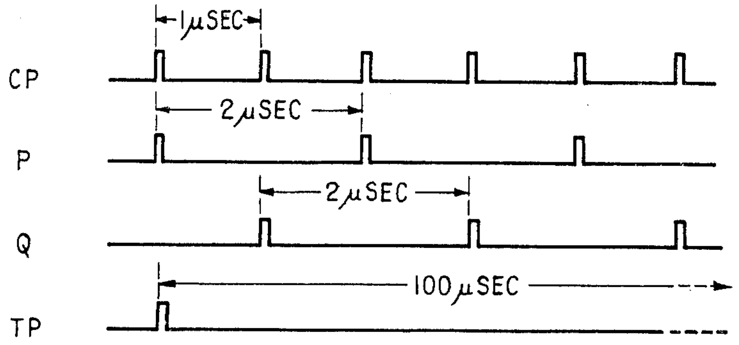
Figure 22:
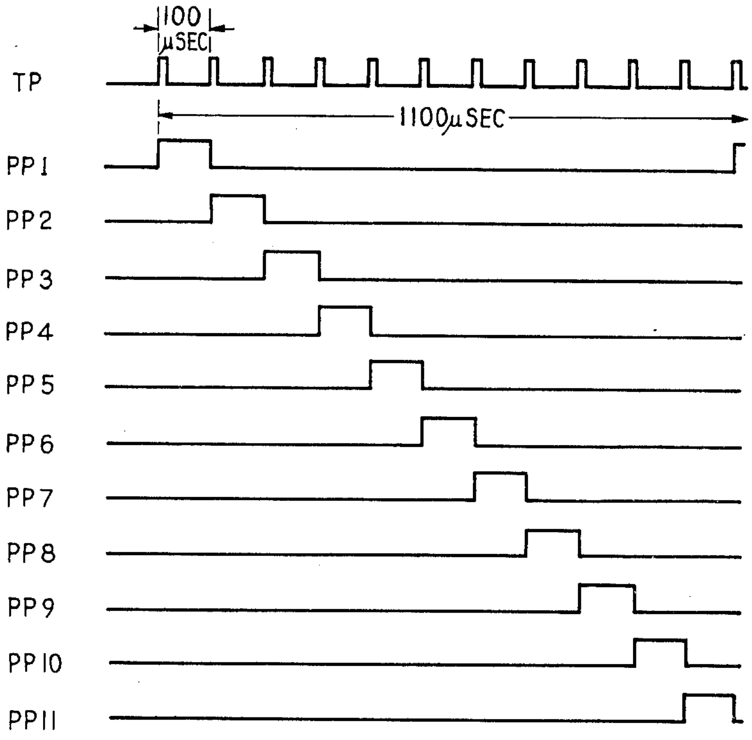
Figure 23:
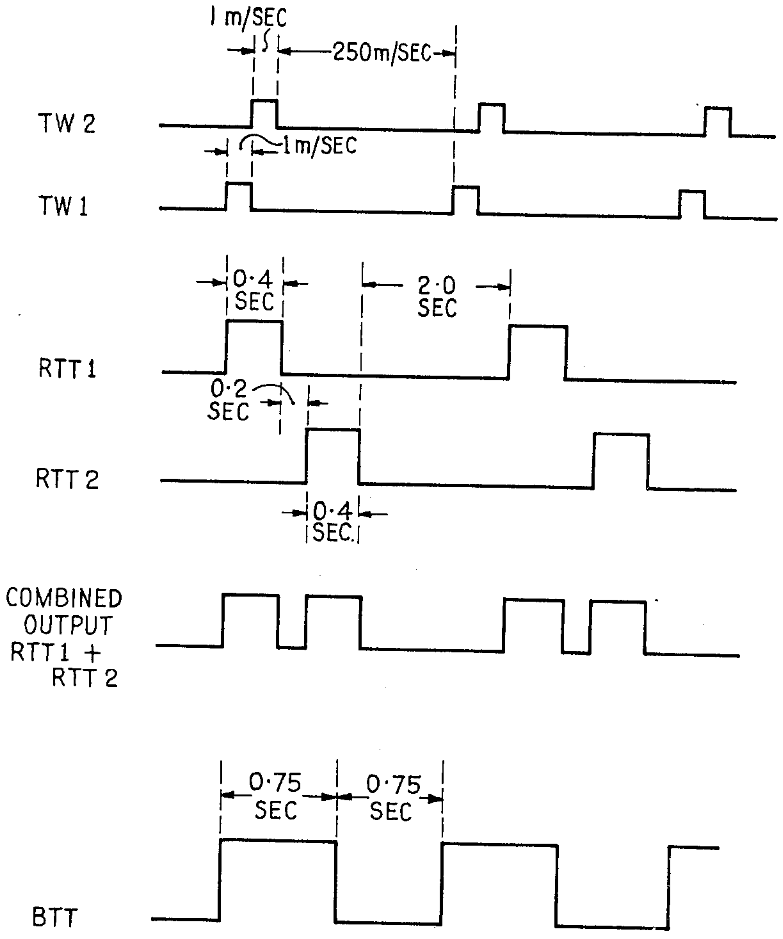

A specific embodiment of a time division multiplex telephone exchange system according to the invention will now be described with reference to the accompanying drawings of which:

FIGS. 1–19 arranged as shown in FIG. 20 show a simplified trunking layout of the embodiment, FIGS. 21–23 show the waveform of pulse trains used in the embodiment, and, FIGS. 24–55 arranged as shown in FIG. 56 show the embodiment in logical form.

GENERAL DESCRIPTION OF FEATURES OF THE EMBODIMENT

An exchange of 3,000 lines is described but no restriction on the number of lines, either more or less, is implied. Any line can communicate with any other either as a calling or a called line, but the transmission paths followed between the two lines will be somewhat different depending on which of the two parties originated the call. The 3,000 lines are divided into three blocks of 1,000 lines each, and each block is sub-divided into two 500 line groups. Each group is then divided into five subgroups of 100 lines each and each sub-group further divided into ten decades of lines.

The numbering scheme arbitrarily chosen is 2,000–4,999, the three blocks being designated by the thousand digit 2, 3 and 4 and for each line the directory and equipment numbers are the same.

A number of cords common to the exchange are provided on the basis of the amount of traffic, five cords normally being adequate for 3,000 lines, and any of the 3,000 lines has access to any of the cords, a connection between any two lines being made via a cord in conjunction with equipment common to the exchange. Each cord has a storage capacity for one hundred equally time spaced channels having a repetition frequency of 10 kc./s.

Alternate channels known as P and Q-phase are used for speech inward to the exchange and for speech outward from the exchange respectively, so that a cord has a capacity of 50 bothway connections, but in fact only 49 of these are available for connecting lines together as one pair of channels is used as test pulses for operation purposes within the exchange.

The lines are continually scanned in order to determine whether or not a line is calling for connection, each block of 1,000 lines being scanned simultaneously, a different cord being associated with each block for this purpose. Scanning is carried out by storing the test pulse in the cord in a combination of storage devices characterising a line and changing the combination at each test pulse in order to progress the scan. When a line is found to be calling for connection, the exchange common equipment selects a free channel and then a cord in which that channel is free. These are known as the initial selected channel and initial selected cord respectively.

The number of the calling line is then stored in the initial selected cord at P-phase of the initial selected channel and the cord provides dial tone. Dialled digits received from the calling line are then registered at the initial selected channel time in the exchange common equipment which operates on a time division basis, and the number of the called line is then stored in the initial selected cord at Q-phase of the initial selected channel.

The initial selected channel however may not be free for use with the called line and therefore another selection is made for a channel free for both the calling and called lines and for a cord in which this channel is free. These are known as the final selected channel and final selected cord.

The called line is now tested for free or busy condition and if found to be free the final selected channel is stored in the final selected cord at P-phase for the calling line and at Q-phase for the called line, the initial selected channel being released and the cord providing call tone to the called line and ring tone to the calling line. If the called line answers, the cord removes line-split condition and provides the through connection. If the called line tests busy or under the condition of not finding a free final channel, busy tone is returned to the calling line from the initial selected cord at the initial selected channel time.

Number unobtainable tone is also provided by the cord when such conditions apply.

Clearing is under the control of the calling line and is carried out by a cord in conjunction with the exchange common equipment.

TRUNKING—FIGS. 1–19

Line number 2100 is taken as a typical line for purposes of explanation.

Figure 2:
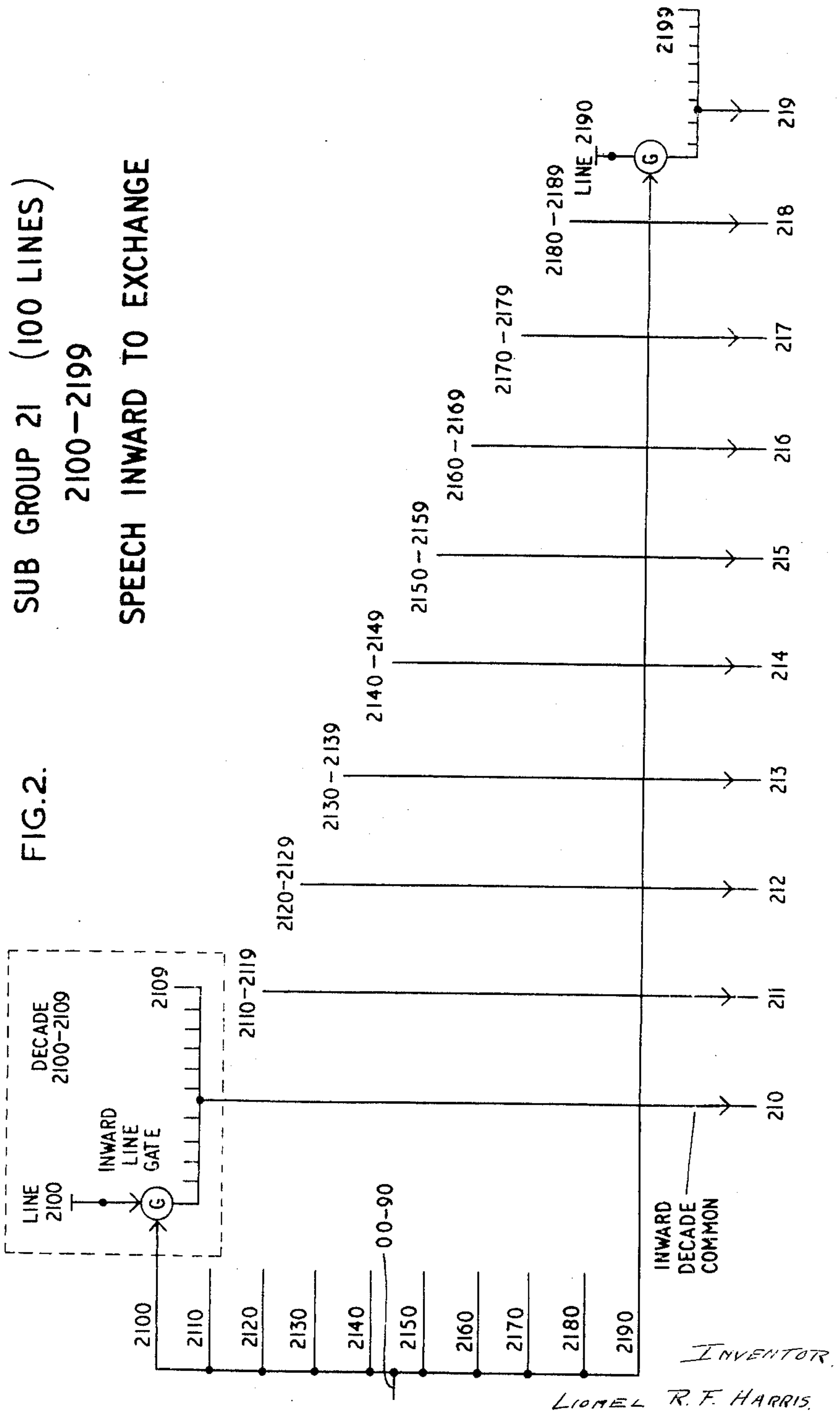
Figure 4:
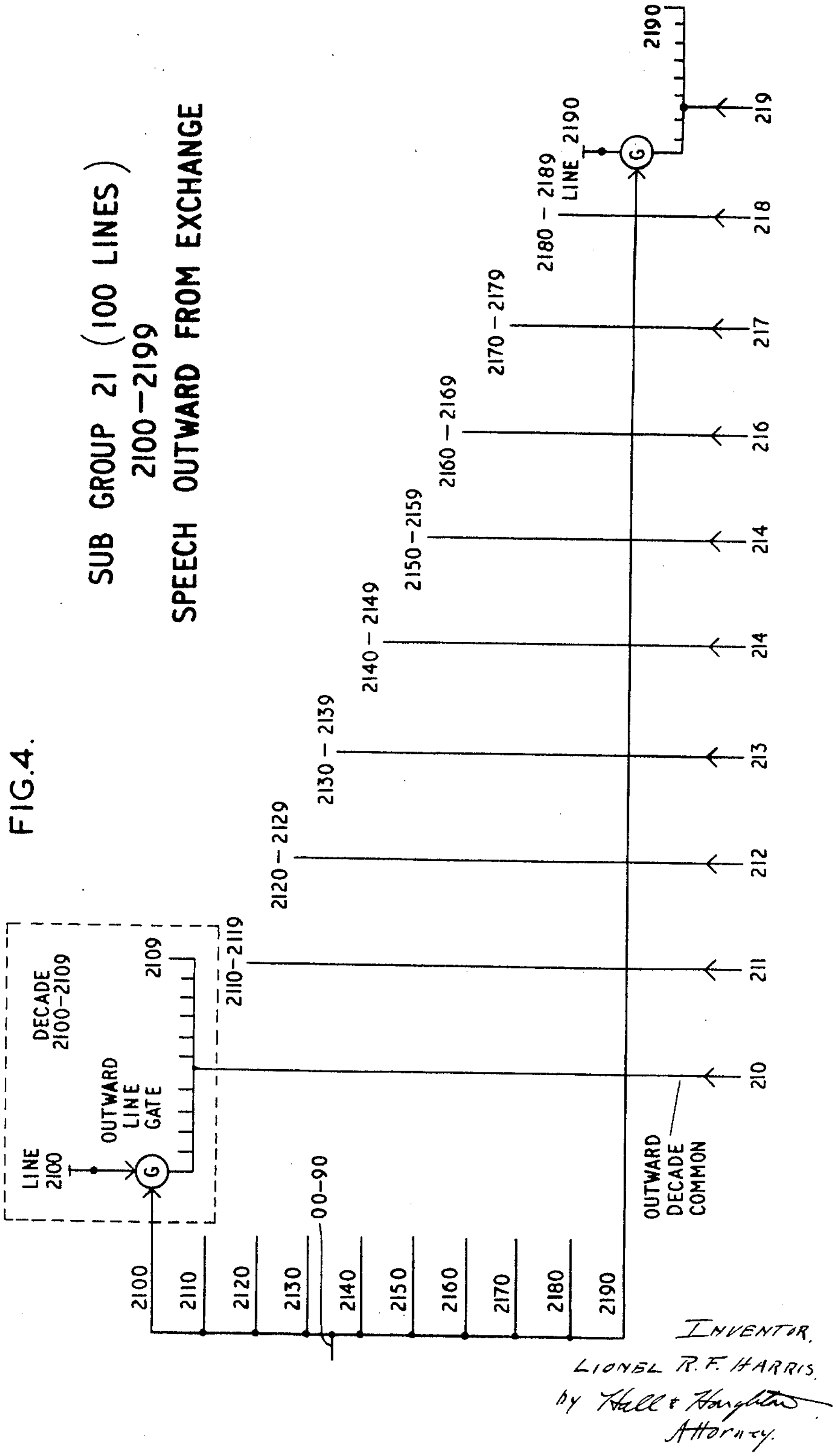
Figure 5:
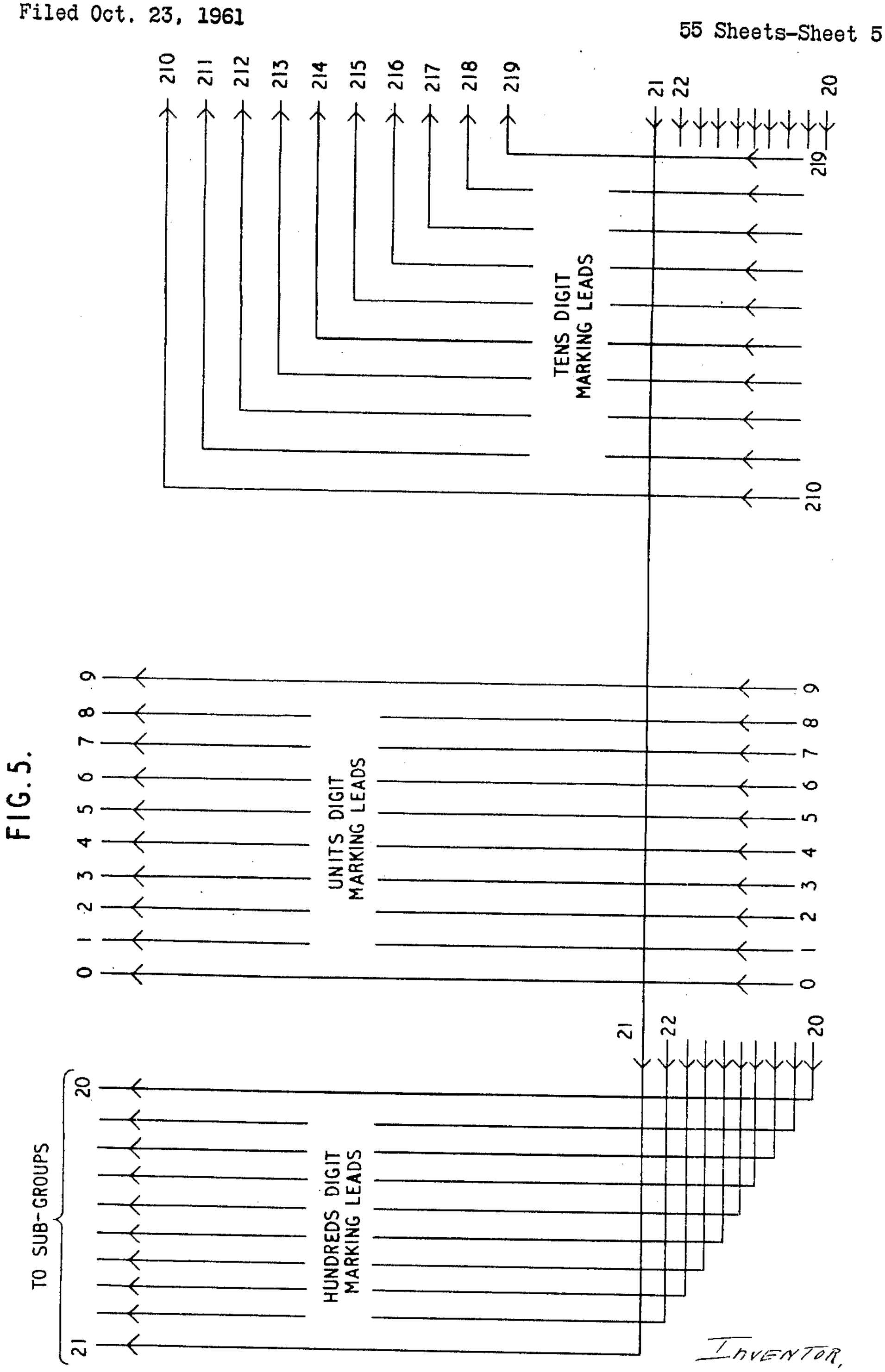

Each line is terminated in the exchange on a hybrid connection not shown after which there are separate speech paths into and out of the exchange. The path from the line into the exchange is known as inward, FIG. 2, and the path from the exchange to the line is known as outward, FIG. 4. The lines are commoned in decades such as 2100–2109, 2110–2119, etc. FIGS. 2 and 4, and these decades are commoned into sub-groups of 10 decades each, making 100 lines, such as sub-group 21 (2100–2199), FIGS. 2 and 4.

Figure 10:
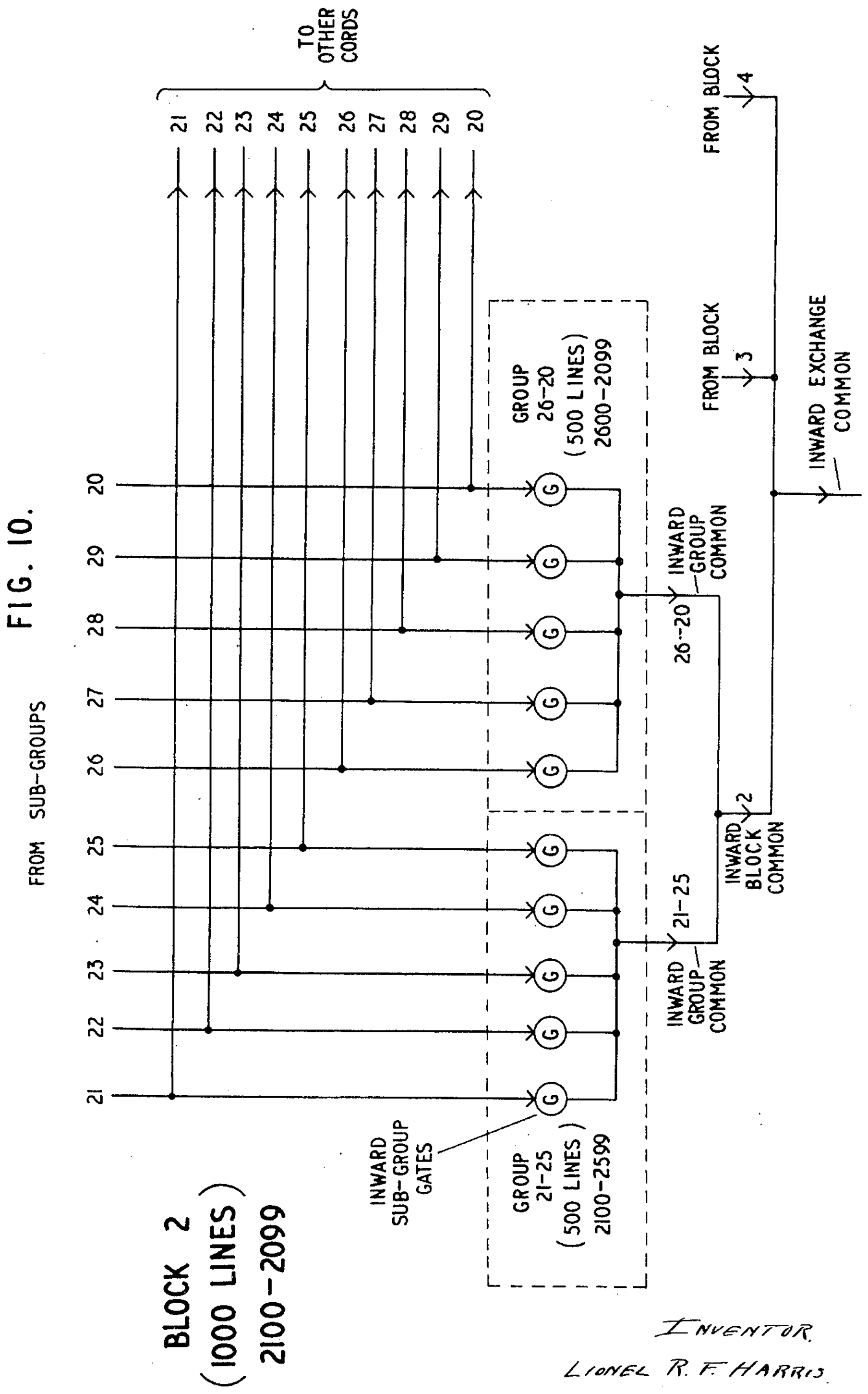

The inward sub-group common of each of the sub-groups is connected to each of the cords via an inward sub-group gate individual to each of the cords and the inward sub-group commons of the sub-groups are commoned in fives to form groups of 500 lines such as group 21–25 (2100–2599) and group 26–20 (2600–2099), FIG. 10. A similar arrangement applies for the outward sub-group common, FIG. 12. Each two groups is then commoned to form a block of 1,000 lines such as block 2100–2099, FIGS. 10 and 12, and a similar arrangement applies in respect of the thousand line blocks 3100–3099 and 4100–4099.

Figure 18:
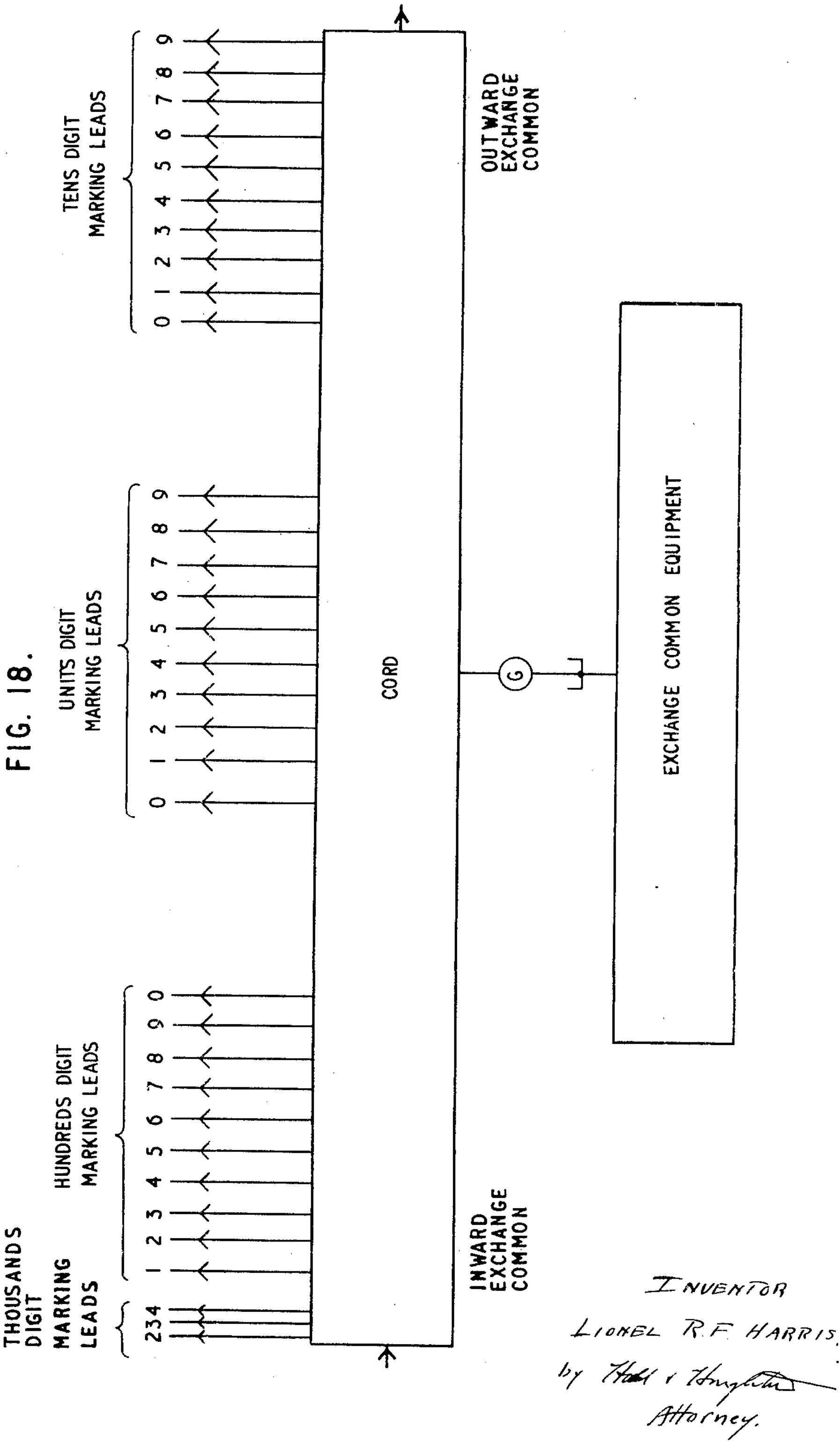

The three blocks are then commoned and connected to a cord and each cord is connected via a gate to the exchange common equipment, FIG. 18.

Figure 6:
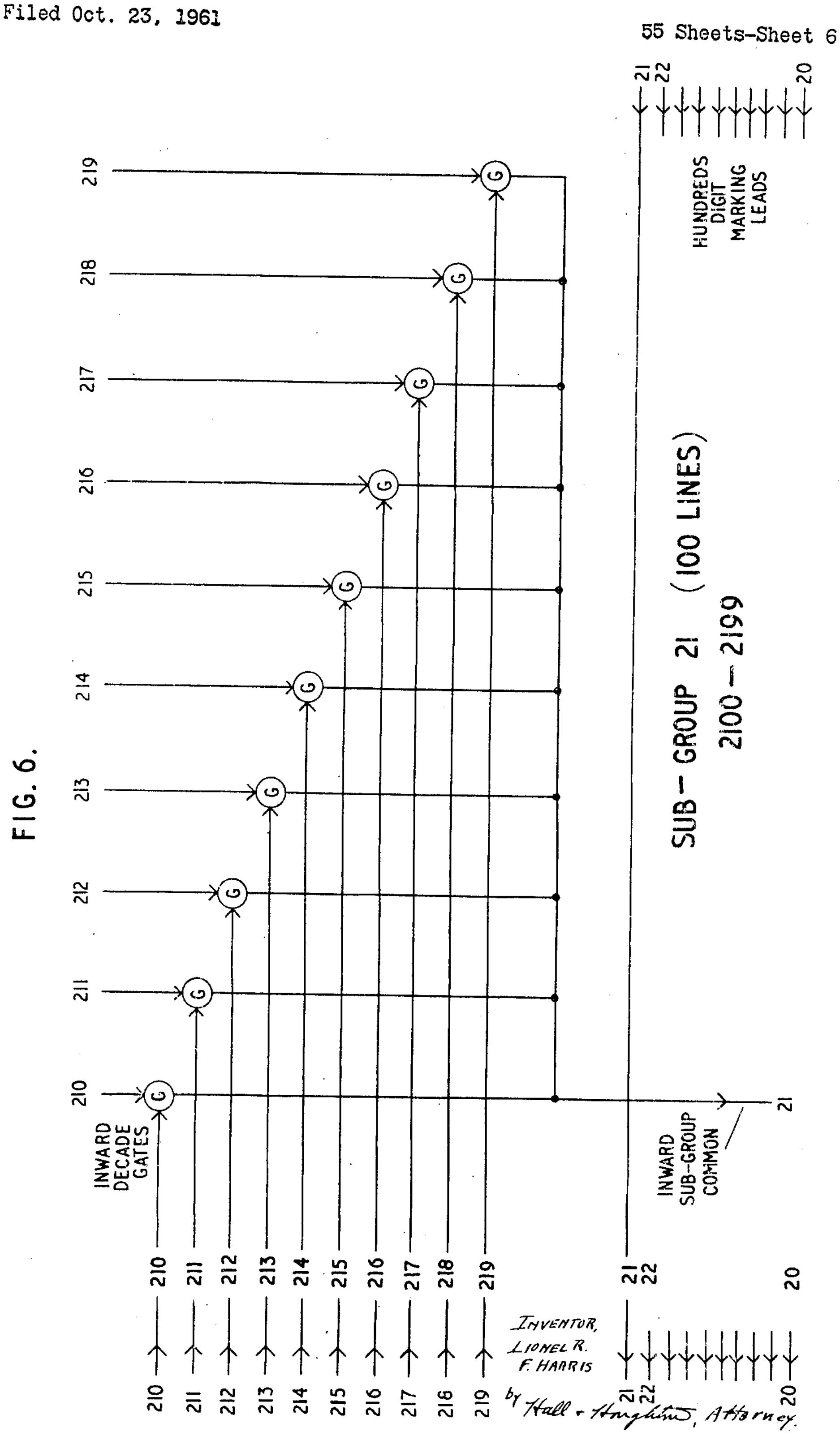
Figure 7:
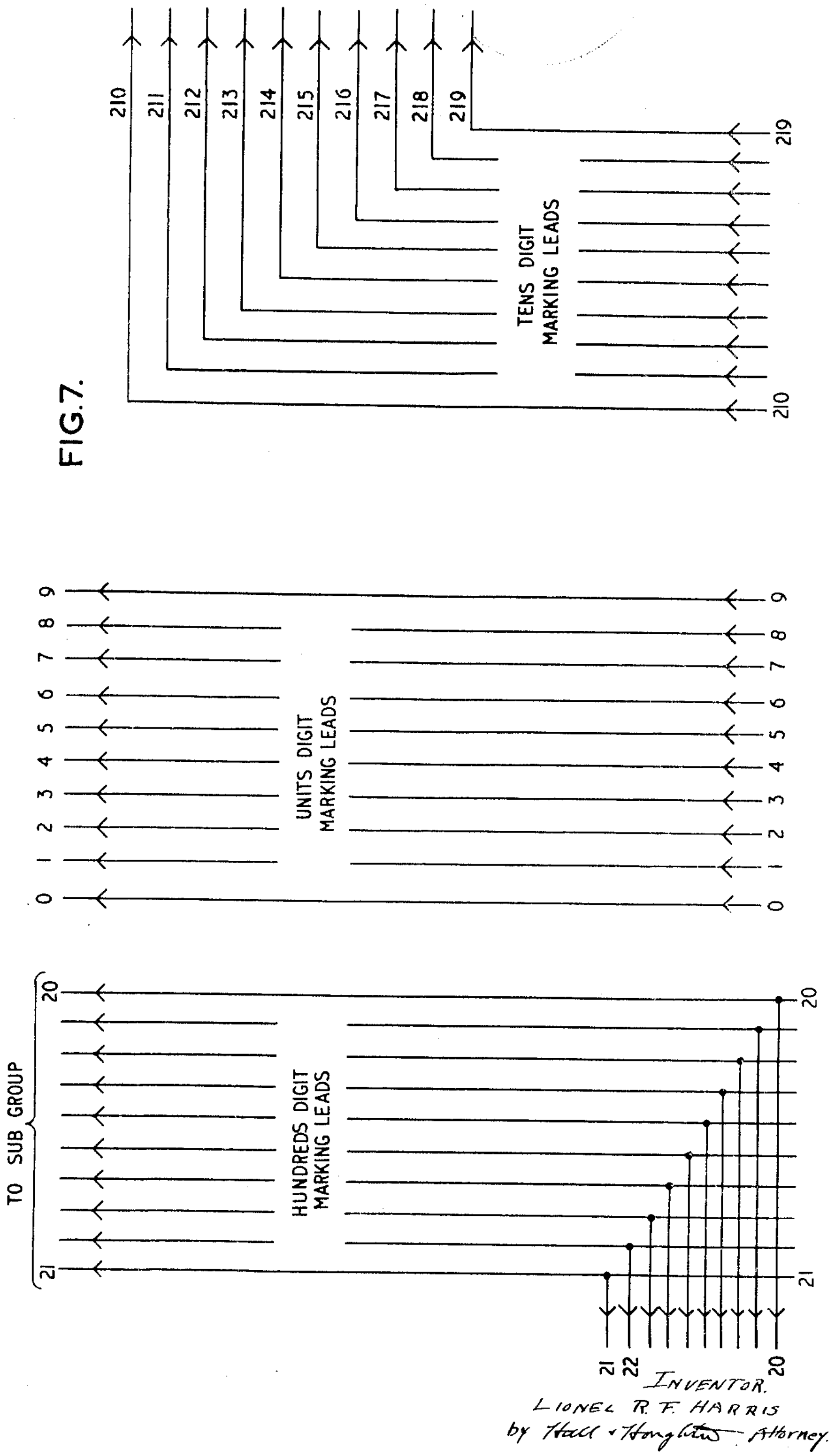

An inward speech connection (from line to cord) progresses from a line, say 2100, FIG. 2, through its own inward line gate to the inward decade common 210 (from 10 leads) through the inward decade gate, FIG. 6 (10 per sub-group), to the inward sub-group common 21 (from 10 leads).

The inward sub-group common 21 is connected to an inward sub-group gate for each cord, FIG. 10, the output of such a gate being connected to the inward group common 21–25 (from 5 leads).

The inward group common for groups 21–25 is connected with its partner inward group common for groups 26–20 to the inward block common (from 10 leads) for the 2 block.

Figure 14:
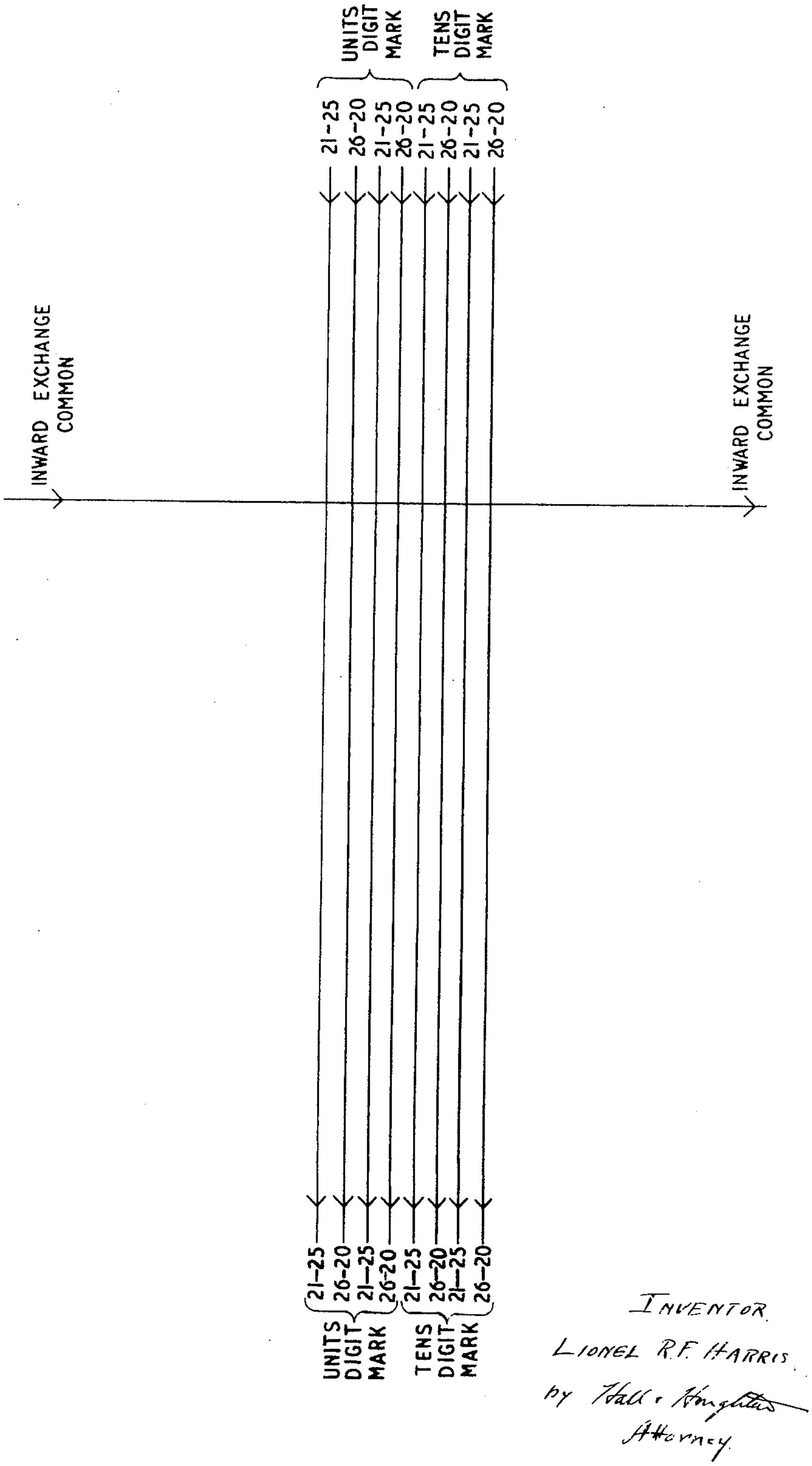
Figure 17:
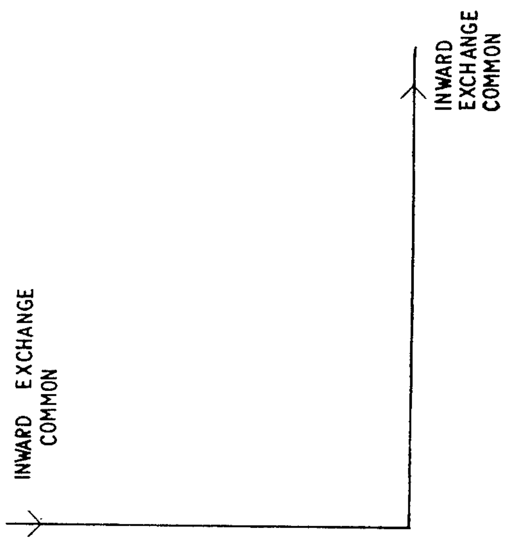

The inward block common, FIG. 10, for the 2 block is then connected with the inward block commons for the 3 and 4 blocks to the inward exchange common, FIG. 14 (from 30 leads to the cord), FIGS. 17 and 18.

Figure 12:
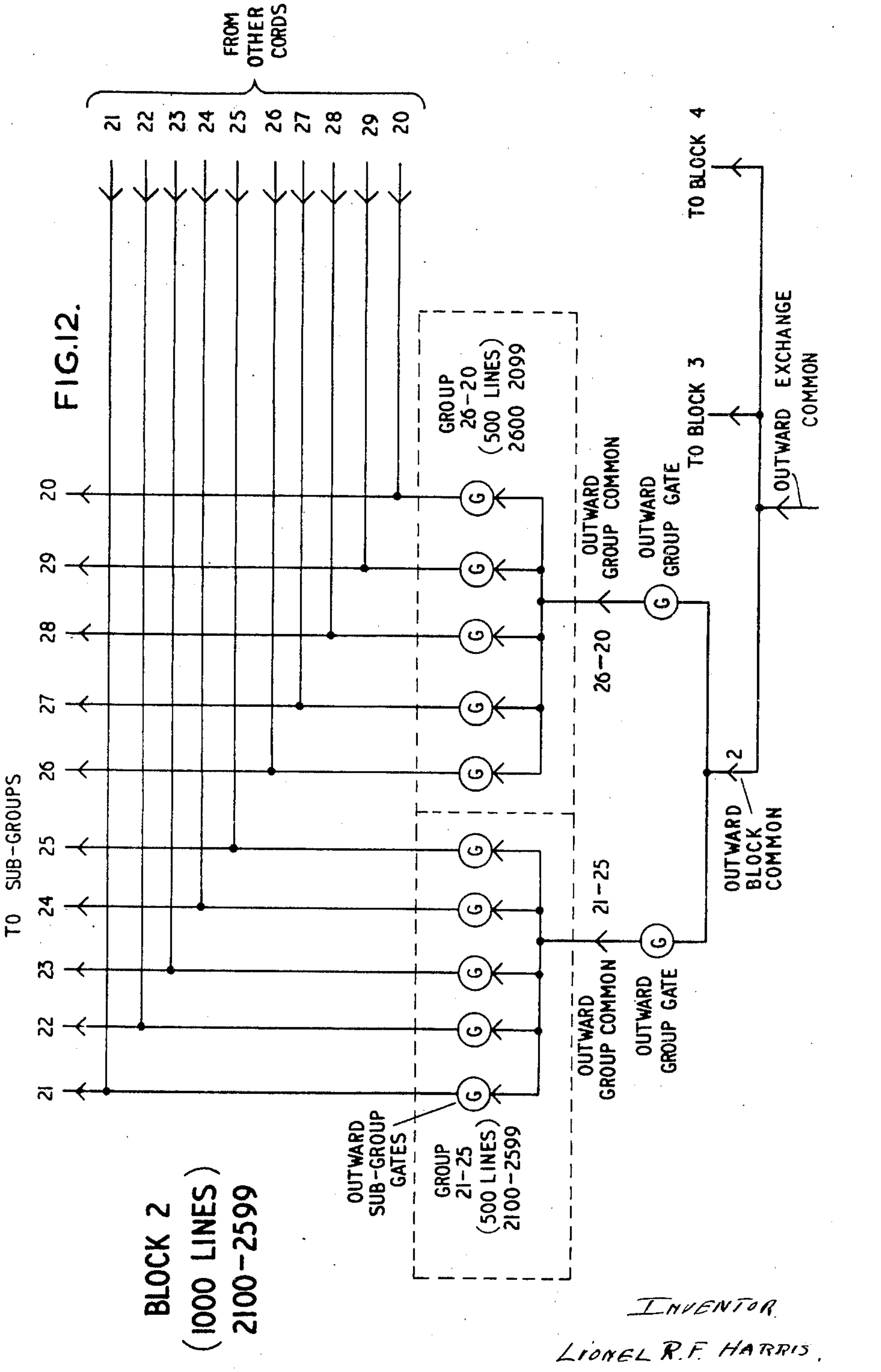
Figure 13:
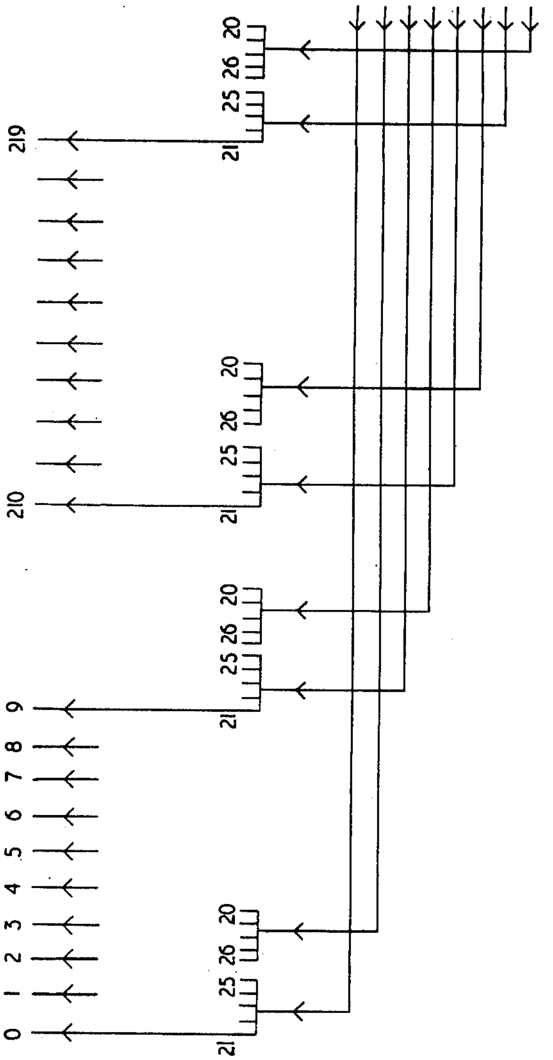
Figure 16:
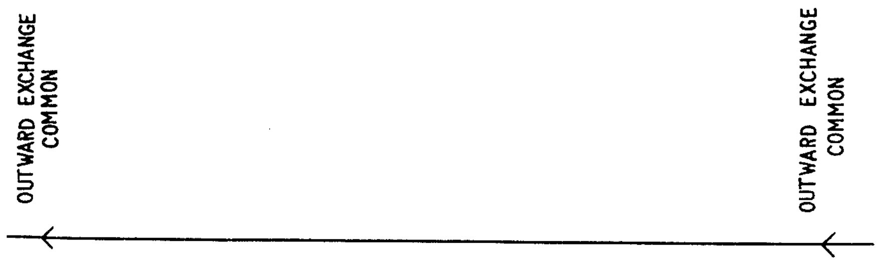

An outward speech connection (from cord to line) progresses from the cord, FIG. 18, on the outward exchange common, FIGS. 19 and 16 (to 6 leads), via the outward block common 2, FIG. 12 (to 2 leads), to the outward group gate for groups 21–25 (these gates do not occur in the inward connection). The output of this gate is the outward group common 21–25 (to 5 leads), through the outward sub-group gate to the outward sub-group common for sub-group 21, FIG. 8 (to 10 leads). Then via outward decade gate to the outward decade common 210, FIG. 4 (to 10 leads), to the outward line gate of line 2100, FIG. 4.

In order to mark a particular line, say 2100, it is necessary for a cord to mark for thousands, hundreds, tens and units digits.

Each cord has an individual marking lead for each of the thousands digits 2, 3 and 4 (15 leads in all) and in this case the cord will mark its thousands 2 lead (FIG. 18). This lead is a common input to 10 sub-group marking gates, FIGS. 15 and 11, associated with the 2 thousands block, these gates being provided on a basis of one gate per sub-group, per thousand line block per cord, making a total of 150 such gates.

With the cord marking the 2 thousand lead, the input to each gate within sub-groups 21–20 is marked.

Figure 11:
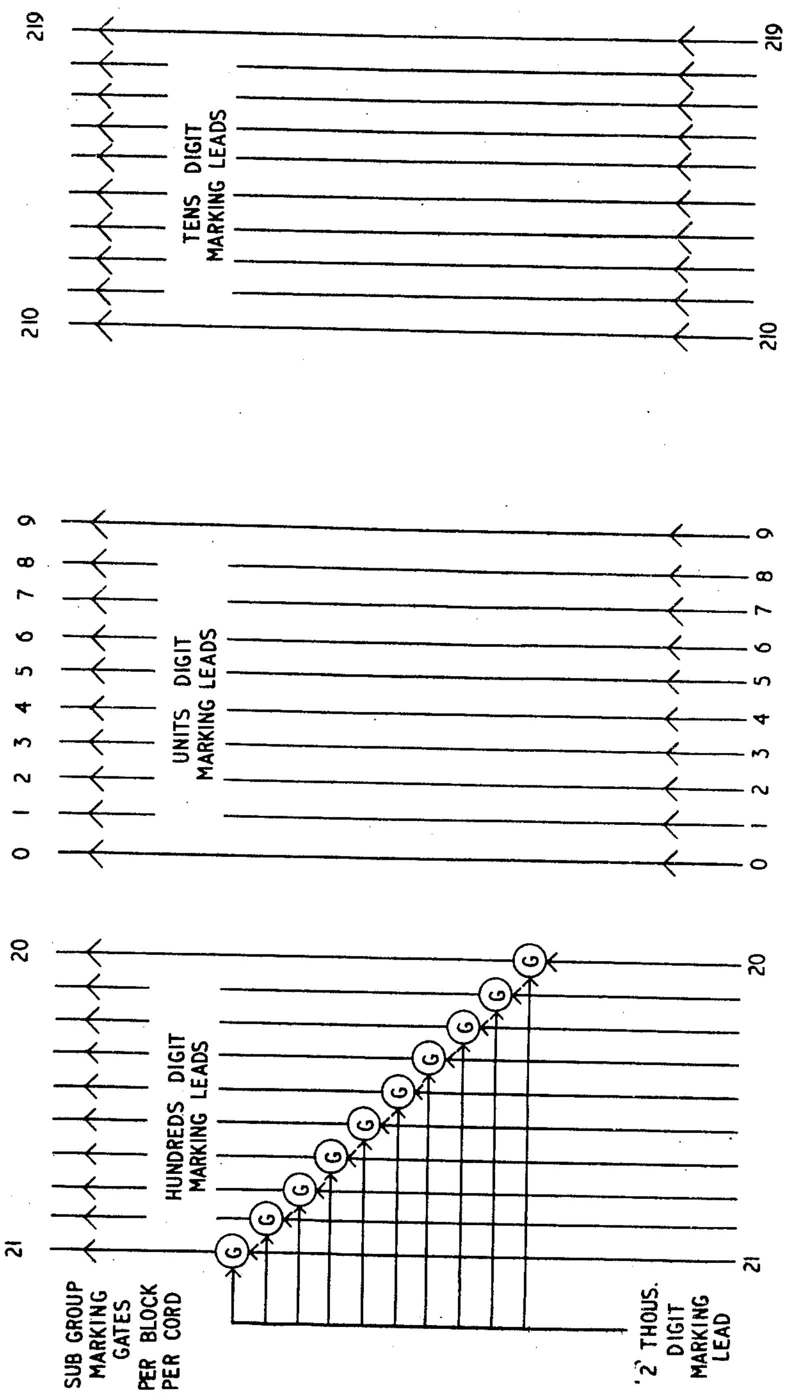
Figure 15:
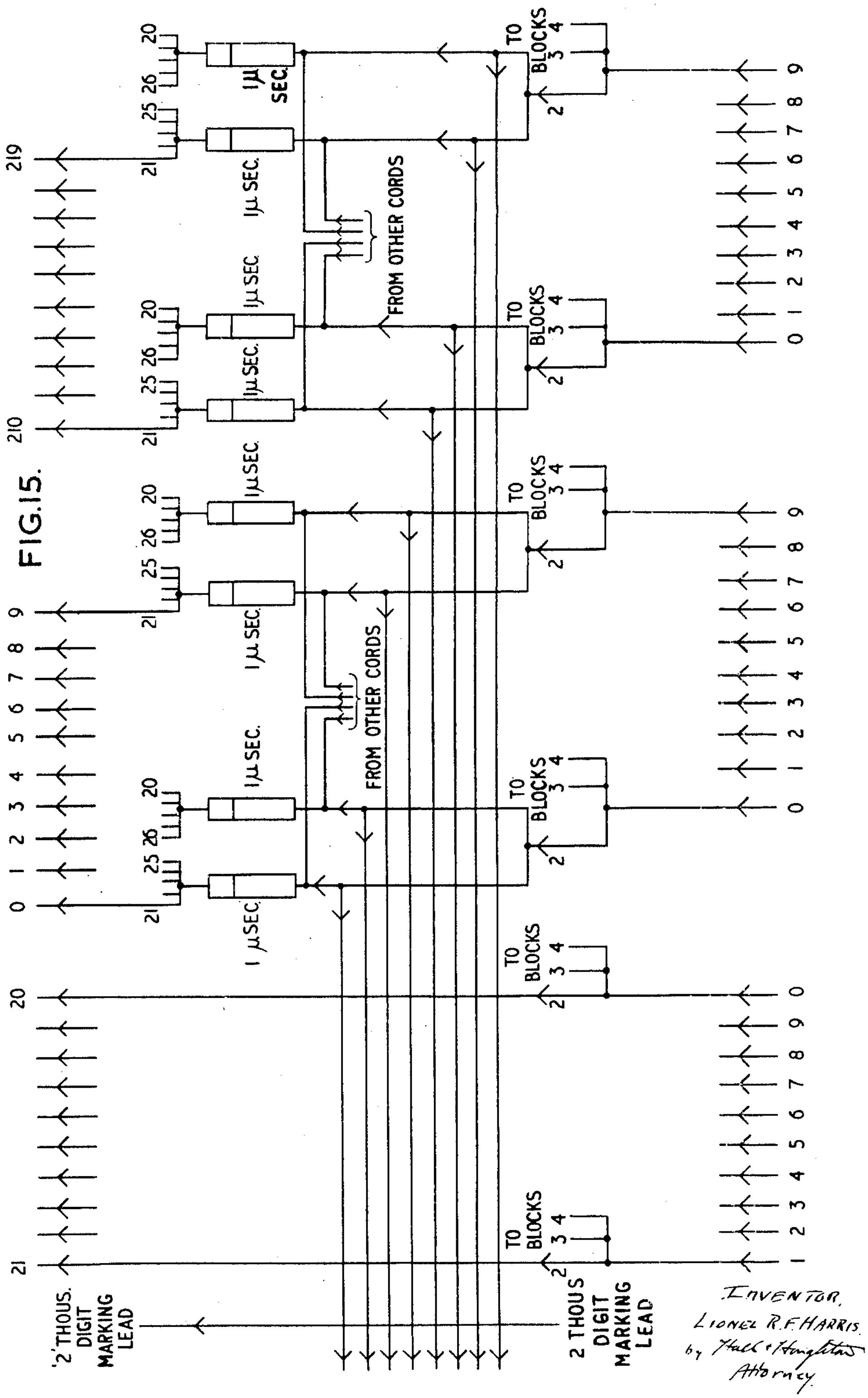

Each cord has 10 individual leads for marking the hundreds digits, FIG. 18, and each of these leads is connected as an input to the appropriate sub-group marking gate in each of the three blocks 2, 3 and 4 (i.e. gates 21, 31 and 41) FIGS. 15 and 11. Thus only sub-group marking gate 21, FIG. 11 has both input leads marked and is the only gate to provide an output under this condition.

Figure 8:
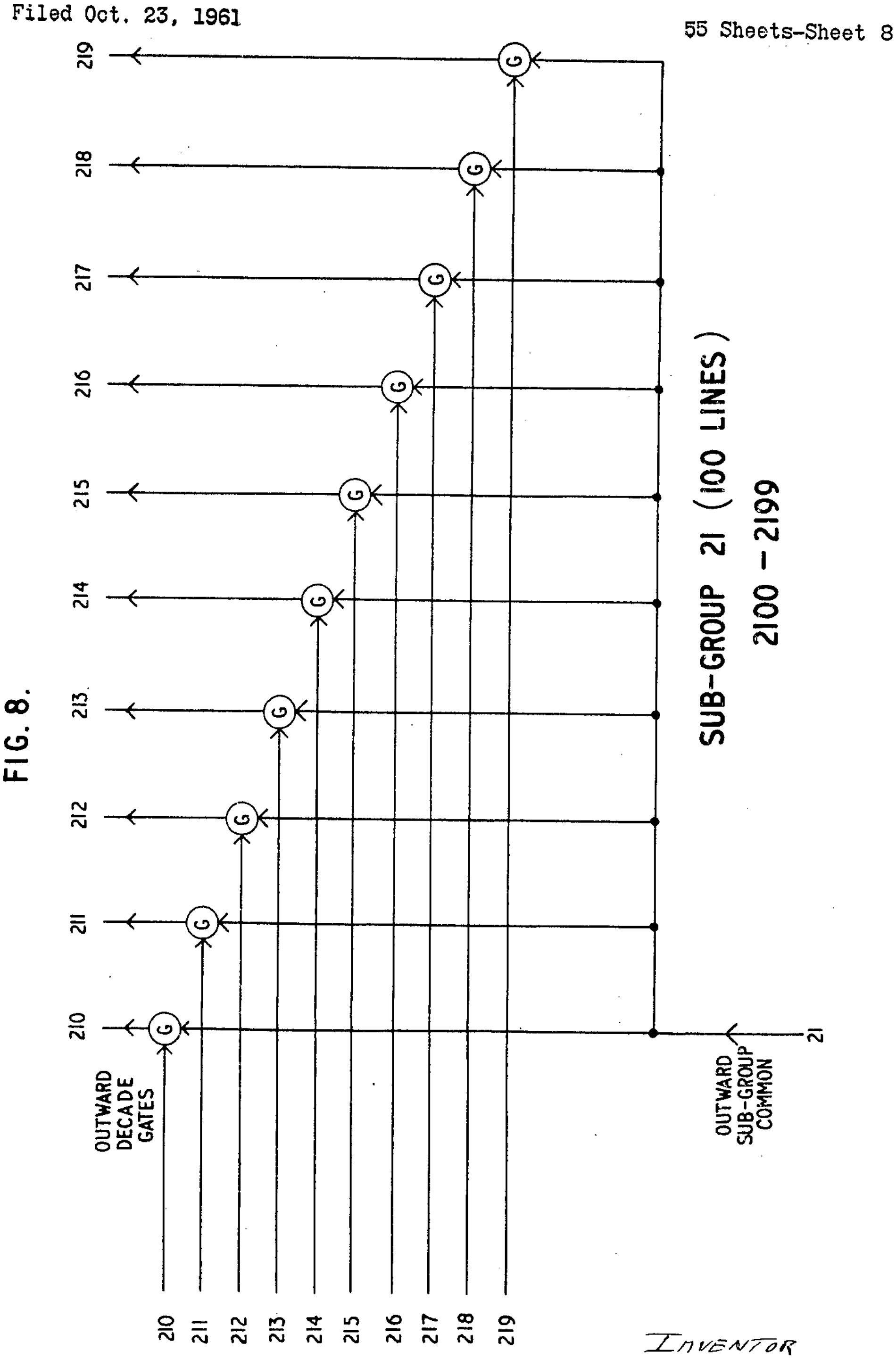
Figure 9:
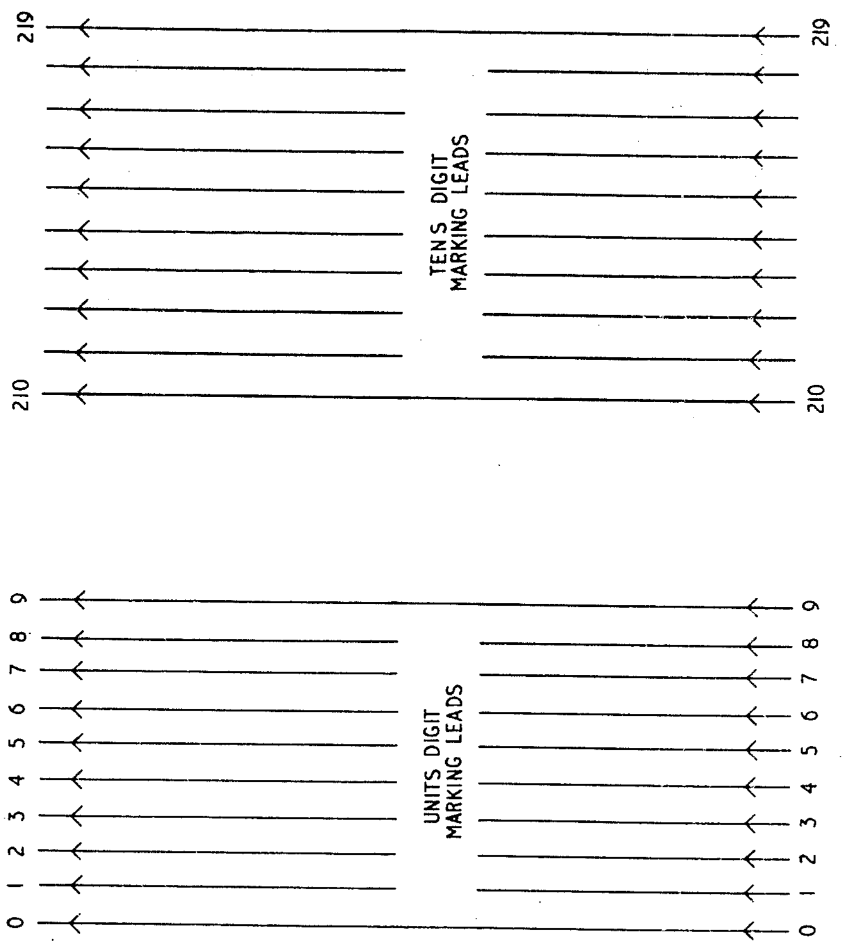

Each cord has 10 individual leads for marking the tens digits, FIG. 18, and each of these leads is common to 10 inward decade gates, FIG. 6, and via a 1 microsecond delay, FIG. 15, to 10 outward decade gates, FIG. 8, in each block (60 gates in all).

Therefore with 0 lead marked as the tens digit, the gates concerned will be 210, 220, 230, 240, 250, 260, 270, 280, 290 and 200 in the 2 block, 310–300 in the 3 block and 410–400 in the 4 block, in both the inward and outward sets of decade gates, FIGS. 6 and 8.

Figure 3:
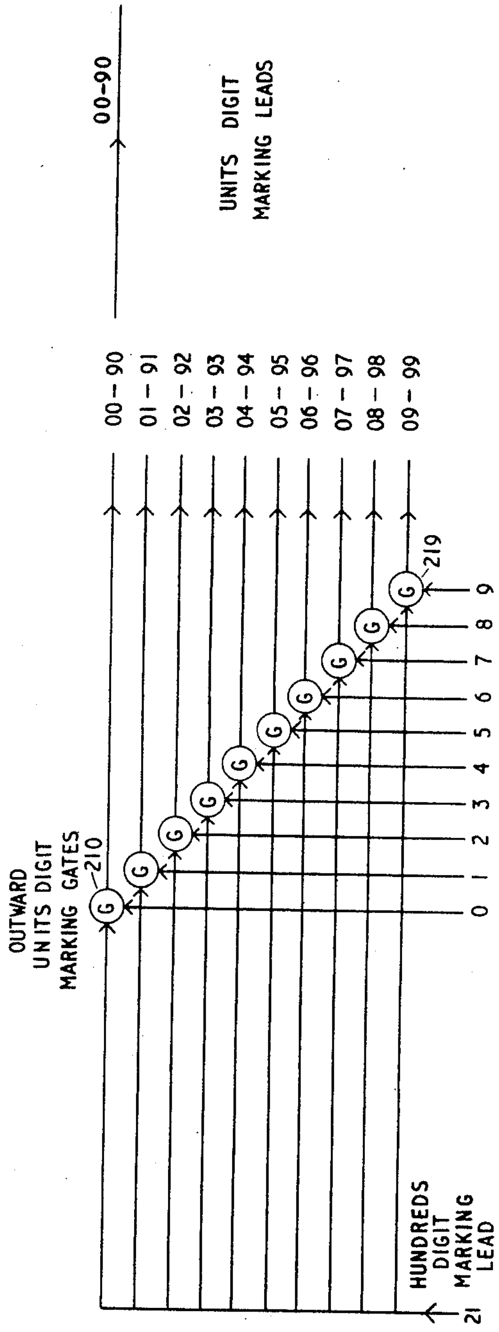

Sub-group marking gate 21, FIG. 11 is already providing an output and this is connected in common to 10 inward units digit marking gates 210–219, FIG. 1, and to 10 outward units digit marking gates 210–219, FIG. 3, serving sub-group 21 (20 gates marked out of 300 such gates).

Each cord has 10 individual leads for marking the units digits, FIG. 18, and each of these leads is connected in common to one of the inward units digit marking gates, FIG. 1, and via a 1 microsecond delay, FIG. 15, to one of the outward units digit marking gates, FIG. 3, for each sub-group in each block (60 gates marked out of 300 such gates).

With units digit 0 being marked the gates concerned will be 210, 220, 230, 240, 250, 260, 270, 280, 290 and 200 in the 2 block, 310–300 in the 3 block, and 410–400 in the 4 block in both the inward and outward sets of units digit marking gates.

The output of each of these gates is common to 10 exchange lines, FIGS. 2 and 4, these 10 lines being made up of the same units line taken one from each decade in a sub-group. Thus, in sub-group 21, lines 2100, 2110, 2120, 2130, 2140, 2150, 2160, 2170, 2180 and 2190 are commoned to the units digit marking gate 210, in both inward and outward directions and the only units digit marking gates with two inputs are the inward gate 210, FIG. 1, and the outward gate 210, FIG. 3, and the output of each of these gates marks the associated line gate of the first line in each decade in the sub-group. (I.e. lines 2100, 2110, . . . 2190.)

Thus, inward and outward line gates 2100, 2110, 2120, 2130, 2140, 2150, 2160, 2170, 2180 and 2190 and inward and outward decade gates 210, 220, 230, 240, 250, 260, 270, 280, 290 and 200 are marked in the 2 block and similar gates in each of the other blocks 3 and 4

From this array of gates only the inward and outward line gates 210 and decade gates 210, FIGS. 2 and 4, have both inputs marked to provide a through connection to the cord.

PULSE TRAINS EMPLOYED IN THE SYSTEM ARE AS FOLLOWS—FIGS. 21–23

A clock pulse train CP, FIG. 21, the pulses of which are equally spaced and occurring at 1 microsecond intervals, is used to generate the following supplies:

(a) P-phase pulse train, formed of alternate clock pulses.

(b) Q-phase pulse train, formed of alternate clock pulses, interleaved with the P-phase pulses.

(c) Test pulse train TP, being a pulse every 100 microseconds coincident with a P-phase pulse.

(d) PP pulse trains 1–11, FIG. 22, each pulse being 100 microseconds long and starting at test pulse TP time and occurring every 1100 microseconds.

In addition, timing pulse trains TW1, TW2, RTT1 and 2 and BTT are produced, but these are not locked to the clock pulses.

While certain objects and features of the invention have been broadly outlined a better understanding thereof may be had from the following detailed description with reference to FIGS. 24–55.

P AND Q-PHASE PULSE TRAINS GENERATOR

Figure 54:
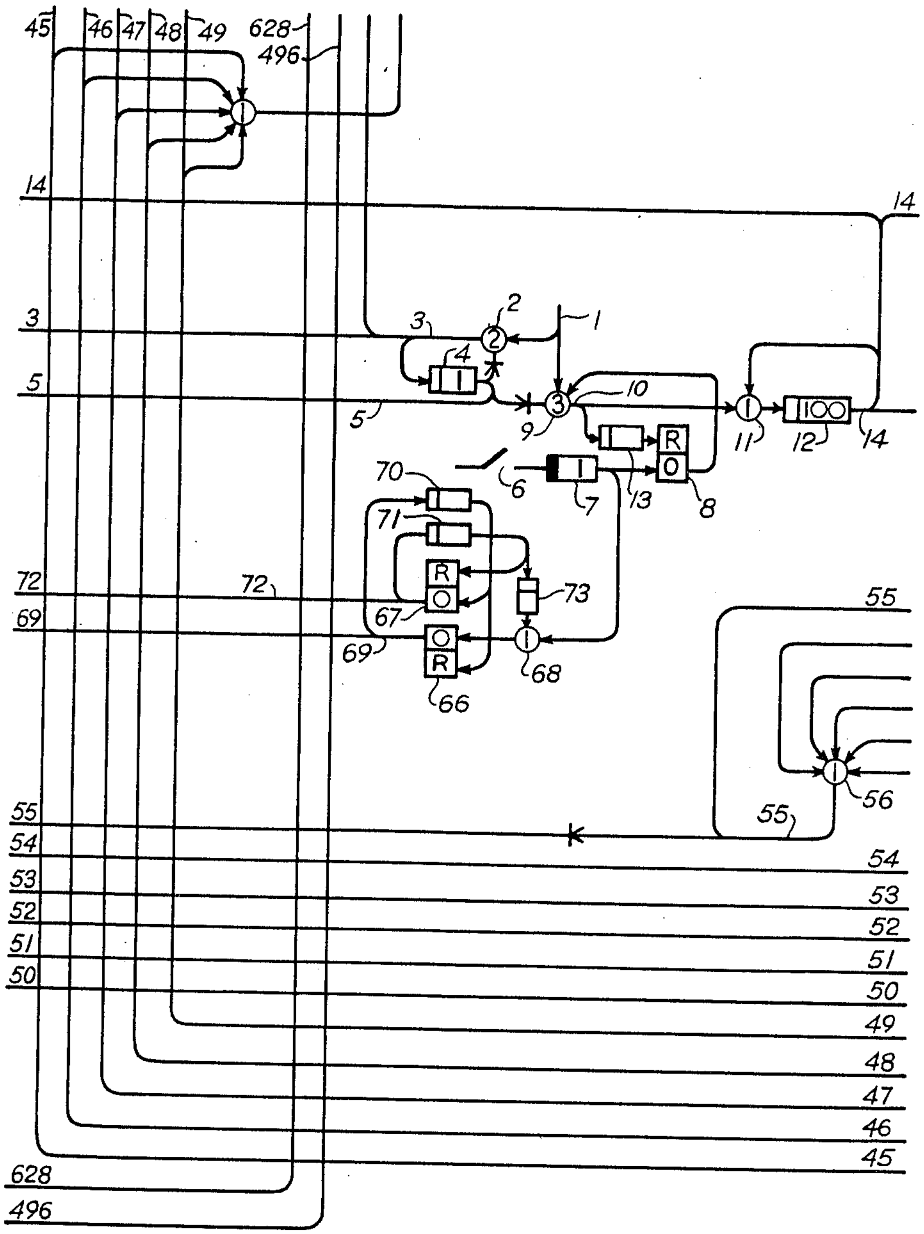

On initial connection of the clock pulse train CP on lead 1, FIG. 54, the first pulse will open AND-gate 2 and appear on lead 3. The pulse is also connected to a 1 microsecond delay 4, the output of which is connected to lead 5 and also as inhibition to the AND-gate 2, so that the second clock pulse CP will be inhibited in AND-gate 2 and prevented from appearing on lead 3. Thus P-phase pulses appear on lead 3 at 2 microseconds intervals, interleaved with Q-phase pulses on lead 5.

TEST PULSE TRAIN TP GENERATOR

When start key 6, FIG. 54, is operated, the beginning element 7 produces a 1 microsecond pulse to operate the test pulse toggle 8, the output of which is applied as the third input to AND-gate 9, the other inputs being the clock pulse CP lead 1 and Q-phase pulse train lead 5 connected as inhibition. AND-gate 9 will open to a clock pulse CP (at P-phase) and this pulse will appear on output lead 10 and via OR-gate 11 is written to the 100 microseconds test pulse store 12.

It is also passed via a short delay 13 to reset the test pulse toggle 8, the delay being necessary to ensure that a complete pulse is stored in test pulse store 12 before the toggle 8 resets and closes AND-gate 9.

Test pulse store 12 continues to generate via OR-gate 11 a pulse every 100 microseconds, this pulse coinciding with a P-phase clock pulse CP and it appears on output lead 14.

PP PULSE TRAINS GENERATOR

Figure 55:
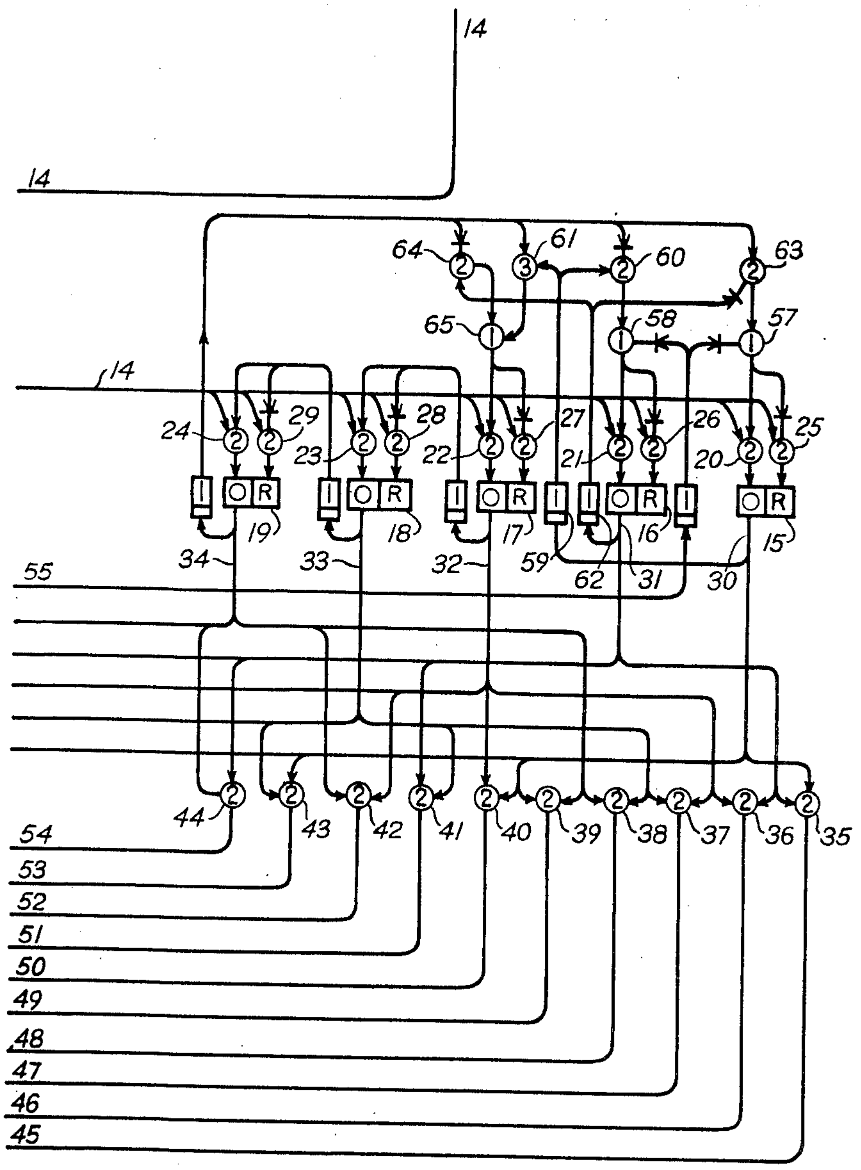

This generator consists of five toggles 15–19, FIG. 55. Test pulse TP on lead 14 (a pulse every 100 microseconds at P-phase pulse time) is supplied to the input operate AND-gates 20–24 and reset AND-gates 25–29 of the toggles 15–19. The operate outputs 30–34 of the toggles are combined in a 2 out of 5 code and applied to AND-gates 35–44 to produce ten PP pulse trains PP1–10, each on a separate output lead 45–54 and the condition of "no toggles operated" gives a condition on an eleventh lead 55.

This is shown in the following table:

| PP Pulse Train | Toggles Operated | | | | |
|---|---|---|---|---|---|
| | 15 | 16 | 17 | 18 | 19 |
| PP1 | X | X | — | — | — |
| PP2 | — | X | X | — | — |
| PP3 | — | — | X | X | — |
| PP4 | — | — | — | X | X |
| PP5 | X | — | — | — | X |
| PP6 | X | — | X | — | — |
| PP7 | — | X | — | X | — |
| PP8 | — | — | X | — | X |
| PP9 | X | — | — | X | — |
| PP10 | — | X | — | — | X |
| PP11 | — | — | — | — | — |

X means toggle operated.
— means toggle reset.

OPERATION

Assume all toggles 15–19 are reset.

This means that none of the toggles is giving an output and as the operate output leads 30–34 are all applied to OR-gate 56, FIG. 54, there will be no output on lead 55.

*1st test pulse TP*

The first test pulse TP is applied on common input lead 14 to AND-gates 20–29. Of these gates only 20 and 21 have a second input (from OR-gates 57 and 58), because there is no output on lead 55 and the output of these gates 20 and 21 operates toggles 15 and 16. The outputs of these two toggles are both applied to open AND-gate 35 to give an output PP1 on lead 45 until the next test pulse TP appears on output lead 14 of test pulse store 12, and also via OR-gate 56 on lead 55.

The output of toggle 15 is also fed via 1 microsecond delay 59 to AND-gates 60 and 61, while the output of toggle 16 is fed via 1 microsecond delay 62 to AND-gates 63 and 64. Of these gates, 60 and 64 will open to give outputs via OR-gates 58 and 65 as inputs to AND-gates 21 and 22.

*2nd test pulse TP*

AND-gates 21 and 22 will open to maintain operation of toggle 16, operate toggle 17 and via AND-gate 25 reset toggle 15.

The outputs of toggles 16 and 17 are applied to AND-gate 36 to give output PP2 on lead 46.

Toggle 16 marks AND-gates 63 and 64, and toggle 17 marks AND-gates 23 and 28.

*3rd test pulse TP*

Resets toggle 16 via AND-gate 26, maintains toggle 17 operated via AND-gate 22 and operates toggle 18 via AND-gate 23.

The outputs of toggles 17 and 18 operated are both applied to AND-gate 37 to give output PP3 on lead 47.

Toggle 17 marks AND-gates 23 and 28, and toggle 18 marks AND-gates 24 and 29.

*4th test pulse TP*

Resets toggle 17 via AND-gate 27, maintains toggle 18 operated via AND-gate 23 and operates toggle 19 via AND-gate 24.

The outputs of toggles 18 and 19 are both applied to AND-gate 38 to give output PP4 on lead 48.

Toggle 18 marks AND-gates 24 and 29 and toggle 19 marks AND-gates 60, 61, 63 and 64.

*5th test pulse TP*

Resets toggle 18 via AND-gate 28, maintains toggle 19 operated via AND-gate 24 and operates toggle 15 via AND-gate 63, OR-gate 57 and AND-gate 20.

Outputs of toggles 15 and 19 are both applied to AND-gate 39 to give output PP5 on lead 49.

Toggle 15 marks AND-gates 60 and 61 and toggle 19 marks AND-gates 60, 61, 63 and 64.

*6th test pulse TP*

Resets toggle 19 via AND-gate 29, maintains toggle 15 operated via AND-gate 63, OR-gate 57 and AND-gate 20 and operates toggle 17 via AND-gate 61, OR-gate 65 and AND-gate 22.

Outputs of toggles 15 and 17 are both applied to AND-gate 40 to give output PP6 on lead 50.

Toggle 15 marks AND-gates 60 and 61 and toggle 17 marks AND-gates 23 and 28.

*7th test pulse TP*

Resets toggle 15 via AND-gate 25, resets toggle 17 via AND-gate 27, operates toggle 16 via AND-gate 60, OR-gate 58 and AND-gate 21 and operates toggle 18 via AND-gate 23.

Outputs of toggles 16 and 18 are both applied to AND-gate 41 to give output PP7 on lead 51.

Toggle 16 marks AND-gates 63 and 64, and toggle 18 marks AND-gates 24 and 29.

*8th test pulse TP*

Resets toggle 16 via AND-gate 26, resets toggle 18 via AND-gate 28, operates toggle 17 via AND-gate 64, OR-gate 65 and AND-gate 22 and operates toggle 19 via AND-gate 24.

Outputs of toggles 17 and 19 are both applied to AND-gate 42 to give output PP8 on lead 52.

Toggle 17 marks AND-gates 23 and 28 and toggle 19 marks AND-gates 60, 61, 63 and 64.

*9th test pulse TP*

Resets toggle 17 via AND-gate 27, resets toggle 19 via AND-gate 29, operates toggle 15 via AND-gate 63, OR-gate 57 and AND-gate 20, and operates toggle 18 via AND-gate 23.

Outputs of toggles 15 and 18 are both applied to AND-gate 43 to give output PP9 on lead 53.

Toggle 15 marks AND-gates 60 and 61 and toggle 18 marks AND-gates 24 and 29.

*10th test pulse TP*

Resets toggle 15 via AND-gate 25, resets toggle 18 via AND-gate 28, operates toggle 16 via AND-gate 60, OR-gate 58 and AND-gate 21 and operates toggle 19 via AND-gate 24.

Outputs of toggles 16 and 19 are both applied to AND-gate 44 to give output PP10 on lead 54.

*11th test pulse TP*

Resets toggle 16 via AND-gate 26 and resets toggle 19 via AND-gate 29.

This gives no toggles operated and at the next test pulse TP the sequence will recommence.

TIMING PULSE TRAINS GENERATOR

Timing pulse trains TW1 and TW2, FIG. 23, are produced by toggles 66 and 67, FIG. 54.

When the start key 6 is operated, as already explained, a single 1 microsecond delay is produced on the output of the beginning element 7. This operates via OR-gate 68 the toggle 66. Output lead 69 is taken via a 1 microsecond delay 70 to reset itself, which means that a pulse of 1 microsecond duration has been produced on lead 69 and it also operates toggle 67. The output of toggle 67 is taken via 1 microsecond delay 71 and back to reset itself so that a pulse of 1 microsecond duration has been produced on lead 72 immediately following the pulse on lead 69.

The output of toggle 67 is also connected to a 250 millisecond delay 73, the output of which is applied to OR-gate 68 to restart the cycle, which is then repetitive.

TONE INTERRUPTION GENERATORS

*Call and ring tones*

Figure 44:
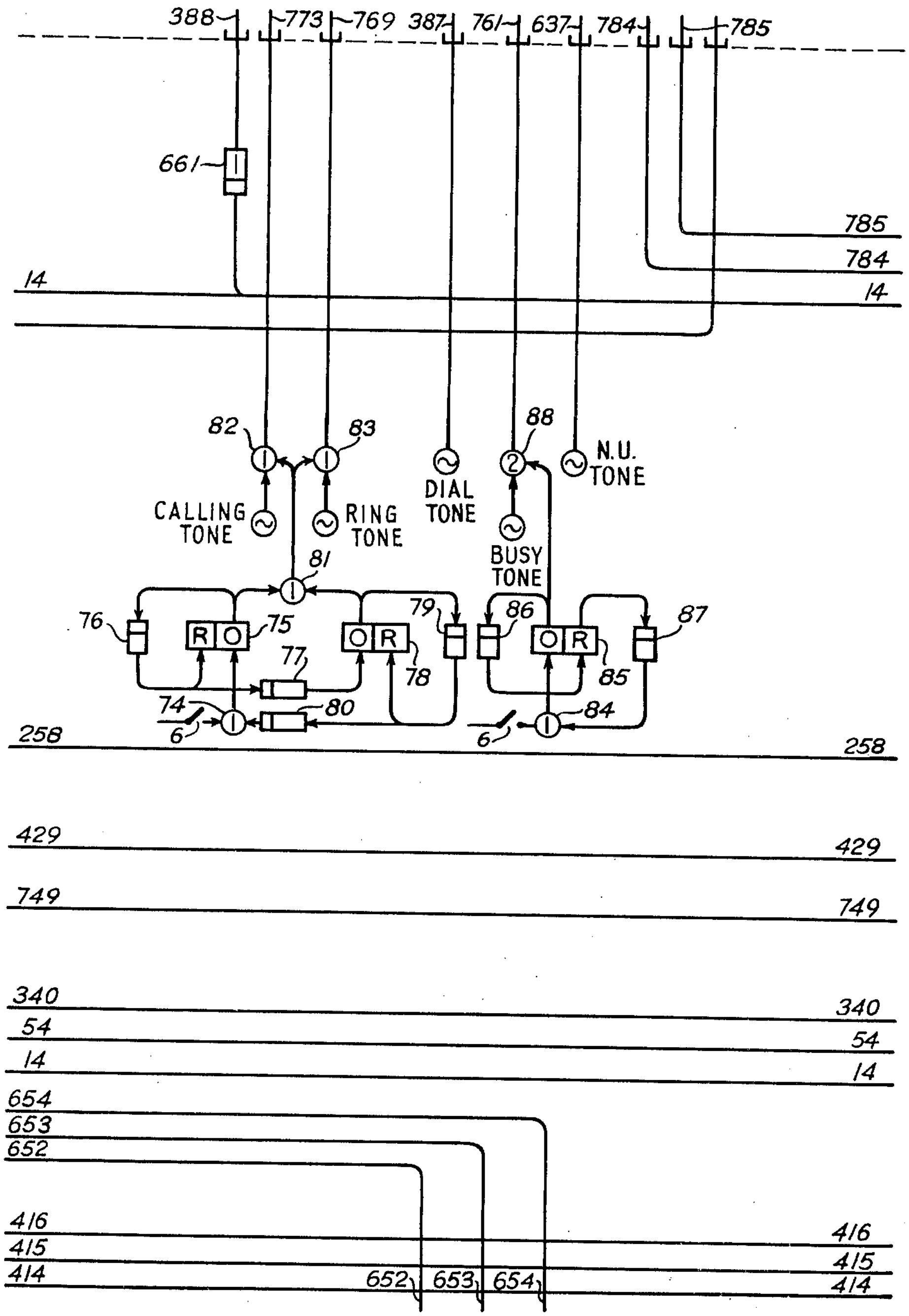

Start key 6 via OR-gate 74, FIG. 44, operates toggle 75, the output of which is connected via an 0.4 second delay 76 back to reset itself, and is also connected via an 0.2 second delay 77 to operate toggle 78. Similarly the output of this toggle 78 is connected via an 0.4 second delay 79 and back to reset itself, and via a 2.0 second delay 80 and OR-gate 74 to re-operate toggle 78 and recommence the sequence, which is then repetitive.

The outputs of toggles 75 and 78 are applied via OR-gate 81 as input to the call tone AND-gate 82 and the ring tone AND-gate 83 respectively.

*Busy tone*

Start key 6 via OR-gate 84 operates toggle 85, the output of which is connected via 0.75 second delay 86 to reset itself, the output of the reset in turn being connected to 0.75 second delay 87 which via OR-gate 84 re-operates the toggle to recommence the cycle which is then repetitive.

The output of the operated condition of the toggle is applied as input to busy tone AND-gate 88.

LINE SCANNING

Assume that no lines are in use in the exchange.

In this case scanning will commence at hundreds, tens and units digits 111 in each block. Test pulse TP on lead 14 is passed via OR-gate 89, FIG. 41, to lead 90 which is connected as an input to AND-gate 91, FIG. 40. The other input is barred lead 92 which will not be inhibiting as there will be no output from OR-gate 93. Test pulse TP on the output of AND-gate 91 is applied to each of the OR-gates 94 and 95 (characterising digit 1 in 2 out of 5 code), and is connected to leads 96 and 97 each common to the five cords.

Figure 32:
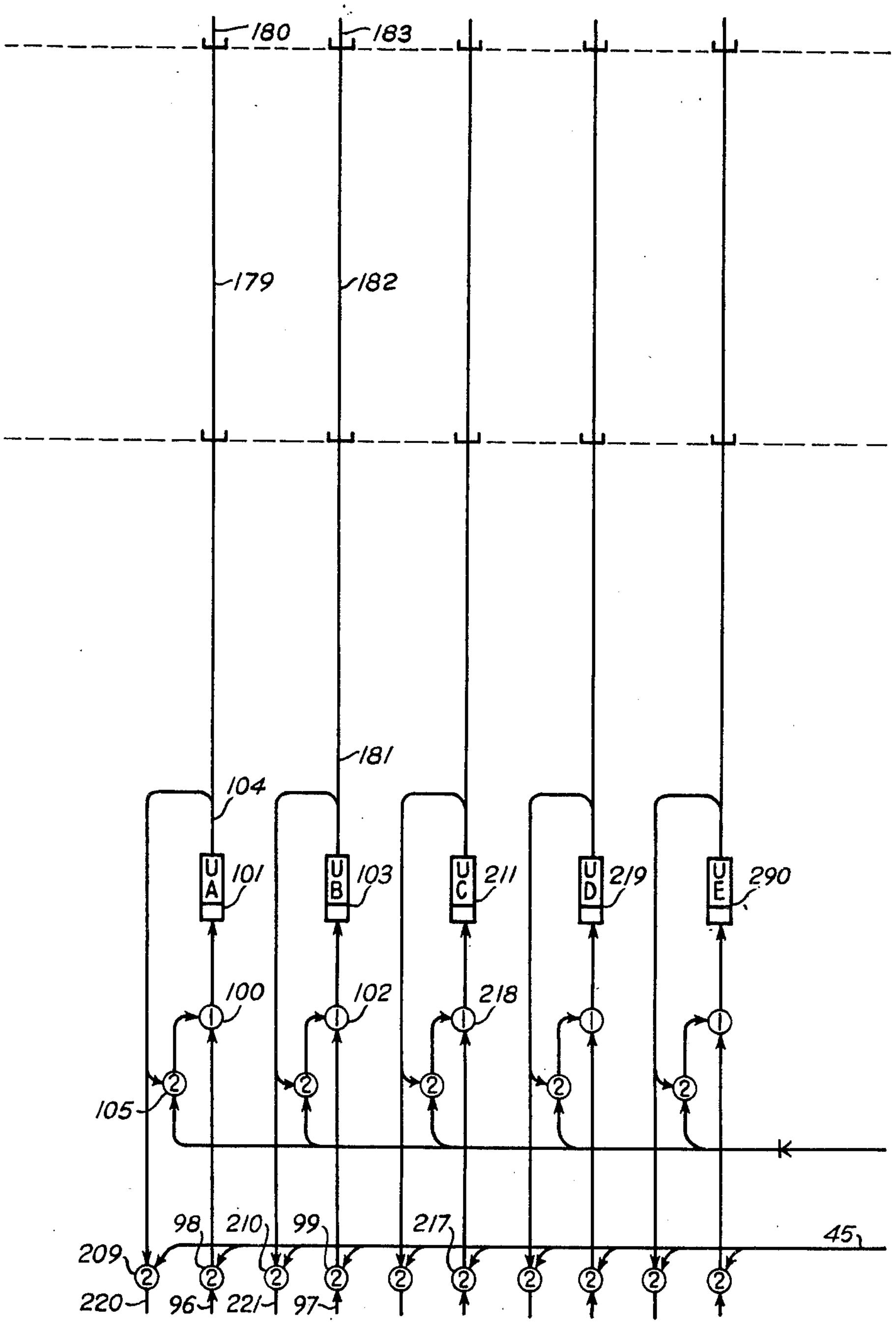

In each cord each of the leads 96 and 97 is connected to an AND-gate, such as 98, FIG. 32, to which is also connected the PP pulse train lead 45 characterising the cord. Test pulse TP on the output of AND-gate 98 is applied to OR-gate 100 and is thus written into the units UA store 101 and test pulse TP on the output of AND-gate 99 is applied to OR-gate 102 and is thus written into the units UB store 103. Each store has a circulating path, e.g., output 104 of store 101 via AND-gate 105 and OR-gate 100 back to input store 101.

Figure 41:
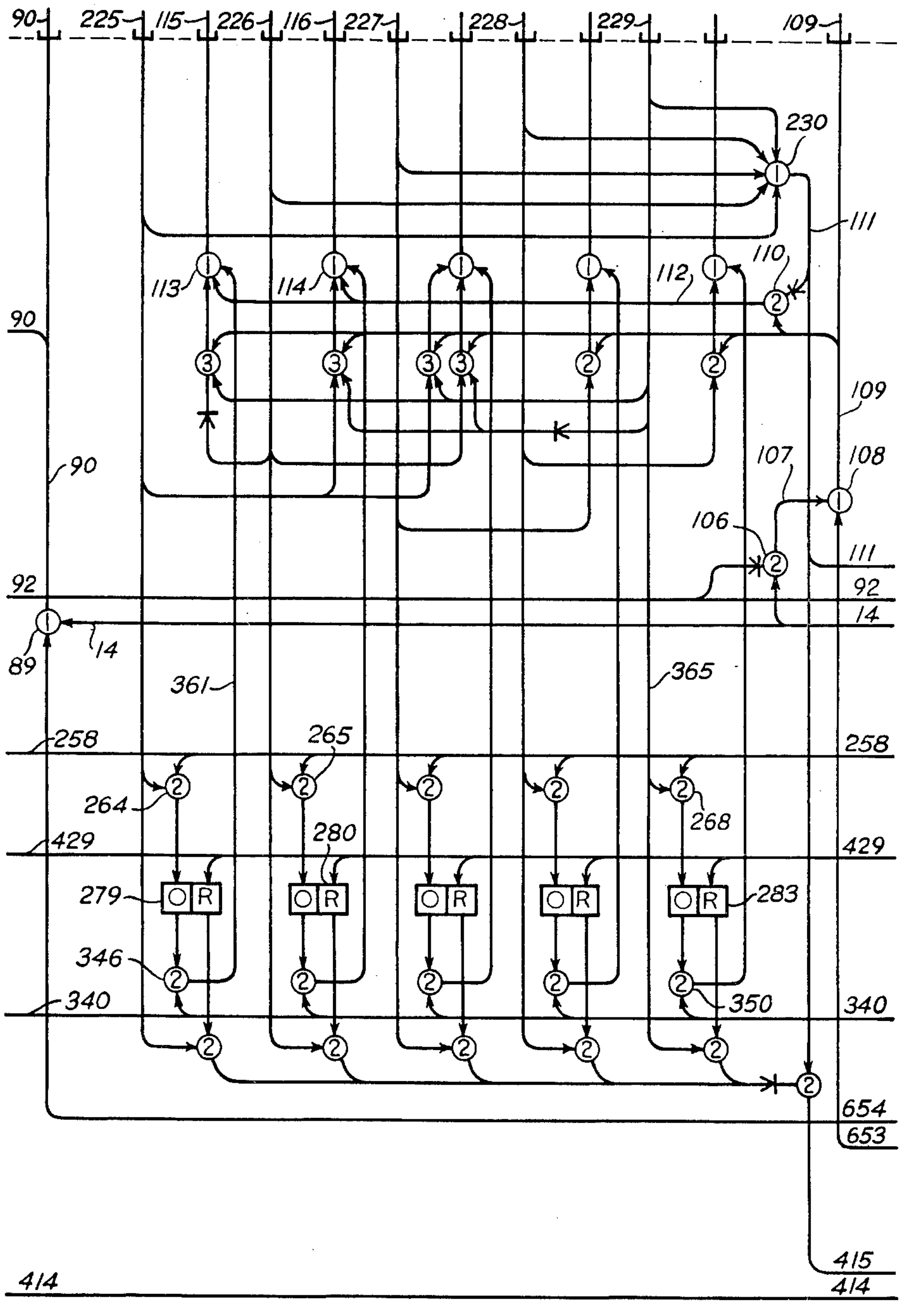

Test pulse TP on lead 14 is applied to AND-gate 106, FIG. 41, the other input being lead 92 not inhibiting. Test pulse TP on the output lead 107 of AND-gate 106 is connected via OR-gate 108 to lead 109 applied as one input to AND-gate 110. The other input is barred lead 111 not inhibiting, and test pulse TP therefore appears on the output lead 112 of AND-gate 110 and via OR-gates 113 and 114 on leads 115 and 116, each common to the five cords. In each cord leads 115 and 116 are jointed to AND-gates 117 and 118, FIG. 33, respectively, to each of which the PP pulse train of the cord is connected on lead 45. Test pulse TP via OR-gates 119 and 120 is therefore written into the tens DA store 121 and DB store 122, characterising the digit 1.

Figure 34:
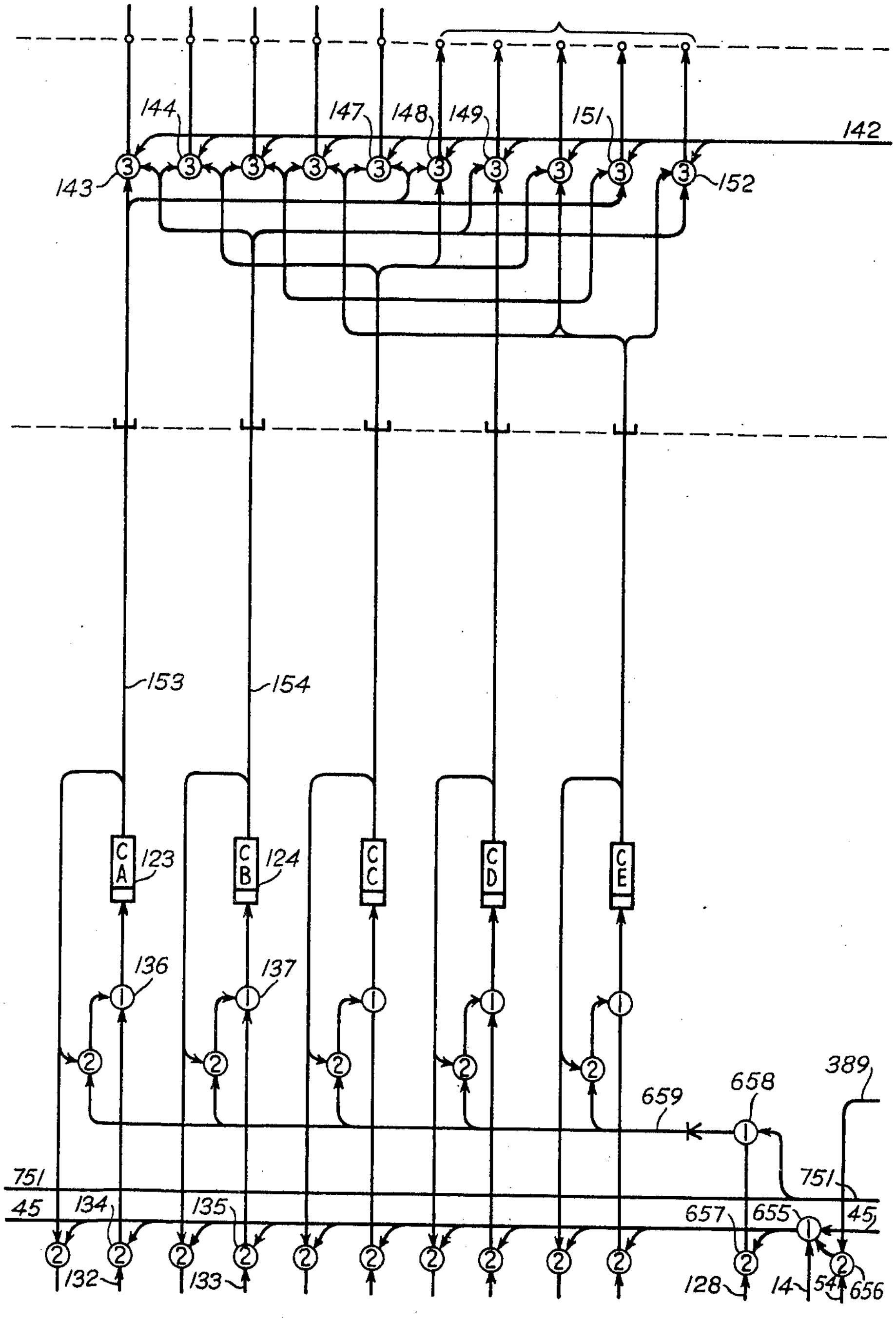

In like manner test pulse TP on lead 45 is written into the hundreds CA store 123 and CB store 124, FIG. 34, the test pulse TP being initially applied to AND-gate 125 and then via lead 126 and OR-gate 127 to lead 128 and through AND-gate 129 to OR-gates 130 and 131, the outputs of which leads 132 and 133 are applied to AND-gates 134 and 135 respectively to which the PP pulse train is also connected on lead 45 and so via OR-gates 136 and 137 to the hundreds CA store 123 and CB store 124, characterising the digit 1.

Test pulse TP is thus stored in a combination of each of the hundreds, tens and units stores in each of the cords. It is arranged however that a particular cord is associated with a particular block for purposes of scanning and this is arranged by means of inserting a strap 138, FIG. 38, between the test pulse TP lead 14 and the thousand store lead of whichever cord is required. A similar strap is inserted for each of the other blocks.

The thousands stores are provided on the basis of one per block per cord, i.e. 15 in all.

For purposes of this example, the cord shown in the drawing is connected to operate for the 2 thousand block by the strap being connected to lead 139.

Figure 37:
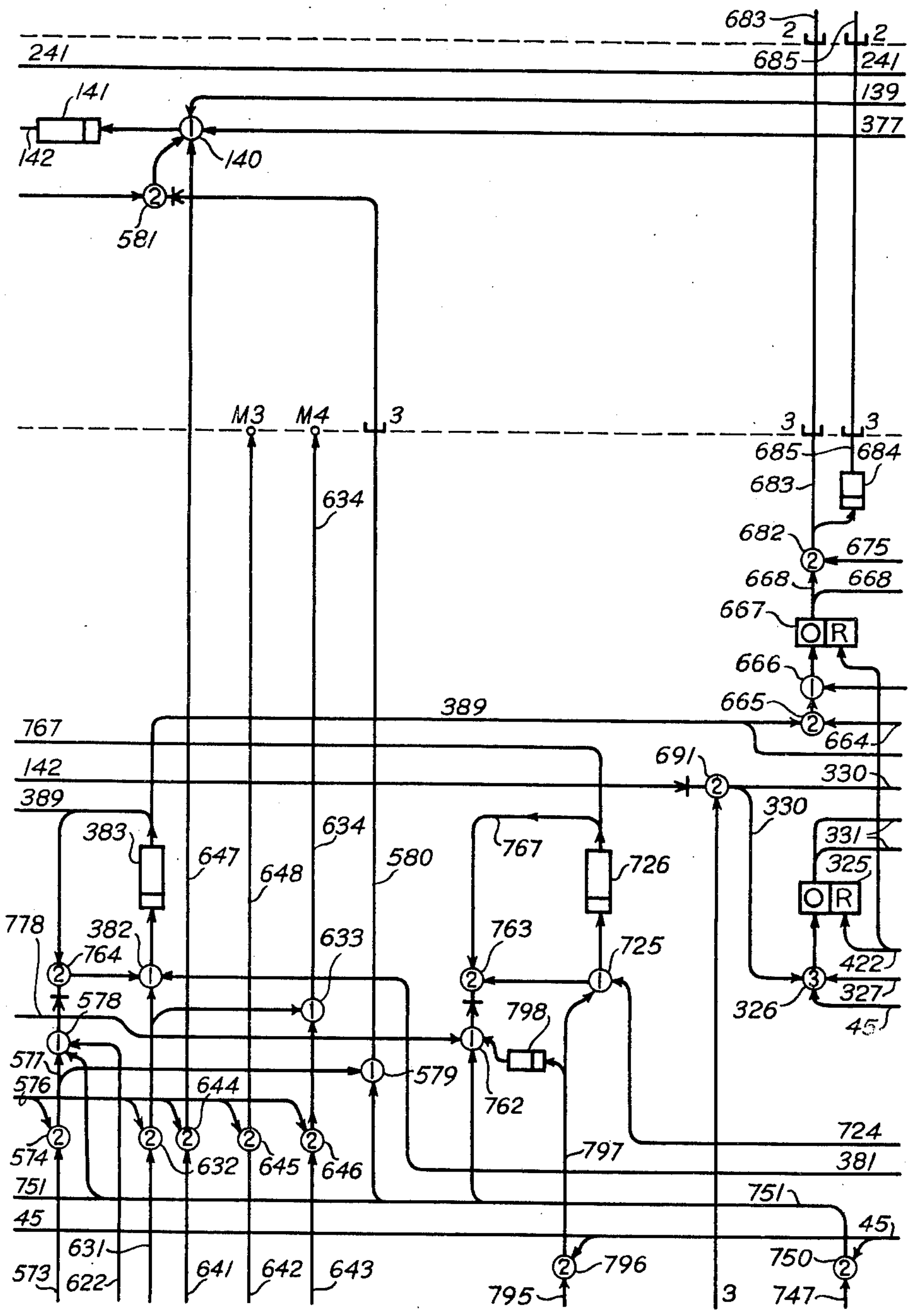

Test pulse TP on lead 14 is therefore stored via OR-gate 140, FIG. 37, in the thousand M2 store 141 whose output lead 142 is applied as a common input to each of the AND-gates 143–152, FIG. 34, serving the 2 thousand block, AND-gates 143–147 serving the 2A group and AND-gates 148–152 the 2B group. There is a similar set of ten AND-gates for each of the 3 and 4 thousand blocks.

Having written the test pulse TP into the hundreds CA store 123 and CB store 124, it will appear on the output after 100 microseconds and the output is common to each of the three blocks.

In the 2 block the output lead 153 of the hundreds CA store 123 is applied to AND-gates 143, 147, 148 and 151. The output lead 154 of hundreds CB store 124 is applied to AND-gates 143, 144, 149 and 152. To each of these gates is also applied the test pulse TP on output lead 142 of thousand M2 store 141. The only AND-gate to be opened is therefore 143.

Figure 26:
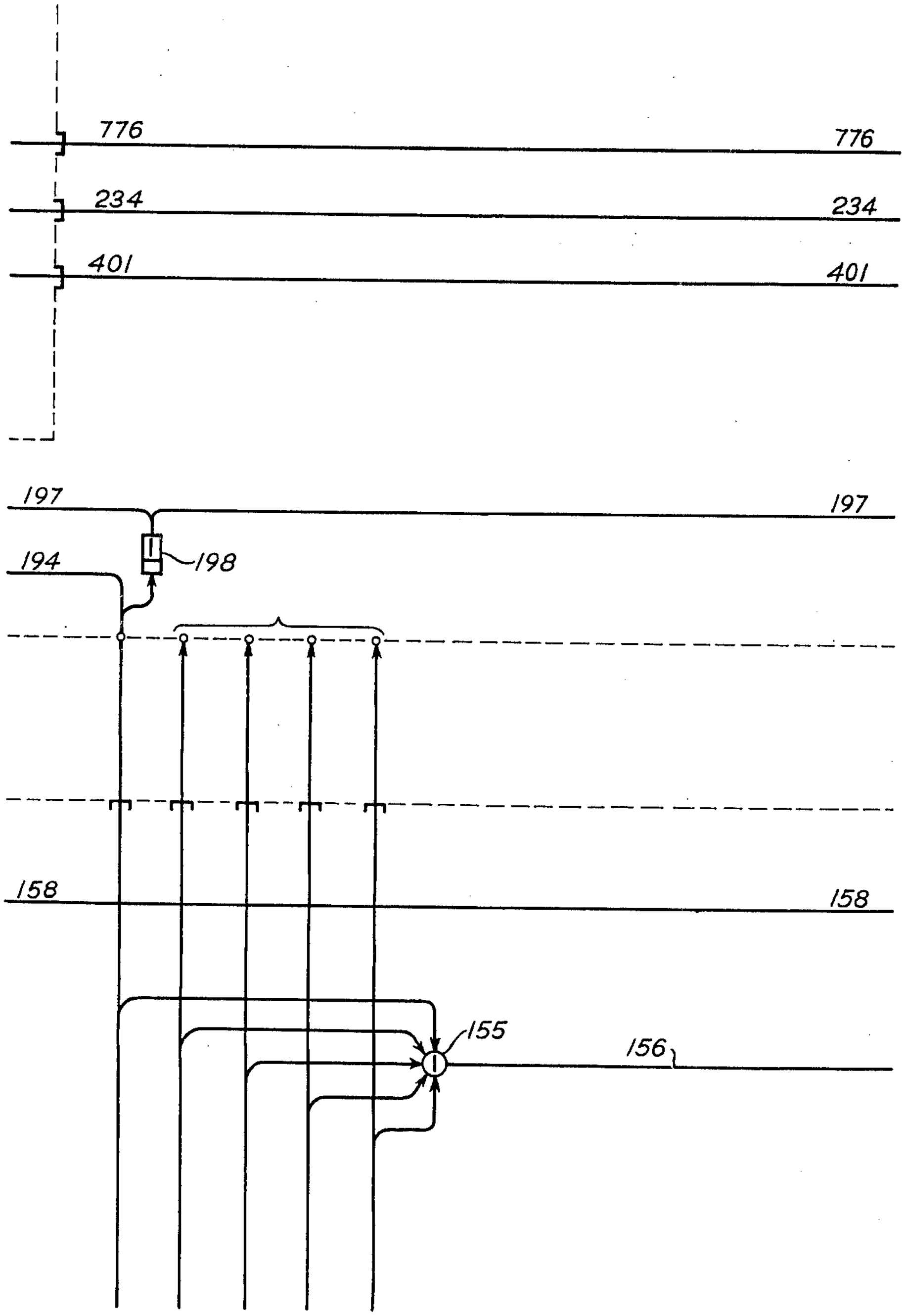

The outputs of AND-gates 143–147 are applied to OR-gate 155, FIG. 26, the output of which on lead 156 gives a group/cord indication for group 2A and the cord.

Likewise the outputs of AND-gates 148–152, FIG. 34 are applied to a similar OR-gate to give an indication for group 2B and the cord.

Figure 24:
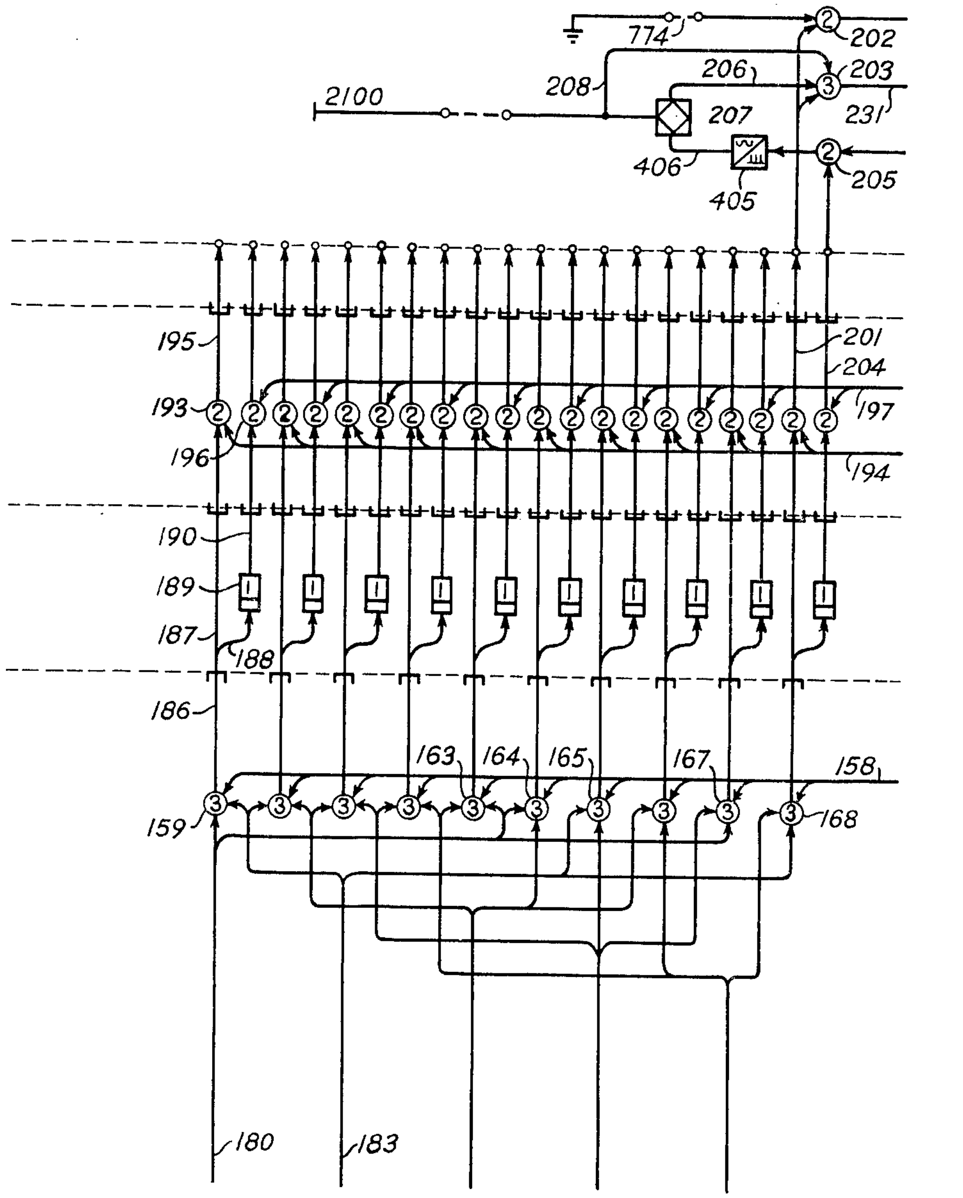
Figure 25:
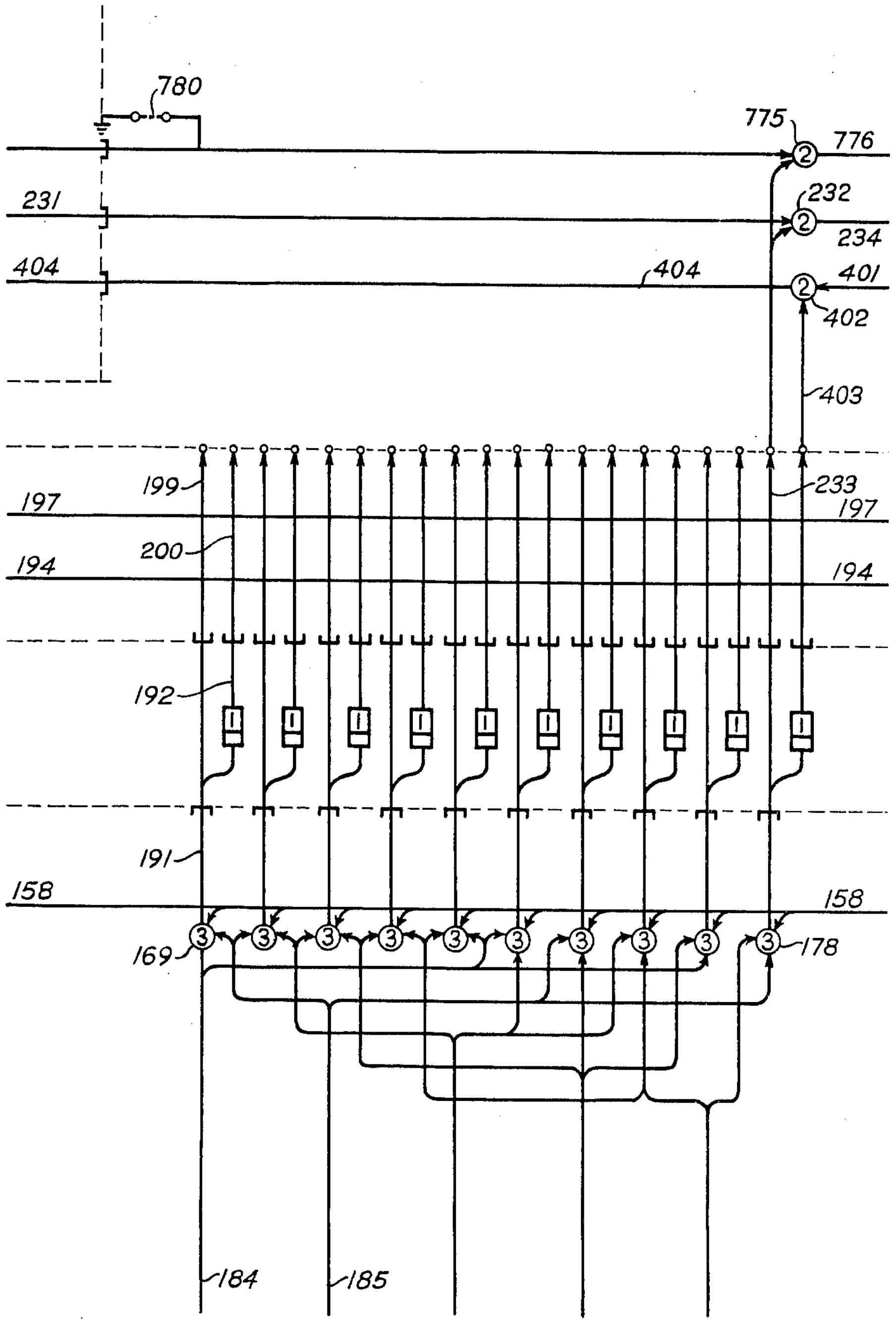
Figure 28:
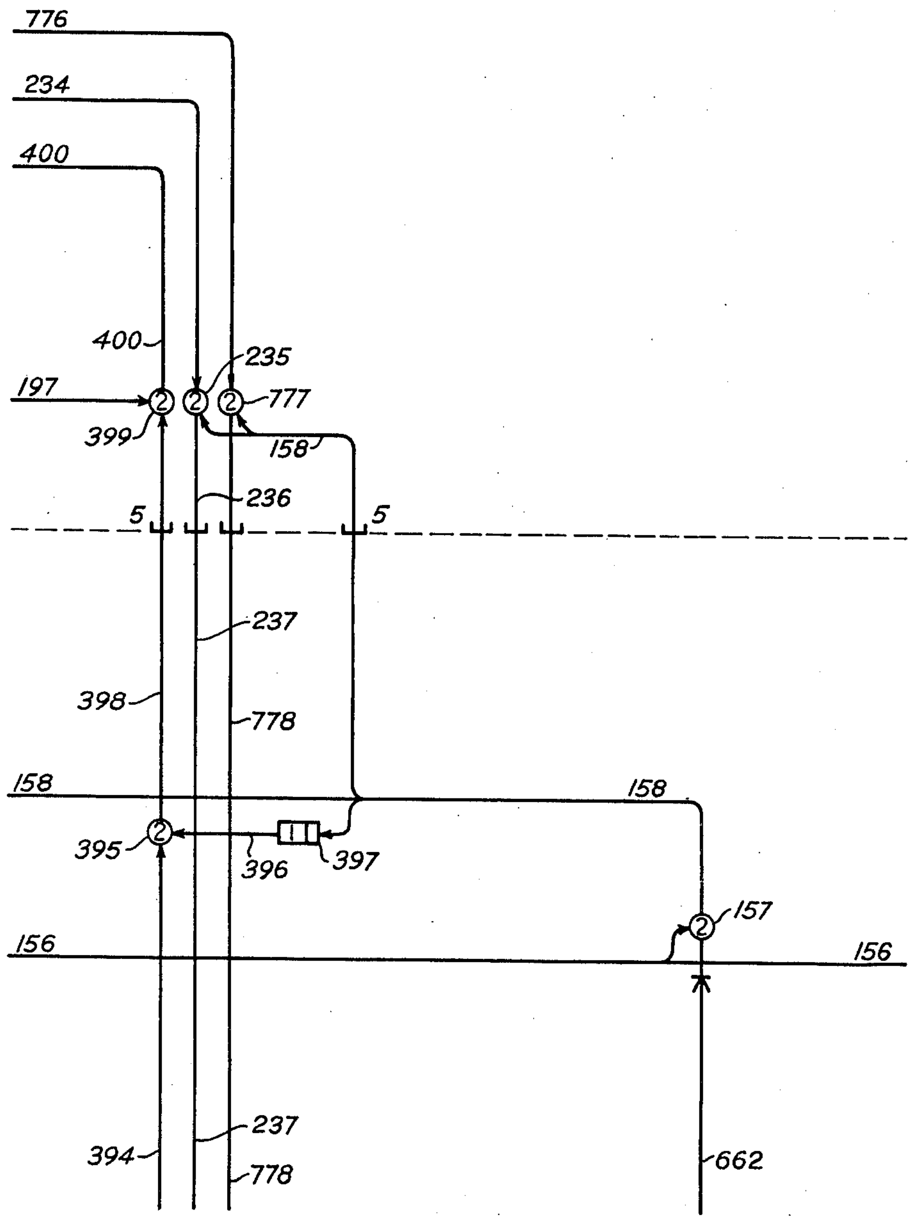
Figure 29:
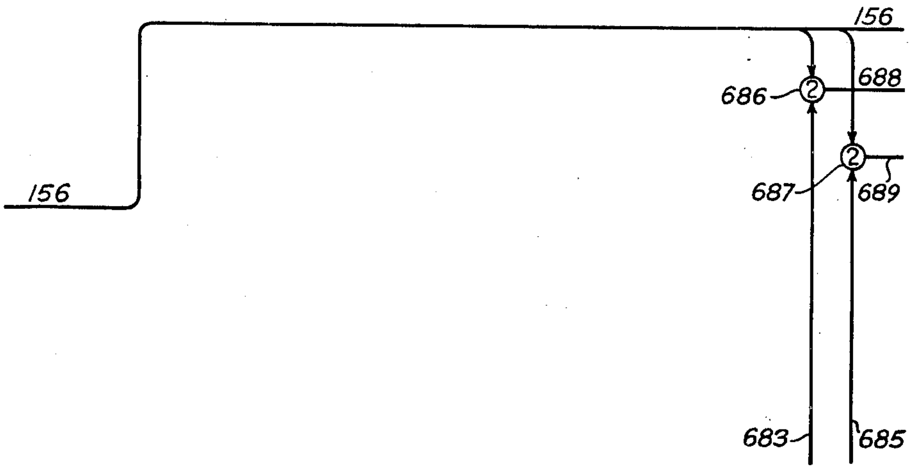

Test pulse TP on group/cord indication lead 156 is applied to AND-gate 157, FIG. 28, the output lead 158 of which is connected in common to the group/cord AND-gates 159–168, FIG. 24, associated with the units digits and group/cord AND-gates 169–178, FIG. 25, associated with the tens digits.

Figure 33:
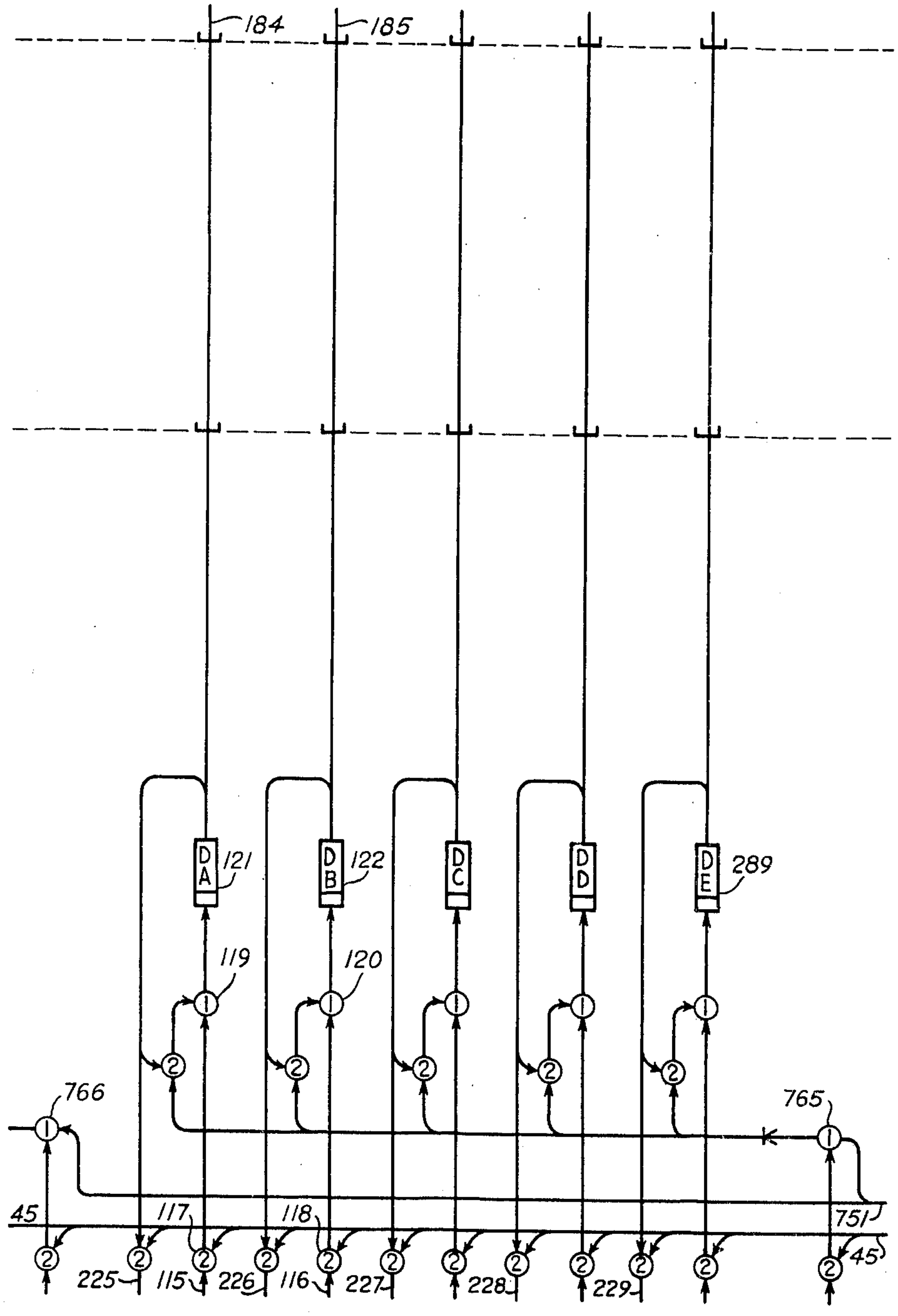

In the cord stores test pulse TP is on the output of units UA store 101 and units UB store 103, FIG. 32 and on tens DA store 121 and tens DB store 122, FIG. 33.

The output of each of these stores is common to the three blocks and then to the two groups in each block. For example, the output 104 of units UA store 101 is connected to lead 179, FIG. 32, in the 2 block and to lead 180, FIG. 24, and AND-gates 159, 163, 164 and 167 in group A of that block.

The output lead 181, FIG. 32, of units UB store 103 is likewise connected to leads 182, and 183, FIG. 24, and AND-gates 159, 165 and 168. Similarly tens DA store 121 and tens DB store 122, FIG. 33 are connected to leads 184 and 185 respectively.

Thus, the outputs of the stores are connected to AND-gates in each of the groups and each of the blocks, but each group in each block will be individually marked by the third input to the AND-gates, such as the lead 158 for group A in the 2 block as already explained.

In group A of the 2 block, AND gates 159, FIG. 24, and 169, FIG. 25, will open, these being the only gates with test pulse TP on all three inputs. The output lead 186 of AND-gate 159 in common with similar output leads of the other cords is joined to two leads 187 and 188 individual to the group, one of these leads 188 containing a 1 microsecond delay 189. Test pulse TP will therefore appear on lead 187 while test pulse TQ (test pulse at Q-phase) will appear on lead 190. Likewise for the output of AND-gate 169, FIG. 25, test pulse TP will appear on lead 191 and test pulse TQ on lead 192. Each of these leads is then commoned to the five sub-groups constituting the group.

The leads associated with the units are each taken as an input to an AND-gate. For example, lead 187 on which is test pulse TP, is connected as an input to AND-gate 193, FIG. 24, in sub-group 21. The other input to this AND-gate 193 is common lead 194 the output of the hundreds CA store 123, FIG. 34, on which there also is test pulse TP. Thus, test pulse TP appears on lead 195, FIG. 24.

The other lead 190 on which is test pulse TQ, is connected as an input to AND-gate 196, the other input of which is common lead 197 also on which is test pulse TQ (test pulse TP from output of store 123 delayed 1 microsecond in 198 (FIG. 26)).

Similarly test pulse TP appears on lead 199, FIG. 25, and test pulse TQ on lead 200 relative to the tens digit.

Lead 195 is common to ten lines these being 2101, 2111, 2121, 2131, 2141, 2151, 2161, 2171, 2181 and 2191 and the lead is connected as an input to each of two line gates 202 and 203, FIG. 24, shown for line 2100. Line gate 203 has two other inputs one, in speech 206 from the line unit hybrid 207 and the other, in hold 208 from the line, and both of these inputs will be energised only when the line is looped.

For purposes of scanning, the hundreds, tens and units stores are made to perform as a counter, so that the scan is moved successively from line to line at test pulse TP frequency.

Initially, test pulse TP was stored in the combination of hundreds, tens and units stores for the digits 111 by storing test pulse TP in the form of a 2 out of 5 code in each store.

The coding used for storing digits in each store of the counter is:

| Digit | Counter | | | | |
|---|---|---|---|---|---|
| | A | B | C | D | E |
| 1 | X | X | | | |
| 2 | | X | X | | |
| 3 | | | X | X | |
| 4 | | | | X | X |
| 5 | X | | | | X |
| 6 | X | | X | | |
| 7 | | X | | X | |
| 8 | | | X | | X |
| 9 | X | | | X | |
| 0 | | X | | | X |

X means test pulse TP stored.

There is an eleventh condition in the cycle when there is no storage in the counter. As the counters operate in a cycle of eleven, a scan of 1000 lines is made in $11 \times 11 \times 11 \times 100$ microseconds which equals 133.1 milliseconds.

In the units the digit 1 is stored by test pulse TP being written into the UA store 101 and UB store 103, FIG. 32. Likewise in the tens, test pulse TP is in the DA store 121 and DB store 122, FIG. 33, and in the hundreds, test pulse TP is in the CA store 123 and CB store 124, FIG. 34. The output of each of the stores in the hundreds, tens and units is also fed back as an input each to its own AND-gate, these gates having in common as the other input the PP pulse train lead 45 characterising the cord. For example, the output lead 104 of units UA store 101, FIG. 32, is applied to AND-gate 209 and units UB store 103 to AND-gate 210. This is done in order to provide the facility of stepping the counter once for each test pulse TP in order to scan the line successively.

Having stored test pulse TP in units UA store 101 and UB store 103 characterising the digit 1, it will be seen that the output of these stores via AND-gates 209 and 210 are fed back into the units stores for UB store 103 and UC store 211 characterising the digit 2. Test pulse TP on the output of AND-gate 209 is applied to AND-gate 212, FIG. 40 in the common equipment, to which test pulse TP on lead 90 is applied together with an output on the barred lead 213. Test pulse TP on the output of AND-gate 212 is then fed via OR-gate 95, lead 97 common to the five cords, AND-gate 99, FIG. 32, to which PP pulse of cord is applied on lead 45, and written via OR-gate 102 into units UB store 103. In like manner test pulse TP on output of units UB store 103 is fed via AND-gates 210, 214, FIG. 40, OR-gate 215, lead 216, AND-gate 217, FIG. 32, and OR-gate 218 and written into units UC store 211.

The outputs of units UB store 103 and UC store 211 feed back into UC store 111 and UD store 219 and so on.

Figure 40:
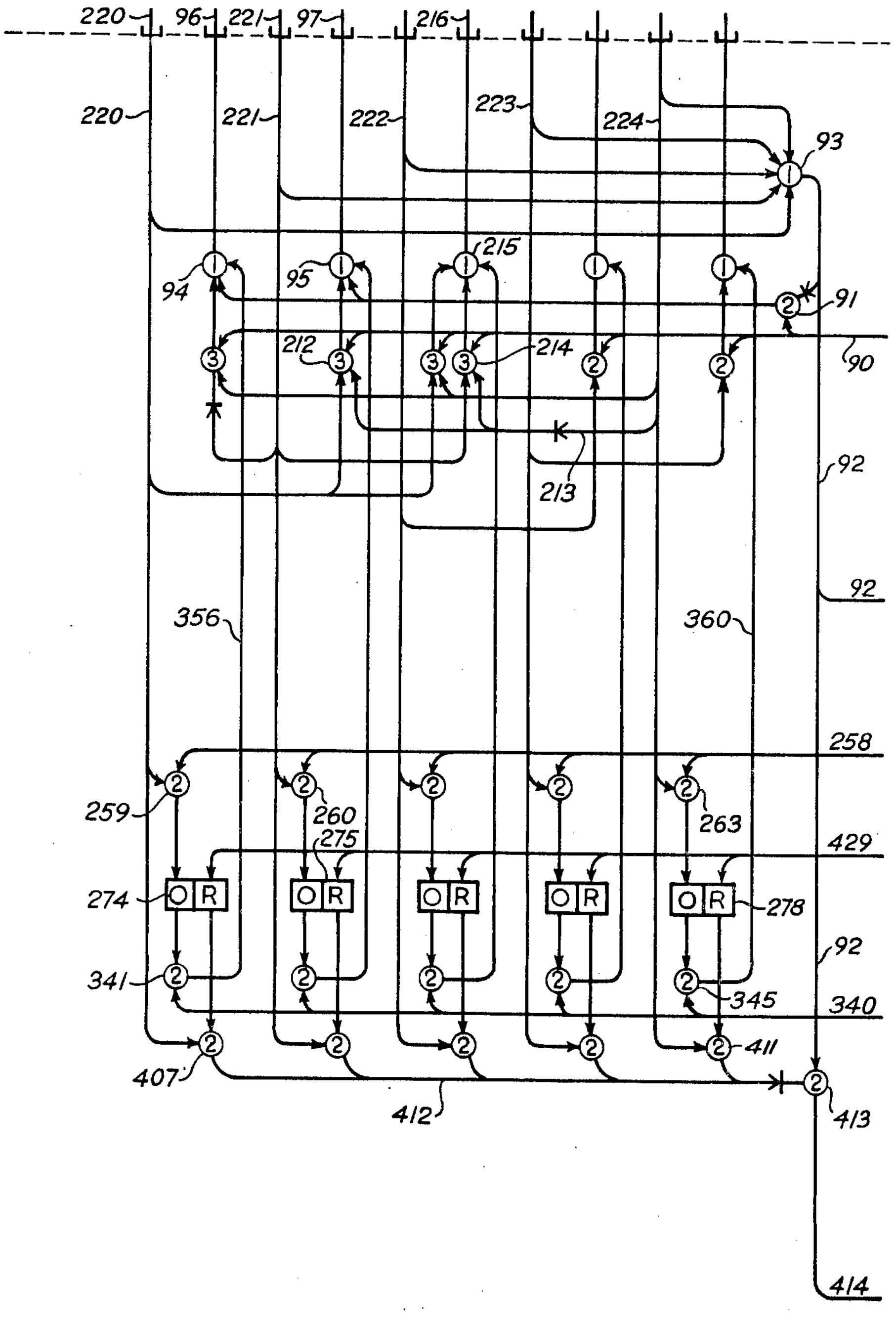

It should be noticed that each of the store outputs on leads 220, 221, 222, 223 and 224, FIG. 40, are applied to OR-gate 93 the output of which is lead 92. Thus whenever there is a digit stored, test pulse TP will appear on lead 92. In accordance with the coding used in the stores as previously given, after the digit 0 has been stored no test pulse is put into any of the stores at the next pulse time, i.e. the eleventh. When test pulse TP appears on lead 92 it inhibits AND-gate 106, FIG. 41, to which test pulse TP is also applied. AND-gate 106 is therefore opened only at the eleventh position of the units counter.

Otherwise the tens counter operates in a similar manner to that of the units. In the tens counter the outputs 225, 226, 227, 228 and 229, FIG. 33, in like manner to the units, are connected to OR-gate 230, FIG. 41, the output lead 111 of which is applied as inhibit to AND-gate 125, FIG. 42.

The hundreds counter operates in a similar manner, except that it is stepped only at the eleventh position of the tens counter.

Now assume that the scanning operation has arrived on line 2100 and that this line is found to be looped.

Test pulse TP will be stored in CA store 123 and CB store 124 of the hundreds, in DB store 122 and DE store 289 of the tens and in UB store 103 and UE 290 of the units.

Test pulse TP appears on lead 201, FIG. 24, applied as one input to line gates 202 and 203 and, because line 2100 is looped the other inputs of line gate 203 will be energised and the gate will be opened. Test pulse TP appears on output lead 231 which is common to the decade of lines 2100–2109. This common lead 231 is applied as one of the inputs to AND-gate 232, FIG. 25, the other input of which is lead 233 on which test pulse TP is also appearing. AND-gate 232 therefore opens and test pulse TP is connected to lead 234 common to sub-group of 100 lines which in turn is connected to each of the cords. For each cord, lead 234 is applied as one input to AND-gate 235, FIG. 28, the other input in each case being the group/cord indication on lead 158 from AND-gate 157. AND-gate 235 opens and test pulse TP passes via lead 236 to lead 237, FIG. 36, common to the five sub-groups, to lead 238 common to two groups, to lead 239 common to three blocks. Lead 239 is connected as input to pulse amplitude detector 240 in the cord responsible for scanning line 2100.

CALLING GROUP INDICATION AND MARKING OF CALLING LINE BUSY

Figure 38:
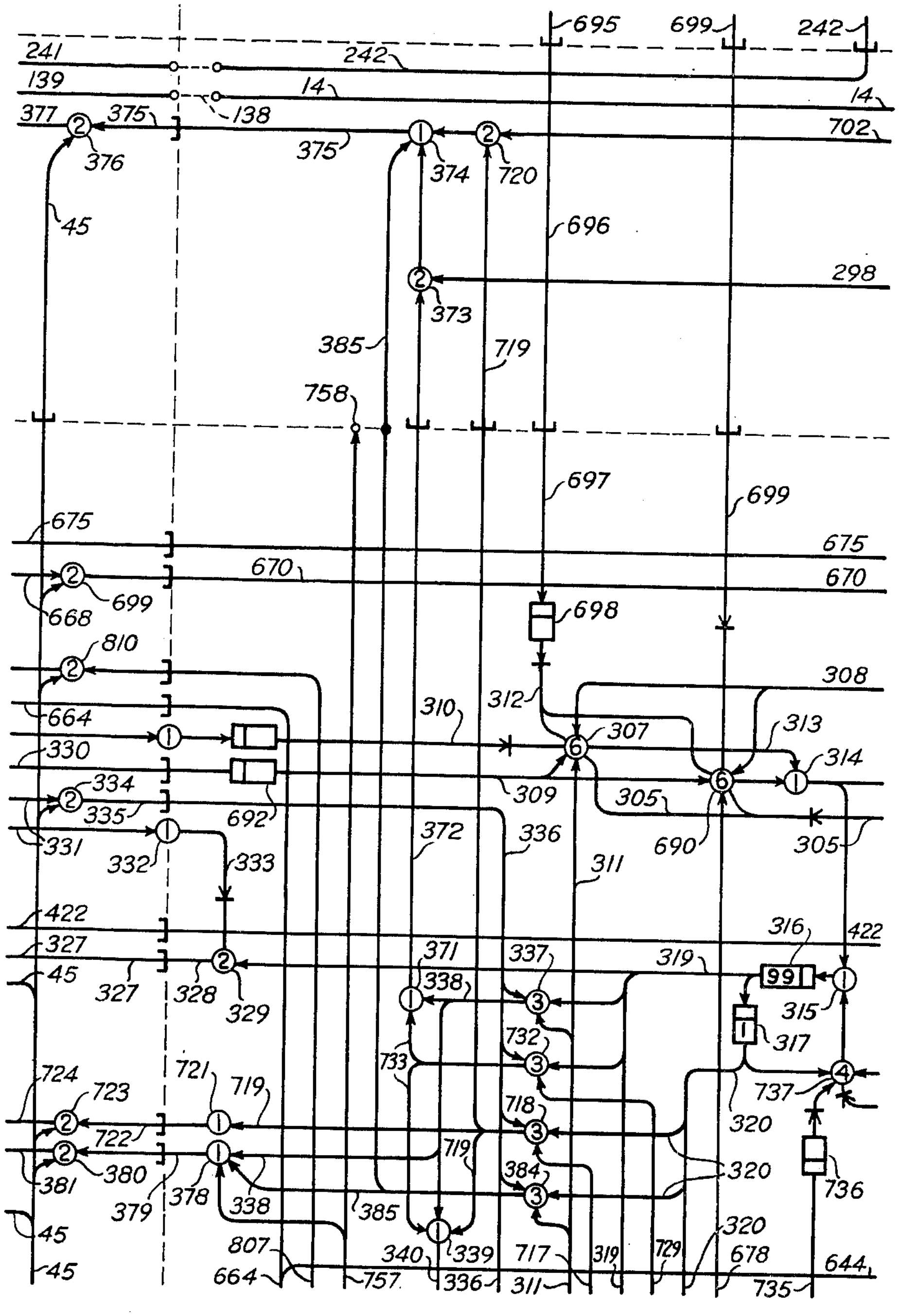

Test pulse TP on the output lead 241 of pulse amplitude detector 240 in the cord is connected to lead 242, FIG. 38, common to the two groups A and B of the 2 block. In each group lead 242 is connected as an input to AND-gate 243, FIG. 31, for group A. To AND-gate 243 is also connected as inputs, the test pulse TP on lead 14 so that AND-gate 243 reacts only to the test pulses produced by scanning, a lead 244 on which appears all channel pulse trains busy in the group concerned, toggles free lead 245 and lead 246 connected as inhibit.

Since only one line per block is scanned at a time, only one group per block is scanned at a time and test pulse TP will appear on lead 244 from lead 156.

On output lead 247 of AND-gate 243 will appear test pulse TP and via OR-gate 248 it will operate the calling line detected toggle 249 individual to the group.

Figure 39:
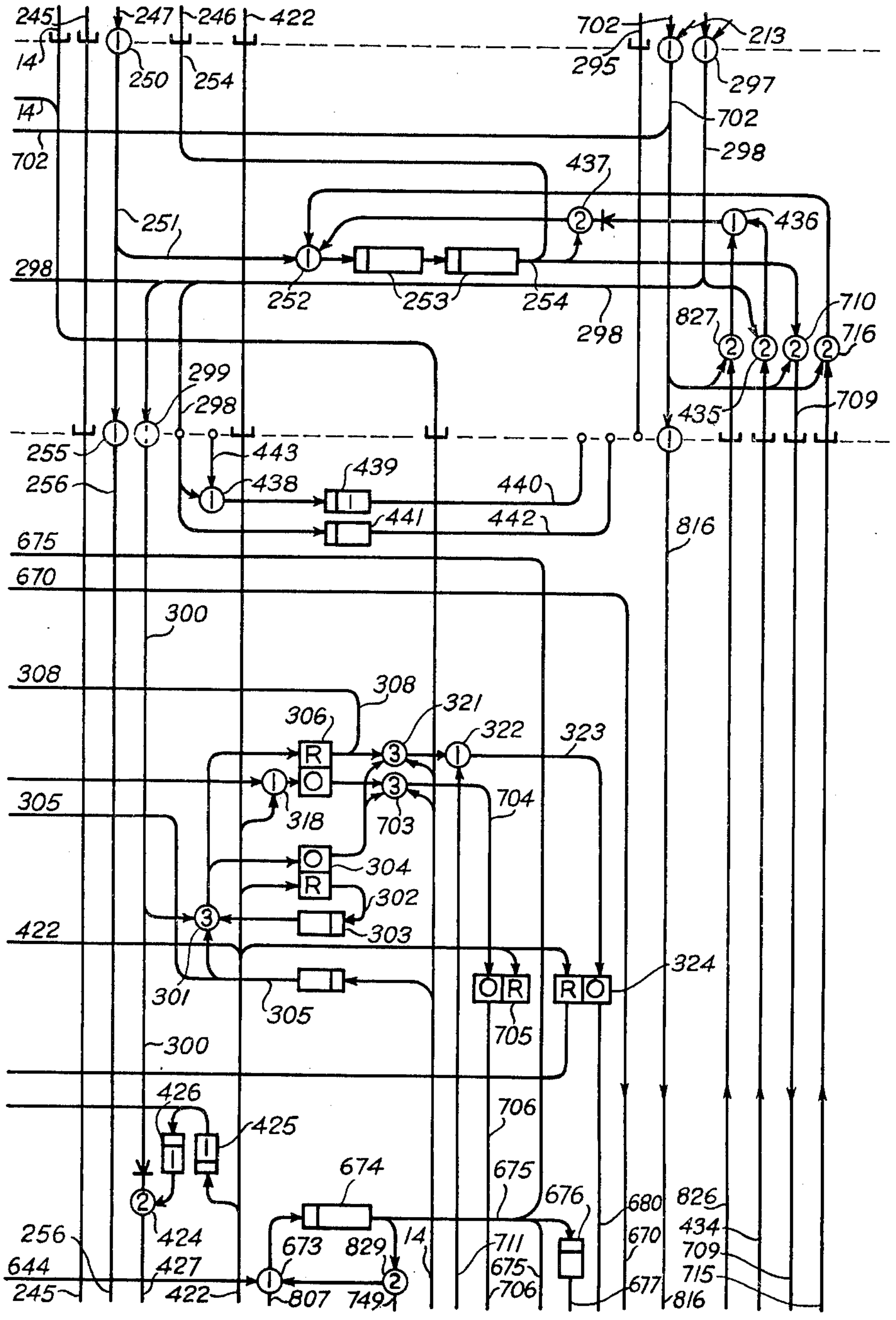

Test pulse TP on output lead 247 of AND-gate 243 is also connected via OR-gate 250, FIG. 39, to lead 251 and written via OR-gate 252 to busy line store 253. This store is individual to the block containing the group and has a cycle time of 2662 microseconds which is 1/50th of the 133,100 microseconds scan cycle but is not a multiple of the 100 microseconds test pulse TP repetition time. Therefore, when a test pulse is put into the busy line store 253 at the scan time of a specified line, it will circulate without coinciding again with the test pulse TP until the next time the line is scanned.

The output lead 254 of busy line store 253 is common to both groups of the block. In group A it is joined to lead 246 which is the inhibit input to AND-gate 243 in which the calling group was detected, so as to prevent further operation in this gate by the detected line.

Figure 31:
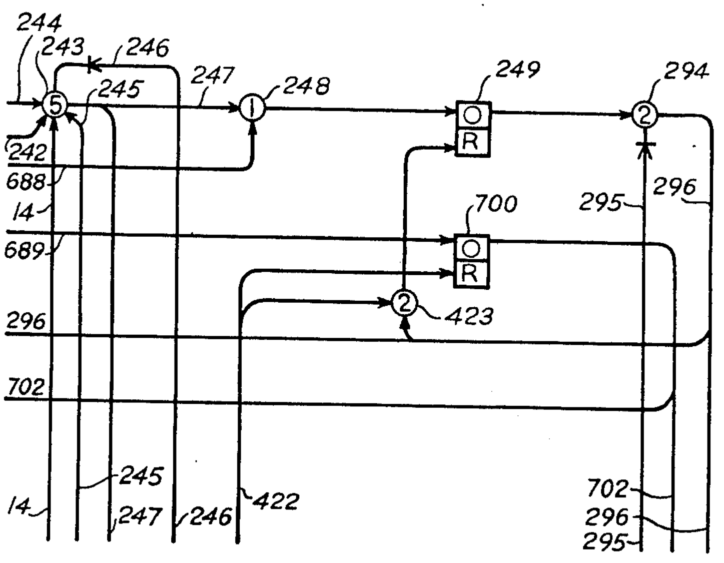

Test pulse TP on the output lead 247 of AND-gate 243, FIG. 31, through OR-gate 250, FIG. 39, to lead 251 is also passed via OR-gate 255 to lead 256 in the common equipment. This lead is connected to OR-gate 257, FIG. 47, the output of which is lead 258 connected in common to identify operate input AND-gates of which there are 15 per exchange, 5 for units, 259–263, FIG. 40, 5 for tens, 264–268, FIG. 41, and 5 for hundreds, 269–273, FIG. 42. Each of these 15 AND-gates has an associated identify toggle 274–288, FIGS. 40, 41 and 42, 274–278, FIG. 40, for the units, 279–283, FIG. 41, for the tens, and 284–288, FIG. 42, for the hundreds, the output of the associated gate in each case being applied to operate the toggle.

The other input to the identify operate input AND-gates, is in each case the output of its associated cord stores.

Thus test pulse TP on the output of the scanned stores in the cords is passed via an AND-gate, such as 209, FIG. 32, for units UA store 101, at the PP time of the cord on to common lead 220, FIG. 40, to the input of the identify operate input gate 259.

Figure 42:
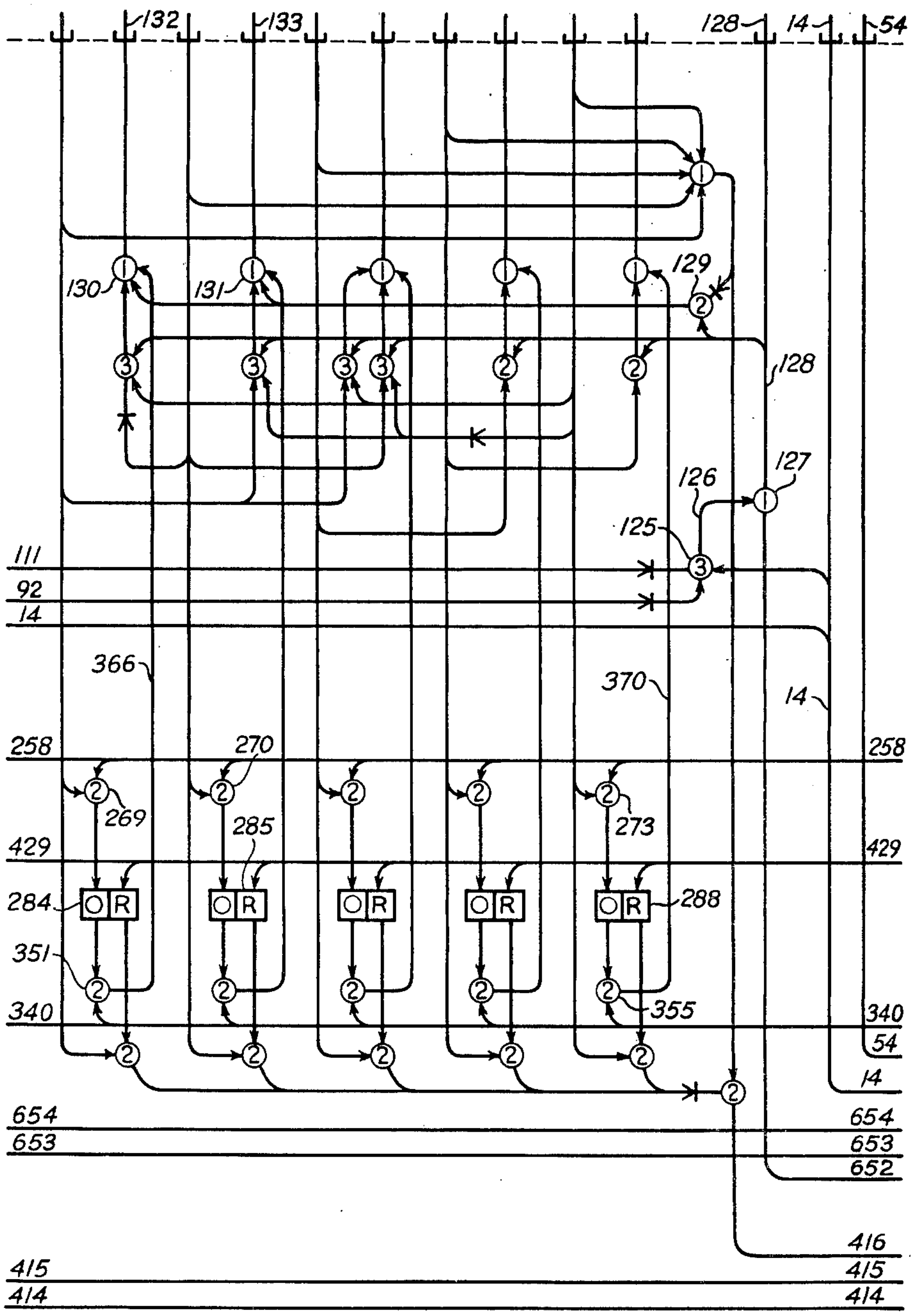
Figure 43:
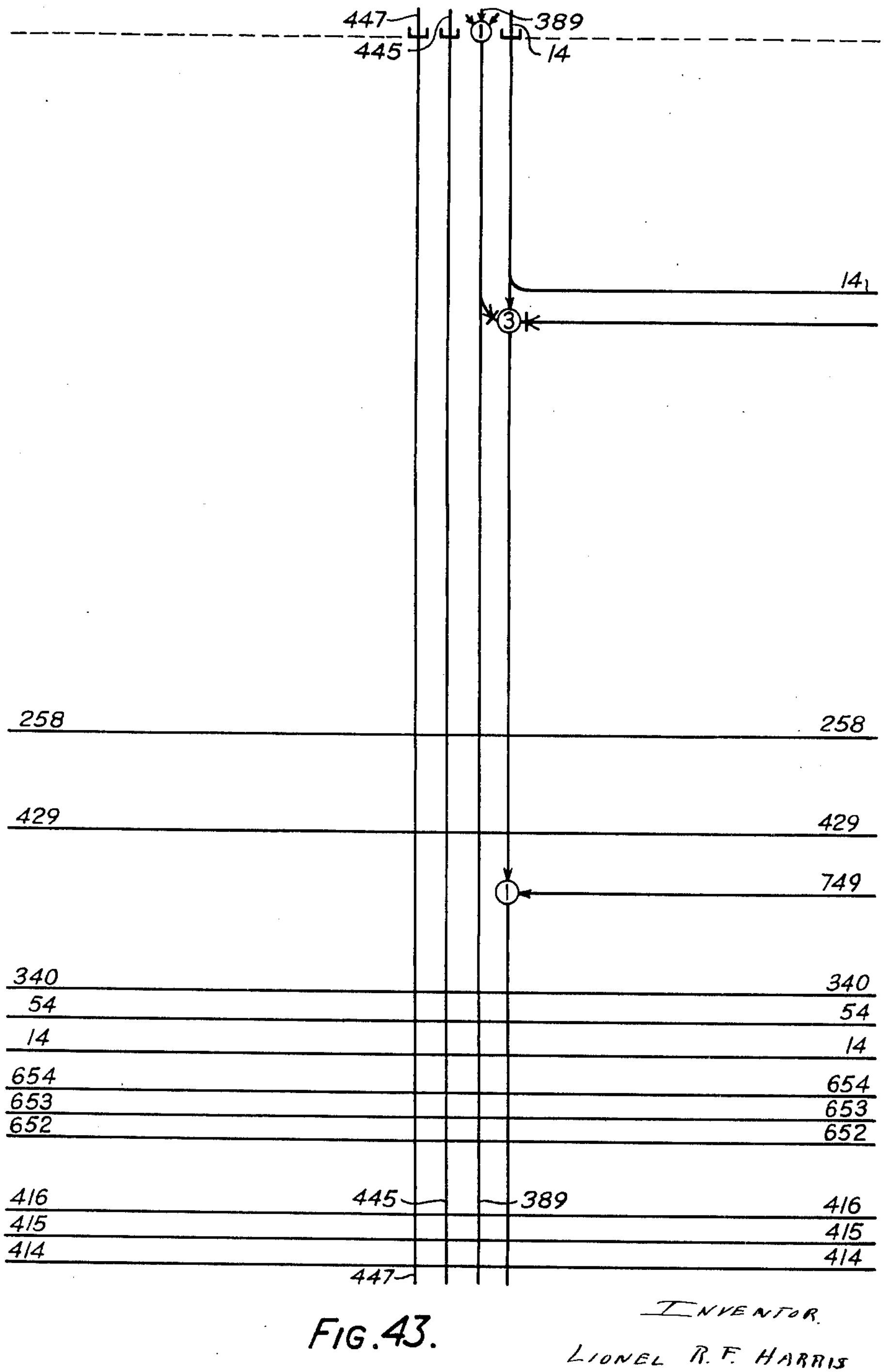

Remembering that line 2100 has been detected as looped, with test pulse TP stored in CA store 123 and CB store 124 in the hundreds counter, and in DB store 122 and DE store 289 in the tens counter and UB store 103 and UE store 290 in the units counter, and that test pulse TP is now appearing on lead 258, then the appropriate identify operate input AND-gates will be operated, 269 and 270, FIG. 42, in hundreds, 265 and 268, FIG. 41, in tens, and 260 and 263, FIG. 40, in units, at the PP time of the cord concerned.

The output of each of these operated AND-gates then operates the associated identify toggles, 284 and 285, FIG. 42, in hundreds, 280 and 283, FIG. 41, in tens, and 275 and 278, FIG. 40, in units.

The scanned line 2100 found to be looped is thus characterised by this pattern of operated identify toggles.

As there is only one set of identify toggles per exchange, they can be in use for one line only at a time.

The calling line now requires to be connected to register equipment, for which purpose a channel pulse train must be selected to connect it to a suitable cord. By "register" is meant a channel pulse train operating in the common equipment.

SELECTION OF INITIAL CHANNEL

Figure 47:
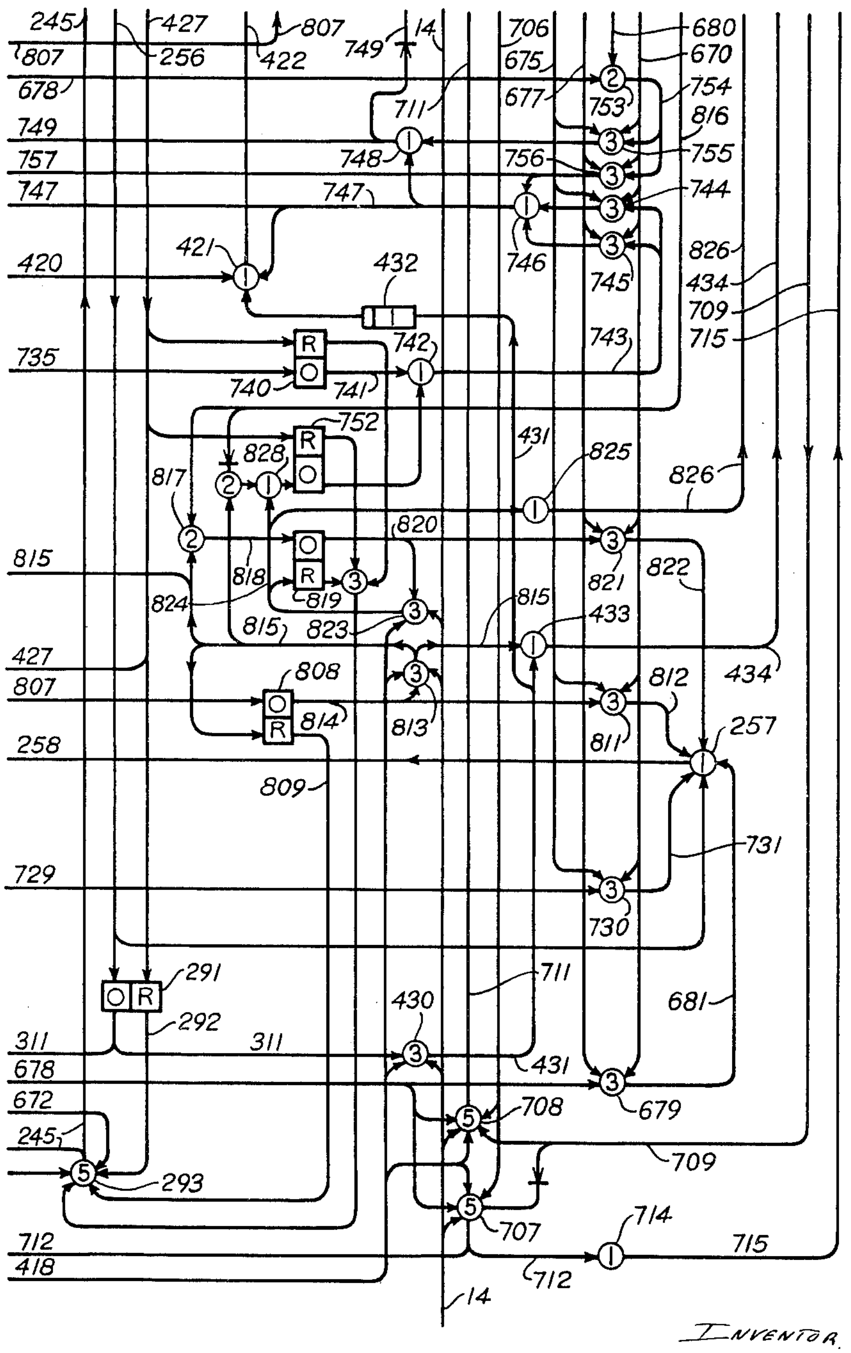

Test pulse TP on the output lead 247 of AND-gate 243, FIG. 31, that operated the calling line detected toggle 249 has already been described as being connected to OR-gates 250 and 255, FIG. 39, to lead 256 connected to OR-gate 257, FIG. 47. Lead 256 is also joined to operate the select initial toggle 291 in common equipment. Because reset output lead 292 of select initial toggle 291 is removed from AND-gate 293, the toggles free lead 245 is busied. The output of the calling line detected toggle 249 opens AND-gate 294, FIG. 31, (assume no inhibit condition on other input lead 295) whose output lead 296 is connected via OR-gate 297, FIG. 39, to lead 298 individual to the 2 block containing the calling line's group. This lead 298 with similar leads from the 3 and 4 blocks is joined via OR-gate 299 to common lead 300 which is connected to AND-gate 301 together with the reset output lead 302 via 1 microsecond delay 303 of the start selecting toggle 304 and the test pulse TQ on the ouput lead 305 of AND-gate 301 is applied to operate the start selecting toggle 304 and reset the channel selected toggle 306 if it is operated.

Also in the common equipment is an initial channel selector AND-gate 307, FIG. 38, having six inputs as follows:

(a) Reset output 308 of channel selected toggle 306.

(b) Lead 309 on which appears at Q-phase all channels free in any cord.

(c) Lead 310 on which appears as inhibition all channels already in use for register connection.

(d) Lead 311 the operate output of select initial toggle 291, FIG. 47.

(e) Lead 305 on which is test pulse TQ as inhibition.

(f) Lead 312 on which appears at Q-phase all channels busy in any group connected as inhibition.

When the select initial toggle 291, FIG. 47 is operated, its output on lead 311 allows the initial channel selector AND-gate 307, FIG. 38, to open and on the output lead 313 will appear at Q-phase all channels capable of connecting the group containing the detected calling line to any cord able to provide register facilities. The first channel pulse to appear on the output lead 313 of AND-gate 307 after this gate operates, is applied via OR-gate 314 and OR-gate 315 and is written into the channel selected store 316 and via OR-gate 314 and OR-gate 318, FIG. 39, to operate the channel selected toggle 306.

Operation of the channel selected toggle 306 removes the reset output 308 of this toggle 306 from the initial channel selector AND-gate 307 and this closes the gate.

A channel pulse train suitable for connecting the detected calling line's group to a cord able to provide register facilities is thus stored in the channel selected store 316. Although the selection was made and written into the store 316 at Q-phase, output 319 of the store 316, which is 99 microseconds long, is at P-phase and is also connected via a 1 microsecond delay 317 to give an output on lead 320 at Q-phase. Thus, both phases of the selected channel are available and will hereafter be designated as initial Sel P and initial Sel Q.

NO FREE CHANNELS AVAILABLE FOR INITIAL SELECTION

Channel selected toggle 306, FIG. 39, will still be in the reset condition after 100 microseconds, i.e., after all possible channels have been tried.

The start selecting toggle 304 was operated at test pulse TQ time and if at the next TP time the channel selected toggle 306 is still reset, the no free channels AND-gate 321 will open and pass test pulse TP via OR-gate 322 to the lead 323 to operate busy toggle 324. No further action is taken at this time but an emergency clearance is given later and this will be described under "Initial Release."

SELECTION OF INITIAL CORD

It is now necessary for a cord to be selected. Each cord has a cord selected toggle 325, FIG. 37, and an input to operate it is made via AND-gate 326, which has inputs:

(a) Lead 327 connected to lead 328 common to the five cords and output of AND-gate 329, FIG. 38, in common equipment, to which the P-phase output 319 of the channel selected store 316 is applied (inhibit lead not energised.)

(b) The PP pulse train lead 45 characterising the cord.

(c) Lead 330 on which appears the free channels at P-phase in the cord.

The initial Sel P on lead 319 is therefore offered to each cord at its PP pulse time. As soon as a cord is found in which the initial Sel P is free, input AND-gate 326 will open and operate the cord selected toggle 325, the output lead 331 of which via OR-gate 332 and common lead 333 inhibits AND-gate 329, FIG. 38, in common equipment, to prevent selecting more than one cord.

The output is also applied to AND-gate 334 to which is applied the PP pulse train lead 45 of the cord, so that the PP pulse train appears on the output lead 335 of this gate and is connected to common lead 336 in common equipment.

CONNECTION OF CALLING LINE TO CORD

The output of select initial toggle 291, FIG. 47, already operated, is applied on lead 311 to AND-gate 337, FIG. 38, and to this gate are also applied the common lead 336 denoting the intial selected cord and lead 319 denoting the initial Sel P. AND-gate 337 opens and initial Sel P at PP time of the cord on its output lead 338 is connected via OR-gate 339 to lead 340 which is connected in common as one input to the fifteen identifying operate output AND-gates 341–355, FIGS. 40, 41 and 42, associated with the identifying toggles 274–288.

Gates 341–345, FIG. 40, are for units, 346–350, FIG. 41, for tens, and 351–355, FIG. 42, for hundreds.

The other input to each of these AND-gates 341–355 is the operate output of the associated identify toggle. The output leads 356–370 of the AND-gate 341–355 are taken via OR-gates to each of the cords and in each cord is gated by the PP pulse of the cord to the input of the cord's stores. For example, the output lead 356 of AND-gate 341, FIG. 40, via OR-gate 94 and lead 96 is taken to each of the five cords. In the cord shown in the drawing it is gated by PP1 pulse train on lead 45 through AND-gate 98, FIG. 32, to input OR-gate 100 of units UA store 101.

As the detected calling line 2100 is identified by a combination of operated identify toggles, the initial Sel P at PP time of initial selected cord on lead 340 will appear on the output of the identify operate output gates connected to the operated identify toggles and be gated by the PP pulse of the initial selected cord into the cord's stores corresponding to the operated identify toggles.

Thus the initial Sel P is written into the hundreds, tens and units stores of the initial selected cord, in the combination characterising the digits of the detected calling line's number.

It is also necessary to write the initial Sel P into the initial selected cord's thousand store corresponding to the thousand digit of the calling line. The output, initial Sel P at PP time of initial selected cord, of AND-gate 337, FIG. 38, is connected via OR-gate 371 to lead 372 common to the three blocks. In each block this lead is applied to an AND-gate, such as 373 in the 2 block, to which is also applied lead 298, and to which is connected via OR-gate 297 the output of the calling line detected toggle 249, FIG. 31, in each group. Calling line detected toggle 249 being operated for group 2, AND-gate 373, FIG. 38, is opened and initial Sel P at PP time of initial selected cord on lead 372 is passed via OR-gate 374 to lead 375 common to the five cords. In each cord this lead 375 is connected to AND-gate 376 to which the cord's PP pulse train is also connected on lead 45. Only in the initial selected cord therefore will AND-gate 376 be opened allowing the initial Sel P via lead 377, FIG. 37, and OR-gate 140 to be written into the thousand M2 store 141 for the 2 block.

Output lead 338 of AND-gate 337 is also connected via OR-gate 378 to lead 379, FIG. 38, common to the five cords and in each cord this lead 379 is connected to AND-gate 380 to which is also applied the PP pulse train of the cord. In the initial selected cord the initial Sel P will appear on lead 381 and via OR-gate 382, FIG. 37, be written into the register store 383.

The output of select initial toggle 291, FIG. 47, already operated, is also applied on lead 311 to AND-gate 384, FIG. 38, the other inputs of which are initial Sel Q on lead 320 and the PP pulse train of initial selected cord on lead 336, and the output lead 385 is applied to OR-gate 378 (to which the output of AND-gate 337 is also applied) so that in this case intitial Sel Q is written into the initial selected cord's register store 383, FIG. 37.

At the moment therefore we have:

(a) A combination of the identify toggles 274–288 operated in accordance with the detected calling line's number.

(b) Initial Sel P stored in the initial selected cord's thousands, hundreds, tens and units stores, and in the register store 383.

(c) Initial Sel Q stored in the initial selected cord's register store 383.

SENDING OF DIAL TONE TO CALLING LINE

It should be remembered that it is predetermined that lines connected to dial tone are stored in the 2 block lines connected to busy tone in the 3 block and lines connected to N.U. tone in the 4 block.

Lead 385, FIG. 38, is applied via OR-gate 374 to lead 375 common to the five cords. In each cord this lead 375 is applied to AND-gate 376 to which is also applied the PP pulse train of the initial selected cord, so that initial Sel Q on lead 375 is gated to lead 377 and via OR-gate 140, FIG. 37, written into the thousand M2 store 141 of the initial selected cord. Output lead 142 of thousand M2 store 141 is connected to AND-gate 386, FIG. 36, in the cord and the other inputs to this gate are:

(a) Dial tone lead 387 from common equipment.

(b) Q-phase pulse train lead 388 from common equipment.

(c) Output lead 389 of cord's register store 383.

Thus initial Sel Q modulated by dial tone appears on output lead 390 of AND-gate 386 and is connected via OR-gate 391 to the outward speech path 392 common to the three blocks, and in each block to lead 393 common to the two groups forming the block and in each group to lead 394 applied to AND-gate 395, FIG. 28. The other input to AND-gate 395 is lead 396 on which appears initial Sel Q derived from initial Sel P on group/cord indication lead 156 via AND-gate 157 and 1 microsecond delay 397. Output of AND-gate 395 is lead 398 common to the five sub-groups.

In each sub-group this lead 398 is connected to AND-gate 399 to which is also applied the marking lead 197 and sub-group 21 and on which appears initial Sel Q. Thus, the dial tone modulated Q-phase pulse train is gated on to sub-group lead 400 common to the five cords, which is connected to common lead 401, FIG. 27, this lead being common to the five cords and to sub-group 21.

In sub-group 21 lead 401 is connected as an input to AND-gate 402, FIG. 25, this gate serving the ten lines 2100–2109 and there are ten such gates.

AND-gate 402 is also marked by initial Sel Q on lead 403 due to the storage of digit 0 in the cord's tens store. The dial tone modulated Q-phase is therefore passed to output lead 404 of AND-gate 402, this lead being common to the ten lines 2100–2109.

Each line is connected to an AND-gate, such as 205, FIG. 24, for line 2100, which is marked by initial Sel Q on lead 204 because of the storage of digit 0 in the cord's units store. AND-gate 205 is opened and the dial tone modulated Q-phase is applied to demodulator 405 of the line's equipment. Thus line 2100 receives dial tone via out speech path 406 and hybrid 207.

It should be remembered that from the moment the calling line was detected under scan condition and the number of the calling line identified on the identify toggles, no other line could be detected as calling, until the toggles are released.

Having now given the detected calling line dial tone, it is necessary to release the common equipment for further use with another line.

INITIAL RELEASE

Each of the identify toggles 274–288, FIGS. 40, 41 and 42, has an associated output gate connected to its reset output. The other input to each of these gates is common to the five cords and on it will appear at PP times of the cords, the output of the associated cord store. Consider the units identify toggles 274–278, FIG. 40. Each controls AND-gates 407–411 and each gate has two inputs, one from the reset of the identify toggle and the other from the output 220–224 of the cord's stores. The outputs of AND-gates 407–411 are commoned on lead 412 and applied as inhibition to AND-gate 413 the other input being lead 92 on which appears via OR-gate 93, at PP times of the cords, all pulses stored in the cords' stores. If no identify toggles are operated, each of the gates 407–411 will be open and on their own output lead 412 will appear all of the pulses appearing on the lead 92, in which case there will be no output from AND-gate 413 on lead 414. Any identify toggle that is operated however, will prevent the associated gate from opening and the pulse from the associated cord store will not appear on the common output lead 412 and the same pulse on lead 92 will be gated through AND-gate 413 to output lead 414.

Corresponding circuits associated with the tens and hundreds will similarly put pulses in identified stores onto leads 415, FIG. 41, for the tens and 416, FIG. 42, for the hundreds.

Figure 46:
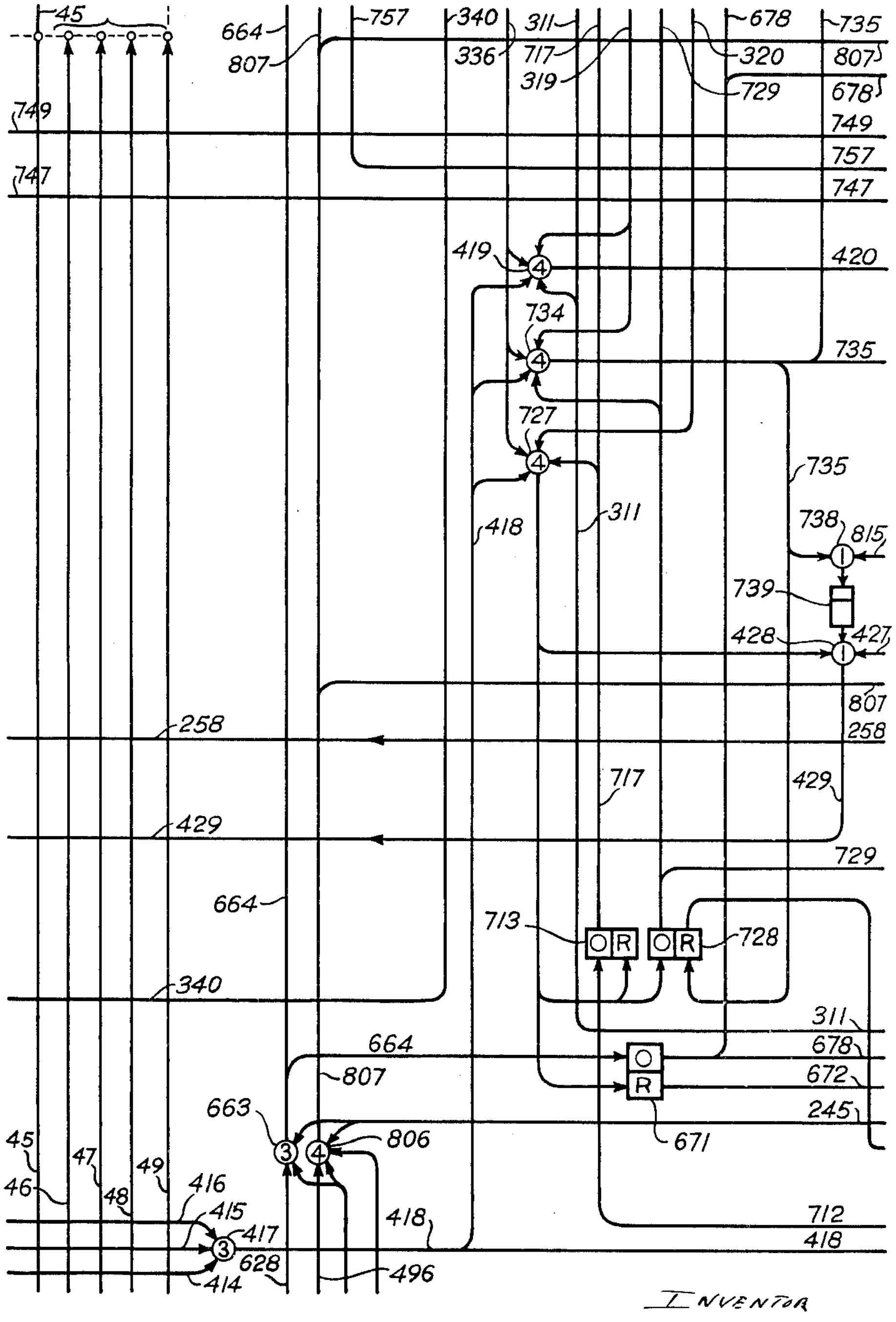

Leads 414, 415 and 416 are connected to AND-gate 417, FIG. 46, on whose output lead 418 will appear at PP time of the cord the channel pulse stores in the cord, in the same combination as the combination of operated identify toggles in the common equipment.

Thus the appearance of initial Sel P at PP time of the initial selected cord on lead 418 is an indication that initial Sel P has been written into the initial selected cord. Lead 418 is connected as one input to AND-gate 419 the other inputs being:

(a) Lead 336 from cord selected toggle 325, FIG. 37.

(b) Lead 319 from channel selected store 316, FIG. 38.

(c) Lead 311 from select initial toggle 291, FIG. 47.

On the output lead 420 of AND-gate 419 will therefore appear initial Sel P at PP time of the initial selected cord and this is connected via OR-gate 421, FIG. 47, to lead 422, FIG. 39, which resets the start selecting toggle 304, FIG. 39, the calling line detected toggle 249 via AND-gate 423, FIG. 31, and the cord selected toggle 325, FIG. 37.

Reset of calling line detected toggle 249, FIG. 31, clears lead 298 and therefore lead 300, which opens AND-gate 424, FIG. 39, and allows the P-phase pulse train on lead 422 (delayed 2 microseconds by 425 and 426 to allow toggle operation) to appear on lead 427, which resets the select initial toggle 291, FIG. 47.

Lead 427 is also connected via OR-gate 428, FIG. 46, to lead 429 which is connected in common to the identify toggles 274–288, FIGS. 40, 41 and 42. The operated identify toggles restore and with the select initial toggle 291, FIG. 47, reset, the AND-gate 293 is again opened, giving "toggles free" condition on its output lead 245.

The common equipment is now released from the detected calling line and is free to be used again as required.

EMERGENCY CLEARANCE UNDER CONDITION OF NO FREE CHANNELS AVAILABLE WHEN INITIAL SELECTION IS MADE

The detected calling line will have been marked busy in busy line store 253, FIG. 39, and its combination of toggles in identify toggles 274–288, FIGS. 40, 41 and 42, will have been operated. The select initial toggle 291, FIG. 47, will still be operated and if this condition exists until the next time the line is scanned, test pulse TP will appear on lead 418, FIG. 46, since the identify toggles are operated. Lead 418 is connected to AND-gate 430, FIG. 47, to which the output lead 311 of select initial toggle 291 and test pulse TP lead 14 are also applied. Test pulse TP is therefore gated on to the output lead 431 and passes via 1 microsecond delay 432 and OR-gate 421 to lead 422 to reset the various toggles as already described.

In this case however it is also necessary to remove the busy condition for the line from the busy line store 253, FIG. 39, so the test pulse TP on lead 431 is connected via OR-gate 433, FIG. 47, to lead 434 connected to AND-gate 435, FIG. 39. Here it is gated by lead 298 to OR-gate 436 to inhibit AND-gate 437, the circulating gate of busy line store 253. Test pulse TP on lead 431 is delayed by 1 microsecond delay 432, FIG. 47, before being connected to lead 422 to ensure that the busy line store 253 is cleared via AND-gate 437 before the calling line detected toggle 249 is reset and closes AND-gate 437.

SIMULTANEOUS DETECTION OF CALLING LINES

Since all three of the blocks are scanned simultaneously using the same test pulse TP, two or more calling line detected toggles 249, FIG. 31, may be operated at the same time. Each of the lines concerned, with of course the same hundreds, tens and units digit, will simultaneously be marked busy and the select initial toggle 291, FIG. 47, will be operated as will be the combination of identify toggles. In this case it is arranged that the 2 block is given priority over the 3 and 4 blocks and that the 3 block is given priority over the 4 block. The output of each of the two calling line detected toggles 249, FIG. 31, of a given block are each connected to AND-gate 294 to each of which is also applied inhibition lead 295 individual to the block. If either or both of the calling line detected toggles 249 in the 2 block is/are operated only, the output will appear on lead 298 and via OR-gate 438, FIG. 39, and 1 microsecond delay 439 appear on lead 440 as inhibition on each of the gates in the 4 block. Lead 298 is also connected directly via 1 microsecond delay 441 to lead 442 as inhibition on each of the gates in the 3 block. If either or both of the calling line detected toggles 249, FIG. 31, in the 3 block is/are operated only, then the output on lead 443 via OR-gate 438 and 1 microsecond delay 439 will appear on lead 440.

Thus, if under scan conditions lines in each of the three blocks are detected as calling, then the 2 block takes priority, the leads 440 and 442 being both energised. If lines in only the 2 and 3 blocks are detected, the condition will be the same. If lines in only the 3 and 4 blocks are detected, then the 3 block takes priority and lead 440 will be energised.

Leads 440 or 442 energised, also prevents lead 422 from resetting the calling line detected toggle 249 of the block to which they refer because with AND-gate 294 energised, there is no output on lead 296 to open AND-gate 423 to which lead 422 is applied.

Thus if corresponding lines in more than one block are simultaneously detected as calling, all the appropriate calling line detected toggles 249 will be operated and the lines concerned will be marked busy in the busy line stores 253 involved, but only the calling line detected toggle 249 in the lowest numbered block will be immediately effective. Setting up will proceed for the preferred line and initial release as already described will follow when output condition is given on lead 420 of AND-gate 419 which via OR-gate 421 gives the clearing signal on lead 422 which resets the calling lines detected toggle 249 of the preferred line only. This removes the inhibition condition from next block in order of preference and since a calling line detected toggle 249 is also operated in this block lead 300 will be re-energised to inhibit AND-gate 424 and so prevent reset conditions being given on output lead 427. The select initial toggle 291, FIG. 47, therefore remains operated, preventing "toggles free" condition from being given by AND-gate 293. This ensures that the scanning operation will continue to ignore any lines detected as calling.

The equipment is now in exactly the same state as would have been reached had the second calling line just been detected under scan condition, and initial set-up will proceed normally.

If initially a line in the third block had also been calling, it will have been held on its calling line detected toggle 249 and will be dealt with in turn as just described. Whichever condition exists, as soon as neither of the leads 440 and 442 is energised, initial set-up conditions will proceed for the line next found to be calling under scan condition. Thus if more than one simultaneously scanned line is detected as calling, no other line can be given initial connection until the simultaneously detected lines have all been dealt with in the prearranged order.

RECEIPT OF DIALLED PULSES

As already described the number of the calling line is remembered by initial Sel P being stored in a combination of the initial selected cord's stores characterising the number and the output of these stores marks the calling line's line equipment AND-gates, such as 202, 203 and 205, FIG. 24, for line 2100. This initial Sel P is applied via AND-gate 203 through AND-gate 232, FIG. 25, to lead 234, through AND-gate 235, FIG. 28, to leads 236, 237, 238 and 239, FIG. 36, to the input of the pulse amplitude detector 240 in the initial selected cord. The pulse amplitude detector 240 is arranged to detect pulse amplitude and pass to its output lead 241 only those pulses having an amplitude greater than a pre-arranged value. In effect this means that when a line is looped, pulses appear at the pulse amplitude detector 240 at their full amplitude and are passed to the output lead 241, but when the line loop is broken under dialling condition, the pulses will be cut off because AND-gate 203 will be closed, and the pulses will therefore not appear on output lead 241 of the pulse amplitude detector 240. At the moment, with the line looped, initial Sel P appears on the output of the pulse amplitude detector 240 in the initial selected cord.

Figure 35:
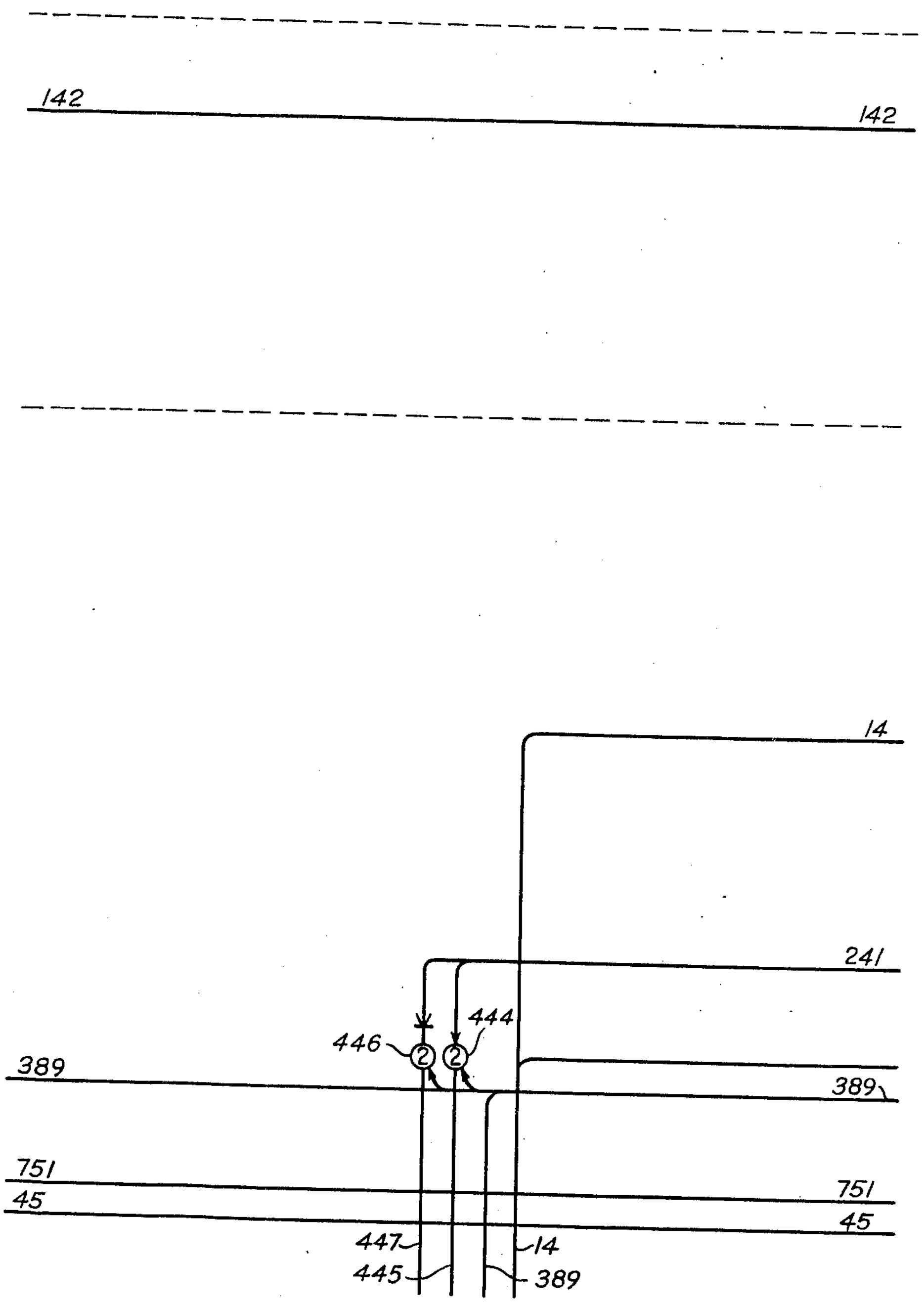

Output lead 241 is connected as an input to AND-gate 444, FIG. 35, to which is also applied output lead 389 of the cord's register store 383, FIG. 37. If therefore the calling line is looped, initial Sel P from register store 383 will appear on output lead 445 of AND-gate 444 every 100 microseconds. Output lead 241 is also connected as inhibition to AND-gate 446 to which the output lead 389 of the cord's register store 383 is also applied. When therefore the line loop is broken and there is no output from pulse amplitude detector 240, initial Sel P from the register store 383 appears on output lead 447 of AND-gate 446 every 100 microseconds. From the indications received on these two leads 445 and 447, dial pulses are detected and counted and interdigit pause period is also detected.

Figure 48:
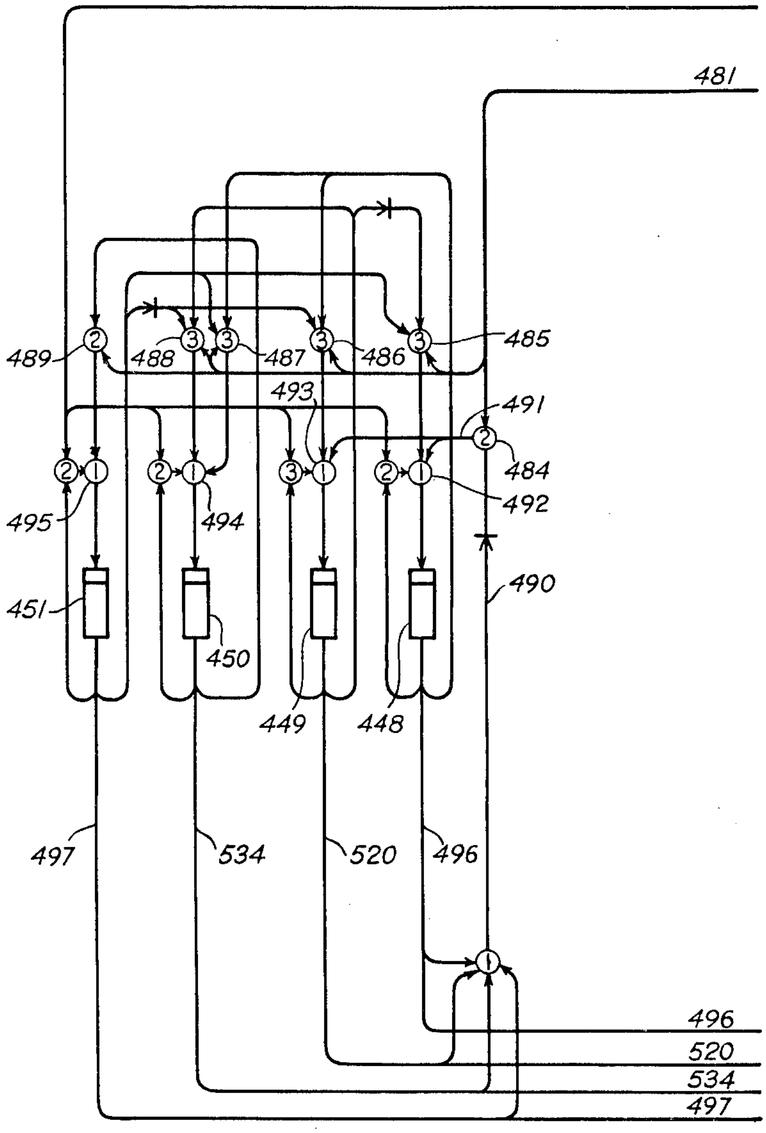

Two counters are provided which count delay line store length times, one for the duration of the loop condition of the line and the other for the duration of the break condition of the line. Both are available at the same time but cannot operate simultaneously. When either reaches a predetermined count, it causes its appropriate condition to be noted and then clears the other counter. The loop condition, or "make" timer, must have sufficient duration to detect a genuine interdigit pause period, as well as to detect the normal "make" period between the dial "break" periods. The digit count is advanced when dial break is detected and detection of another digit pause period steps a "digit distributor" governing the digit counters. Timing is carried out using four 1100 microsecond delay line stores 448, 449, 450 and 451, FIG. 48, provided with gates to form a four-stage counter and operating according to the following code:

| Counter Position | Counter Stores | | | |
|---|---|---|---|---|
| | 448 | 449 | 450 | 451 |
| 1 | X | X | ------ | ------ |
| 2 | ------ | X | X | ------ |
| 3 | ------ | ------ | X | X |
| 4 | X | ------ | ------ | X |
| 5 | X | ------ | X | ------ |
| 6 | ------ | X | ------ | X |
| 7 | ------ | ------ | ------ | ------ |

X means channel pulse stored.

Any channel pulse (100 microsecond spacing) can appear in any of eleven positions in each 1100 microseconds delay line store, these positions being specified by the PP pulse period in which they occur. By applying a channel pulse gated with a PP pulse to the input of the counter, it will be made to step once every 1.1 milliseconds. The PP pulse positions are allocated to different functions as follows:

PP1–5 are used to characterise the five cords as already stated.
PP6 for dial break timing.
PP7 for dial make timing.
PP8 for first stage of interdigit pause period timing.
PP9 for second stage of interdigit pause period timing.
PP10 for digit distributor.
PP11 for count of first dialled digit. This digit is either 2, 3 or 4 if genuine. Other digits are counted at PP10 time in hundreds, tens and units counters already described.

Figure 49:
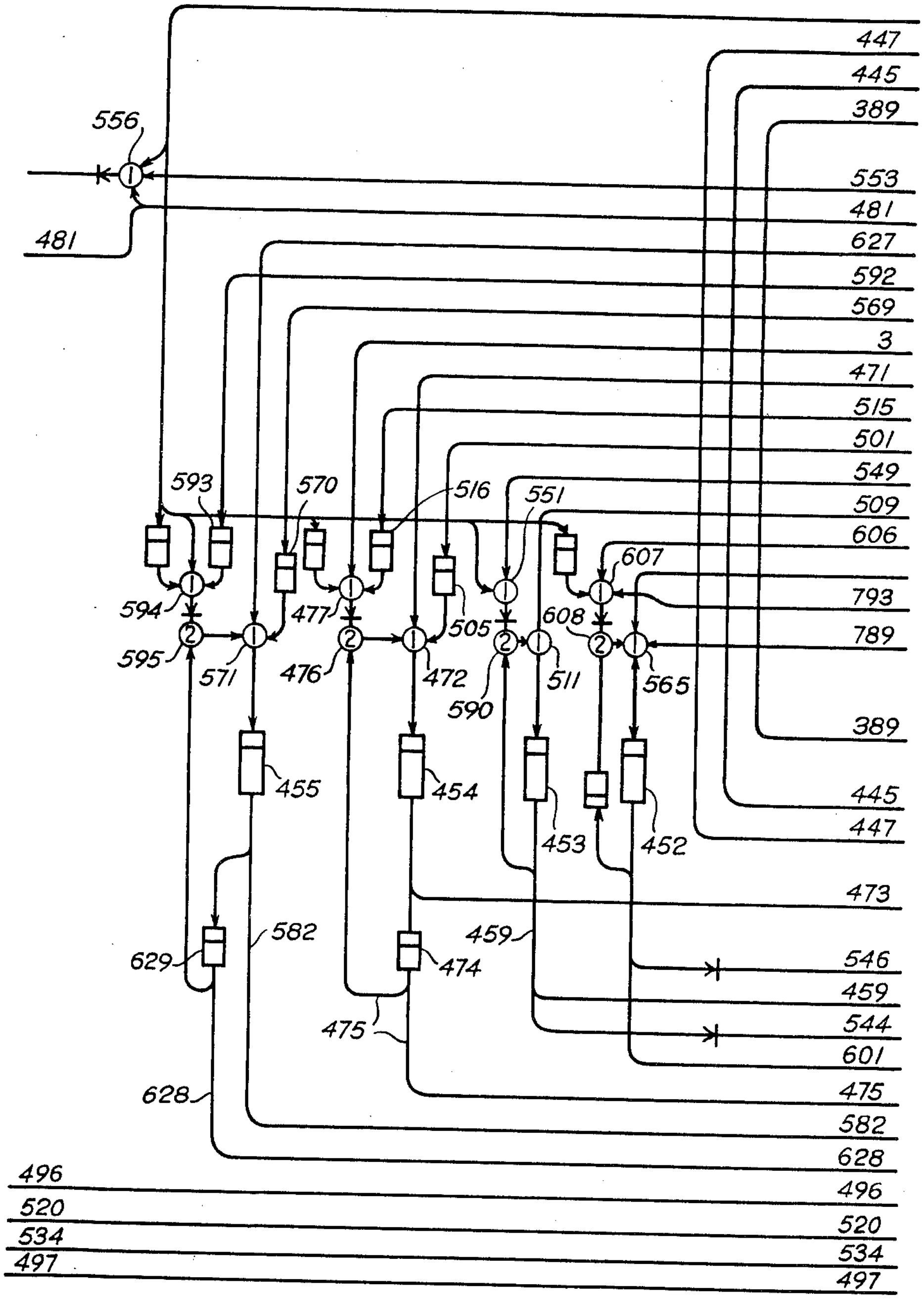

Auxiliary 1100 microseconds stores 452 and 453, FIG. 49, are also provided, together with 100 microseconds transfer stores 454 and 455.

Consider the condition where the calling line has been connected to a cord but the first dial break has not yet occurred. Initial Sel P is appearing on lead 445 but not on lead 447. Lead 445 is connected as one input to AND-gate 456, FIG. 50, to which are also connected output lead 463 of AND-gate 457 and inhibition lead 469 the output of auxiliary store 453, in which at the moment nothing is stored. AND-gate 456 is opened at PP6 time and passes initial Sel P via OR-gate 470 to the output lead 471 and via OR-gate 472, FIG. 49, writes it into the transfer store 454. The output lead 473 of transfer store 454 is connected to a 1 microsecond delay 474, in order to have both the P and Q-phase outputs available.

Figure 50:
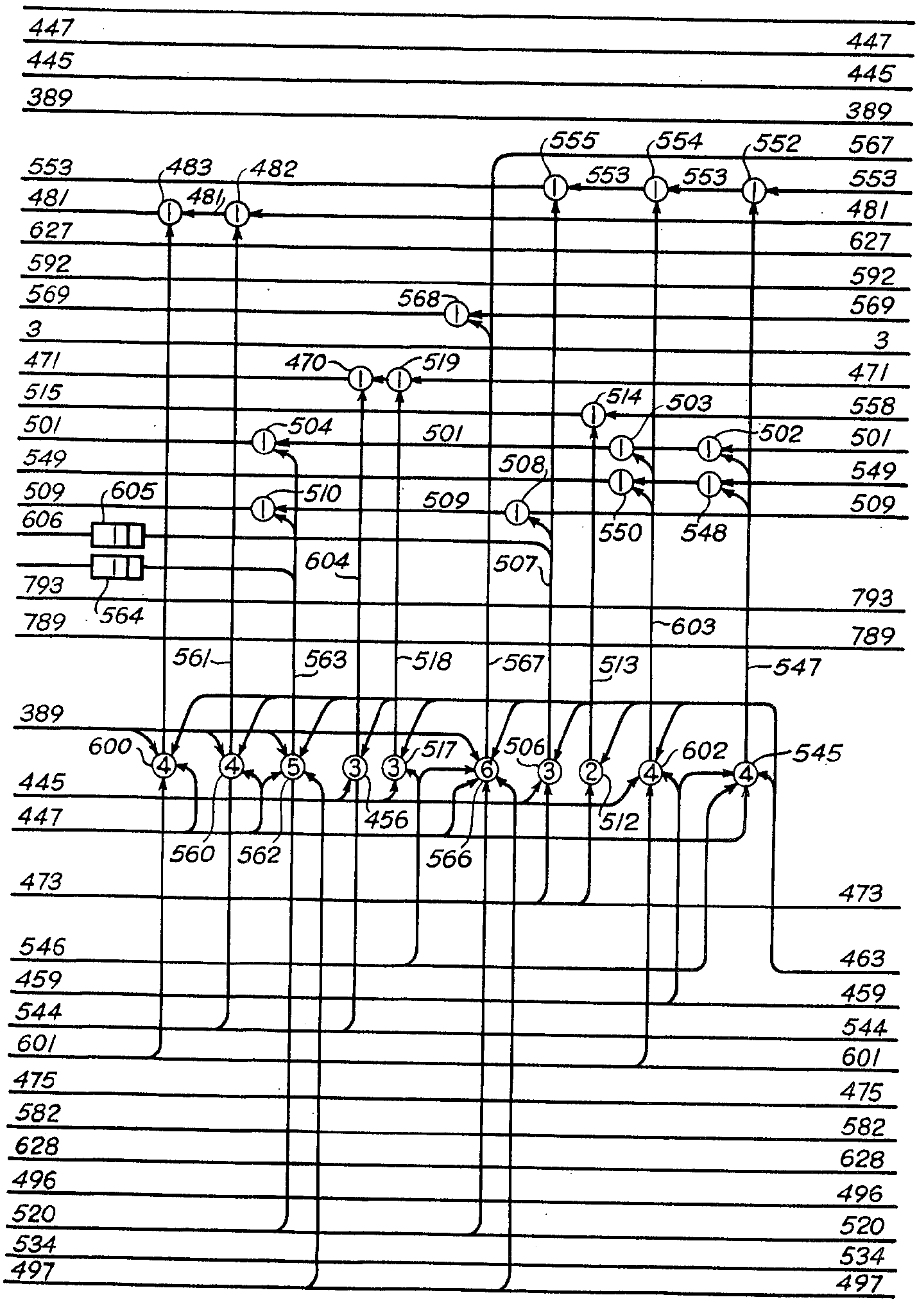

Initial Sel P inserted at PP6 time into transfer store 454 will appear after 100 microseconds and therefore at PP7 time, on the output lead 475 of the 1 microsecond delay 474 and this output is applied to AND-gate 476, FIG. 49, to which is also applied as inhibition via OR-gate 477 the P-phase pulse train on lead 3. AND-gate 476 is therefore not opened with the result that the P-phase pulse written into transfer store 454 at PP6 time appears once only on output lead 475 of the 1 microsecond delay 474 at PP7 time. Output lead 475 is also applied as one of the inputs to AND-gate 478, FIG. 51, the other input of which is lead 464, i.e., the P-phase pulse train at PP7 time. AND-gate 478 opens at PP7 time and initial Sel P appears on output lead 479 connected via OR-gate 480 to lead 481 which, via OR-gates 482 and 483, FIG. 50, is connected to AND-gates 484, 485, 486, 487, 488 and 489, FIG. 48. Only gate 484 opens because the other input, inhibition lead 490, is not energised and initial Sel P appears on output lead 491 and via OR-gates 492 and 493 is written into counter stores 448 and 449, that combination representing position 1. This starts make timing for initial Sel P. The output of any of the counter stores 448–451 closes the AND-gate 484.

Provided the loop condition persists on the line, initial Sel P will again appear on lead 481 at the next PP7 time. This time because of the storage already in counter stores 448 and 449, AND-gate 484 is closed, but AND-gates 486 and 488 will open and initial Sel P will be written via OR-gate 493 into counter store 449 and via OR-gate 494 into counter store 450, representing position 2. Similarly, provided the loop condition persists initial Sel P will be written into counter stores 450 and 451 representing position 3, via AND-gates 488 and 489 and OR-gates 494 and 495 into counter stores 448 and 451 representing position 4, and into counter stores 448 and 450 representing position 5.

Figure 51:
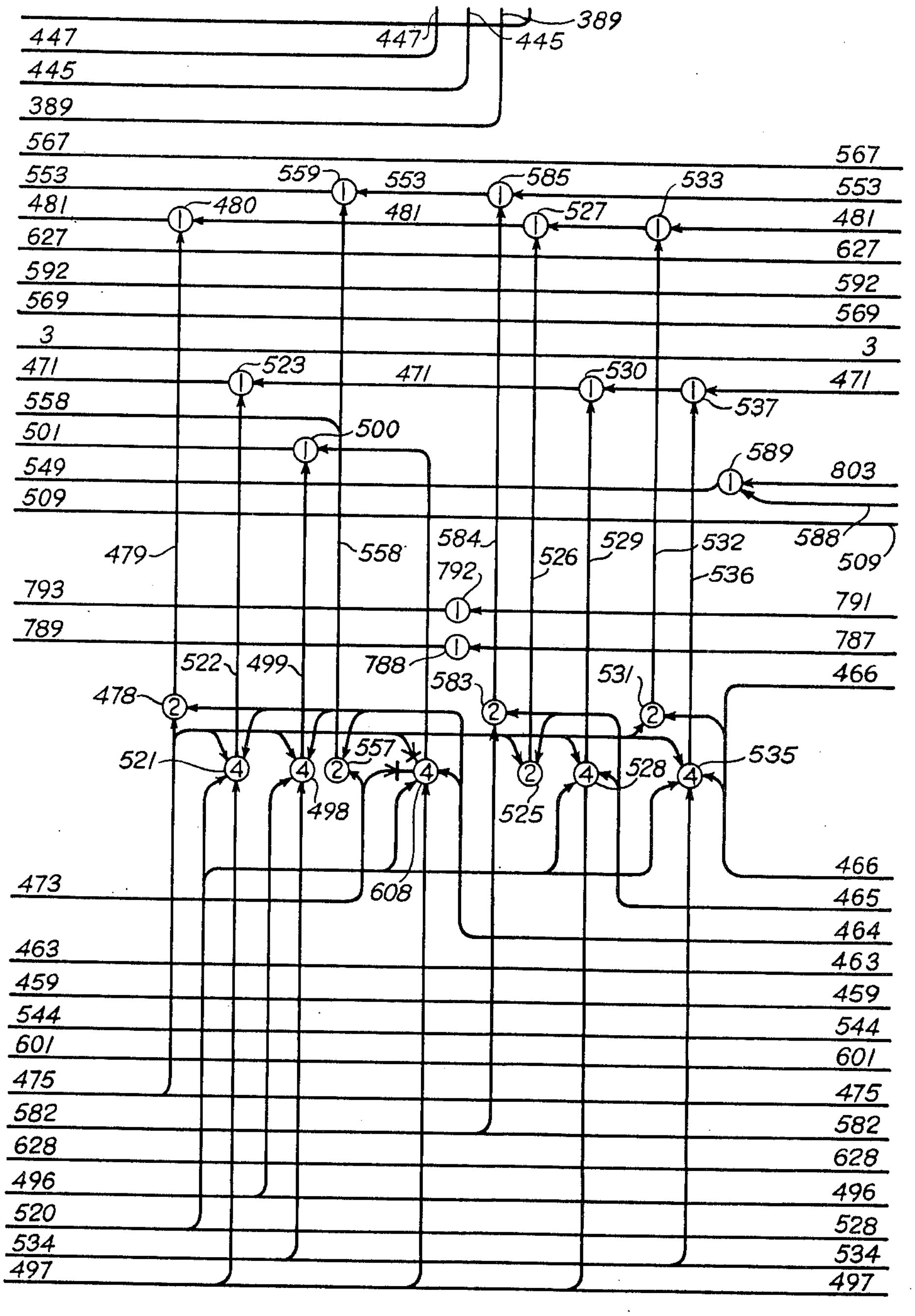

When the count reaches position 5 the output leads 496 and 534 of counter stores 448 and 450 open AND-gate 498, FIG. 51, the other inputs being the leads 475 and 464. Initial Sel P on the output lead 499 of AND-gate 498 is connected via OR-gate 500 to lead 501 which via OR-gates 502, 503 and 504, FIG. 50, is connected through a 1 microsecond delay 505 to the input OR-gate 472 of transfer store 454, FIG. 49 and because of the 1 microsecond delay 505 initial Sel Q is stored. Output lead 473 of transfer store 454 provides a P-phase output to open AND-gate 506, FIG. 50, together with leads 445 and 463 so that initial Sel P at PP6 time appears on output lead 507, and via OR-gate 508 to lead 509 and via OR-gates 510 and 511, FIG. 49, is written into auxiliary store 453 to indicate that a make or break has been detected.

Absence of initial Sel P at PP6 time in auxiliary store 452 indicates a make.

The output lead 459 of auxiliary store 453 closes AND-gate 456. At the same time AND-gate 512, FIG. 50, is opened by the P-phase output lead 473 of transfer store 454 together with lead 463. P-phase pulse train on its output lead 513, via OR-gate 514 is connected to lead 515 and via a 1 microsecond delay 516, FIG. 49, is converted to Q-phase and connected via OR-gate 477 to inhibit the circulation in transfer store 454. This will take place whether or not the make condition persists.

Although AND-gate 456 is closed to lead 445, AND-gate 517 will be opened to lead 445 at the next PP6 pulse and its output lead 518 is connected via OR-gates 519 and 470 to lead 471 and will have the same effect as the output of AND-gate 456. At the next PP7 time therefore the count will reach 6, i.e., initial Sel Q in counter stores 449 and 451, FIG. 48. The output leads 520 and 497 are applied to AND-gate 521, FIG. 51, together with the P-phase output lead 475 of transfer store 474 and the P-phase pulse train at PP7 time on lead 464. Initial Sel P on the output lead 522 of AND-gate 521 is connected via OR-gate 523 to lead 471 and via OR-gates 519 and 470, FIG. 50, AND-gate 472, FIG. 49 is written into the transfer store 454 again to appear on output lead 475 at PP8 time and open AND-gate 525, FIG. 51, to lead 465. Initial Sel P at PP8 time appears on output lead 426 and via OR-gate 427 is connected to lead 481 and then via OR-gates 480, 482 and 483, FIG. 50, to the counter stores and because these are empty in the PP8 position, it will be written via AND-gate 484, FIG. 48, into stores 448 and 449 representing position 1 in the first stage of interdigit pause period timing.

The whole process is repeated as long as the make condition persists, the counter being stepped to position 7 (nothing stored) and then again to position 1 at successive PP7 periods. Each time the counter at PP7 for make timing, passes its position 6, the counter at PP8 for first stage interdigit pause timing is advanced by one, by means of the transfer store 454. When the interdigit pause period counter at PP8 in turn reaches its position 6 (initial Sel P at PP8 time in stores 449 and 451) the output leads 520 and 497 of these stores together with output leads 475 and 465 opens AND-gate 528, FIG. 51 and initial Sel P at PP8 time will appear on output lead 529 and via OR-gate 530 is connected to lead 471 and via OR-gates 523, 519 and 470, FIG. 50, and 472, FIG. 49, is written into the transfer store 454. It will appear on output lead 475 of transfer store 474 at PP9 time and this will open AND-gate 531, FIG. 51, to lead 446. Thus initial Sel P at PP9 time appears on the output lead 532 and via OR-gate 533 is connected to lead 481 and via OR-gates 527, 480, 482 and 483, FIG. 50, and AND-gate 484, FIG. 48, is written into counter stores 448 and 449 representing position 1 in the second stage of interdigit pause timing.

The whole sequence of events will be repeated for as long as the make condition persists, the "interdigit pause" counter, i.e. PP8 and PP9 stored in counter recording the number of cycles of the make counter, i.e. PP7 in counter, that takes place.

INTERDIGIT DETECTION AND DIGIT DISTRIBUTION

When the "second stage interdigit pause" counter, i.e. PP9 in counter, reaches position 2, it may be assumed that a genuine loop condition is in existence and that dialling should commence.

The "digit distributor" which takes the form of a count of initial Sel P at PP10 time in the counter, is set into the "first digit" position. The condition of position 2 in the second stage interdigit pause counter is indicated by the appearance of initial Sel P at PP9 time in counter stores 449 and 450, FIG. 48, and the output leads 520 and 534 of these stores are applied to AND-gate 535, FIG. 51, together with the output lead 475 of transfer store 474 and lead 466. Initial Sel P at PP9 time appears on output lead 536 of AND-gate 535 and is connected via OR-gate 537 to lead 471 and via OR-gates 530, 523, 519 and 470, FIG. 50, and 472, FIG. 49 is written into the transfer store 454 to appear on its output lead 475 at PP10 time and is applied to open AND-gate 538, FIG. 52, together with lead 467 and the inhibition output lead 459 of auxiliary store 453. Initial Sel P at PP10 time on the output lead of AND-gate 538 is connected via OR-gate 540 to lead 481 and via OR-gates 533, 527 and 480, FIG. 52, 482 and 483, FIG. 50, and AND-gate 484, FIG. 48, is written into the counter stores 448 and 499 indicating that the first digit is to be counted.

Figure 52:
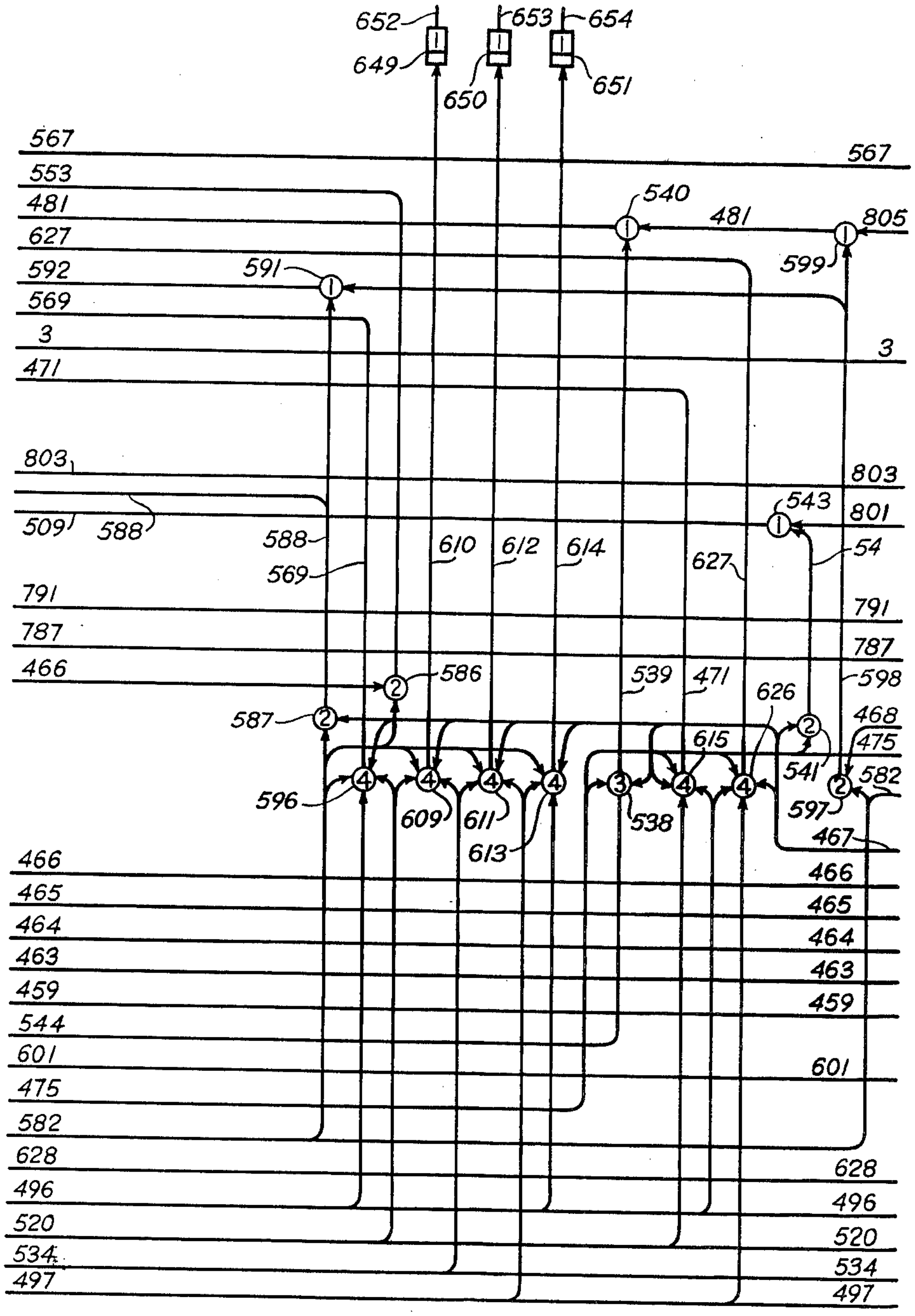

At the same time AND-gate 541, FIG. 52, opens to the output lead 475 of auxiliary store 474 and lead 467, and initial Sel P at PP10 time on its output lead 542 is connected by OR-gate 543 to lead 509 and via OR-gates 508 and 510, FIG. 50, and 511, FIG. 49, is written into auxiliary store 453, and after 1100 microseconds it appears on output lead 544 to close AND-gate 538, FIG. 52.

The "make timer," at PP7 time, and "interdigit pause" counter, at PP8 and PP9 times, can then continue cycling without any further action being taken and the equipment is ready to record the first dialled digit.

DIAL BREAK

When the loop condition is broken initial Sel P appears on lead 447 and is removed from lead 445. At the moment the auxiliary store 453 is storing initial Sel P at both PP6 and PP10 times. The output lead 459 of auxiliary store 453 is connected to AND-gate 545, FIG. 50, together with the inhibition output lead 546 of auxiliary store 452, in which there is no storage and leads 463 and 447.

With initial Sel P on lead 447, AND-gate 545 opens and initial Sel P at PP6 time appears on its output lead 547 which:

(a) Via OR-gate 548 is connected to lead 549 and via OR-gates 550 and 551, FIG. 49, clears initial Sel P at PP6 time from the auxiliary store 453.

(b) Via OR-gate 552 is connected to lead 553 and via OR-gates 554, 555 and 556, FIG. 49, clears initial Sel P at PP6 time from the counter.

(c) Via OR-gate 502 is connected to lead 502 and via OR-gates 503 and 504 to a 1 microsecond delay 505, FIG. 49, converting to initial Sel Q, which via OR-gate 472 is written into transfer store 454.

After 99 microseconds it emerges on output lead 473 at the original P-phase. It is also delayed by the 1 microsecond delay 474 to emerge as the Q-phase and this is applied on lead 475 to the recirculation AND-gate 476 where it is not inhibited and will therefore circulate in the transfer store 454 in series with delay 474. At the next PP7 time initial Sel P from transfer store 454 on lead 473 is applied to AND-gate 557, FIG. 51, to which the PP7 lead 464 is also applied. Output lead 558 of this AND-gate 557 is connected via OR-gate 559 to lead 553 and via OR-gates 552, 554 and 555, FIG. 50, and 556, FIG. 49, to clear initial Sel P at PP7 time from the counter stores and thus reset the counter to zero. The output of AND-gate 557, FIG. 50, is also applied via OR-gate 514 to output lead 515 and 1 microsecond delay 516, FIG. 49, converting to Q-phase, which, applied to OR-gate 477 inhibits on AND-gate 476 to clear initial Sel P at PP7 time from the transfer store 454.

Clearance of transfer store 453 allows AND-gate 560, FIG. 50, to open to lead 463 and therefore initial Sel P at PP6 time appears on output lead 561 and via OR-gate 482 is connected to lead 481 and via OR-gate 483 is written into the counter and because the counter is empty at PP6 time, due to AND-gate 545, it is stored in stores 448 and 449, FIG. 48, starting the break time counter. This operation is repeated at each PP6 time while the break position persists, stepping the counter each time until it reaches position 6, i.e., storage in 449 and 451. Output leads 520 and 497 of these stores opens AND-gate 562, FIG. 50, to lead 463 and initial Sel P at PP6 time appears on output lead 563 which:

(a) Via 1 microsecond delay 564 converting to Q-phase and OR-gate 565, FIG. 49, is written into auxiliary store 452.

(b) Via OR-gate 510, FIG. 50, is connected to lead 509 connected to OR-gate 511, FIG. 49, and is written into auxiliary store 453, the output of which closes AND-gate 560.

(c) Via OR-gate 504 is connected to lead 501 and via 1 microsecond delay 505, FIG. 49 converting to Q-phase, to OR-gate 472 and is written into transfer store 454.

At PP6 time (before initial Sel P appears on output of auxiliary store 452) AND-gates 566, FIG. 50, is opened and initial Sel P appears on output lead 567 and via OR-gate 568 is connected to lead 569 connected via 1 microsecond delay 570, FIG. 49, converting to Q-phase, to OR-gate 571 so that initial Sel Q at PP6 time is written into transfer store 455.

DIAL TONE TRIP

Since the first dial break has been recognised, dial tone should be stopped.

Figure 45:
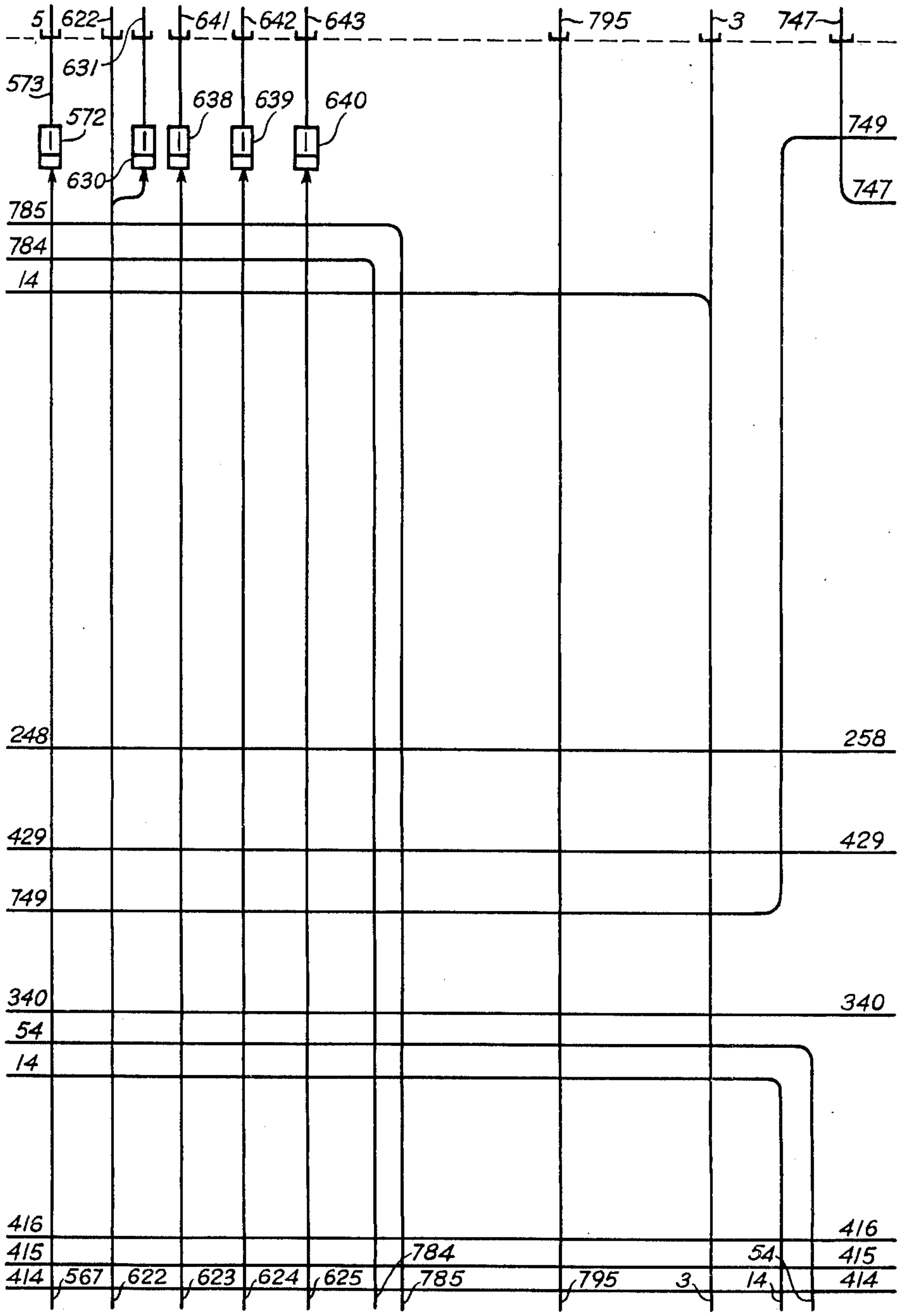

Lead 567, output of AND-gate 566, FIG. 50, is connected via 1 microsecond delay 572, FIG. 45, to lead 573 which is common to the five cords, so that on this lead initial Sel Q is offered to all cords. In each cord, lead 573 is connected to AND-gate 574, FIG. 37, having as its other input the output of the cord's register store 383 delayed by 1 microsecond 574, FIG. 36, on lead 576. Initial Sel Q is therefore gated into the cord having the initial Sel P stored in its register store 383.

Since a given channel can be used in one register operation only at a time, this ensures that initial Sel Q is gated into the cord providing register facilities for the call being considered.

Figure 36:
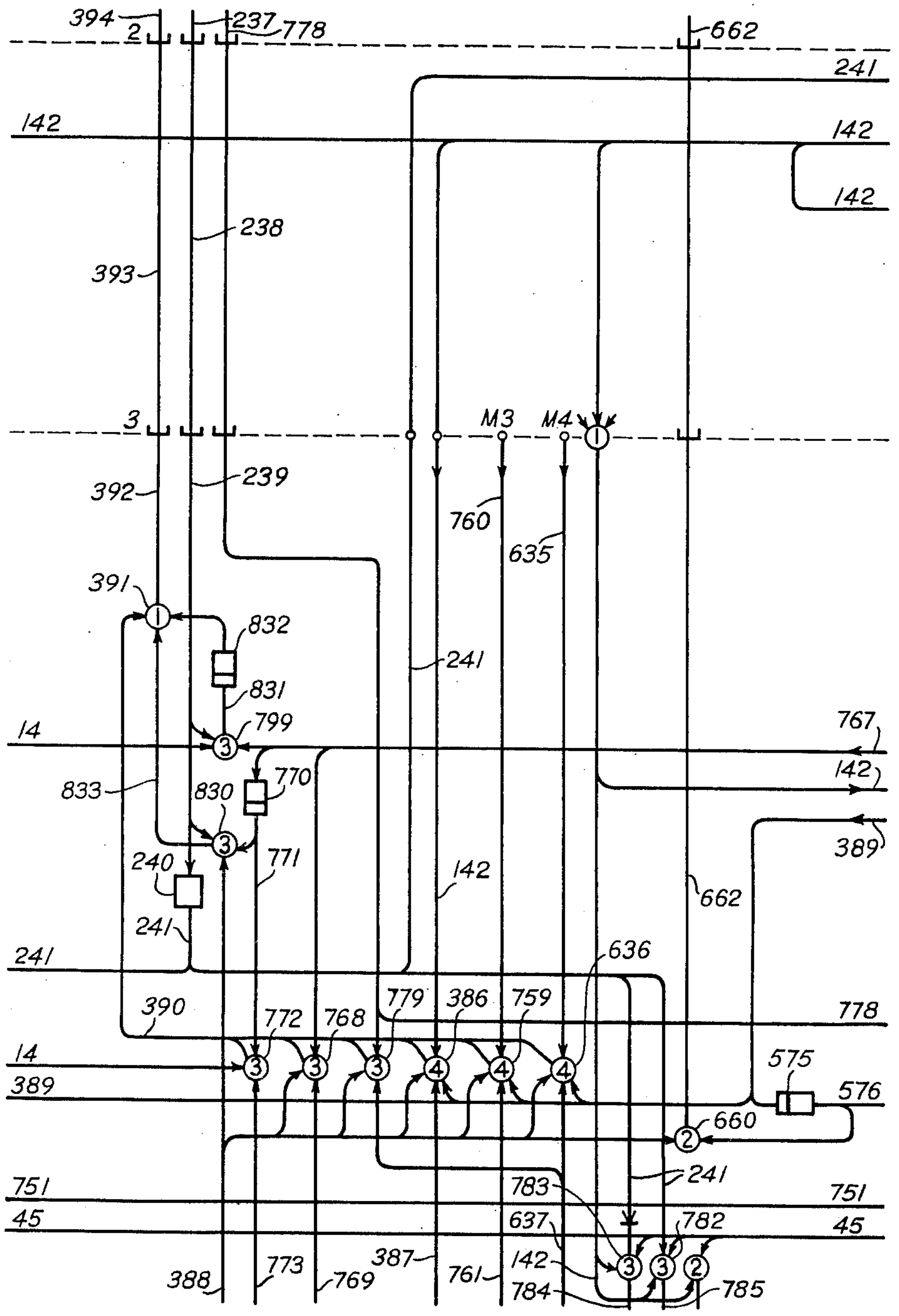

Initial Sel Q appears on output lead 557 of AND-gate 574, FIG. 37, and is applied via OR-gate 578 to inhibit the register store 383 and via OR-gate 579 and lead 580 to inhibit on AND-gate 581 the thousand M2 store 141. Initial Sel Q is therefore deleted from both the register store 383 and thousand M2 store 141, with the result that dial tone gate 386, FIG. 36, is closed cutting off transmission of dial tone to the calling line.

Previously initial Sel Q at PP6 time was written into transfer store 455, and this will emerge on lead 582, FIG. 49, as Q-phase which:

(a) Opens AND-gate 583, FIG. 51, at PP8 time and initial Sel P on output lead 584 via OR-gate 585 is connected to lead 553, connected via OR-gates 559, 552, 554 and 555, FIG. 50, and 556, FIG. 49, to clear the counter at PP8 time for first stage interdigit pause timing.

(b) Opens AND-gate 586, FIG. 52, at PP9 time and initial Sel P on output lead 553 is connected via OR-gates 585 and 559, FIG. 51, 552, 554 and 555, FIG. 50, and 556, FIG. 49, to clear the counter at PP9 time for second stage interdigit pause timing.

(c) Opens AND-gate 587, FIG. 52, at PP10 time and initial Sel P is connected to output lead 588 which via OR-gate 589, FIG. 51, is connected to lead 549 connected via OR-gates 548 and 550, FIG. 50, and 551, FIG. 49, to inhibit AND-gate 590 to clear initial Sel P at PP10 time from auxiliary store 453. Lead 588 also via OR-gate 591, FIG. 52, is connected to lead 592, connected via 1 microsecond delay 593 and OR-gate 594, FIG. 49, to inhibit AND-gate 595 and clear initial Sel Q from transfer store 455.

The counter used as digit distributor at PP10 time will in the case of the first digit of the dialled number, be standing in position 1, i.e. inital Sel P at PP10 stored in 448 and 449. Output leads 496 and 520 of these stores are applied to AND-gate 596, FIG. 52, together with initial Sel P on output lead 582 of transfer store 455 and lead 467. Initial Sel P at PP10 time appears on output lead 569 of AND-gate 596 and is connected via OR-gate 568, FIG. 50, to 1 microsecond delay 570, FIG. 49, converting to Q-phase, and then via OR-gate 571 is written into transfer store 455. It appears on output lead 582 at P-phase at PP11 time and this is applied to open AND-gate 597, FIG. 52, together with lead 468. Initial Sel P appears on output lead 598 which via OR-gate 591 is connected to lead 592, and via 1 microsecond delay 593, FIG. 49, and OR-gate 594 to inhibit AND-gate 595 to clear initial Sel Q, at PP11 time from transfer store 455. Lead 598 also via OR-gate 599, FIG. 52, is connected to lead 481 and via OR-gates 540, 533, 527 and 480, FIG. 51, and 482 and 483, FIG. 50, to AND-gate 484, and because the counter is clear at PP11 time, is written into stores 448 and 449 representing position 1 to start the count of the first dialled digit.

The dial break has been detected up to position 6 at PP6 time as already described, after which the "break detected" is remembered by PP6 in stores 452 and 453, and one is added to the dial count. No more will be added to the dial count as long as the break is detected, but the break counter, at PP6 time, will continue to run and allow AND-gate 600, FIG. 50, to put initial Sel P at PP6 time into the counter for as long as initial Sel P appears on lead 447.

When the dial break ends and the make condition returns, initial Sel P is removed from lead 447 and appears again on lead 445. The make timer, PP7 in counter, was cleared when the break condition was detected and "break detected" is being remembered by PP6 in stores 452 and 453 as already stated. Output leads 601 and 459 of these stores are applied to AND-gate 602, FIG. 50, together with leads 463 and 445 and this gate will be opened when initial Sel P appears on lead 445 at the end of the break condition, when make condition is re-established. Initial Sep P therefore appears on output lead 603 which:

(a) Via OR-gate 550 is connected to lead 459 and OR-gate 551, FIG. 49, to inhibit on AND-gate 590 the circulation of initial Sel P at PP6 time in auxiliary store 453.

(b) Via OR-gate 503 is connected to lead 502 and via OR-gate 504 and 1 microsecond delay 505, FIG. 49, converting to Q-phase and via OR-gate 472 writes initial Sel Q into transfer store 454.

(c) Via OR-gate 554 is connected to lead 553 and via OR-gates 555 and 556, FIG. 49, to clear initial Sel P at PP6 time from the counter.

Initial Sel Q stored in transfer store 454 emerges at P-phase on lead 473 and is applied to open AND-gate 557, FIG. 51, to PP7 lead 464 so that initial Sel P at PP7 time appears on output lead 558 which via OR-gate 514, FIG. 50, is conected to lead 515 and via 1 microsecond delay 516, FIG. 49, converting to Q-phase, and via OR-gate 477 is applied to inhibit AND-gate 476 and clear initial Sel Q at PP7 time from transfer store 454. Lead 558 also via OR-gate 559 is connected to lead 553 and via OR-gates 552, 554 and 555, FIG. 50, and 556, FIG. 49, to clear initial Sel P at PP7 time from the counter.

When initial Sel P at PP6 time was cleared from auxiliary store 453 the inhibition lead 544 with initial Sel P on leads 445 and 463 opens AND-gate 456, FIG. 50, so that initial Sel P appears on output lead 604 connected via OR-gate 470 to lead 471 and via OR-gate 472, FIG. 49, is written into transfer store 454 to appear 100 microseconds later on output lead 475, which with lead 464, opens AND-gate 478, FIG. 51, putting initial Sel P on output lead 479 and connecting it via OR-gate 480 to lead 481 connected via OR-gates 482 and 483, FIG. 50, and AND-gate 484, FIG. 48, so that it is written into the counter stores 448 and 449 representing position 1 of make timing. The "make counter" (PP7 in counter) will continue to advance the count as long as initial Sel P at PP6 time is not stored in the auxiliary store 453.

At any time during the make count the "break counter" can operate if transient breaks occur and either the make or break can win depending on conditions. Assuming however that a genuine make condition exists, then the "make counter" will eventually reach position 5, i.e. initial Sel P at PP7 time in stores 448 and 450.

Output lead 495 and 534 of these stores are connected to AND-gate 498, FIG. 51 to which initial Sel P at PP7 time on lead 475 from store 474 and lead 464 are also supplied and the gate opens. Initial Sel P at PP7 time appears on output lead 499 connected via OR-gate 500 to lead 501, and via OR-gates 502, 503, 504, FIG. 50, and 1 microsecond delay 505, FIG. 49, converting to Q-phase, to OR-gate 472 and is written at Q-phase into transfer store 454 at PP7 time and in which store it continues to circulate, a P-phase output being obtained from output lead 473.

At the next PP6 time the output on lead 473, together with leads 445 and 463 open AND-gate 506, FIG. 50, connecting initial Sel P at PP6 time to output lead 507 which:

(a) Via 1 microsecond delay 605, converting to Q-phase, is connected to lead 606 and via OR-gate 607, FIG. 49, as inhibition to AND-gate 608 to clear initial Sel P at PP6 time from auxiliary store 452, i.e. clears memory that break was last detected.

(b) Via OR-gate 555 is connected to lead 553 and to OR-gate 556 to inhibit initial Sel P at PP6 time from the counter, thus clearing any break count stored during the make count.

(c) Via OR-gate 508 is connected to lead 509 and via OR-gates 510 and 511 is written into auxiliary store 453 for make detected.

With initial Sel P at PP6 time stored in auxiliary store 453, output lead 544 closes AND-gate 456 whose function is taken over by AND-gate 517 as this is not now inhibited by lead 544. Also when AND-gate 506 opens, AND-gate 512 opens to the leads 473 and 463, to connect initial Sel P at PP6 time via OR-gate 514 to lead 515 connected via 1 microsecond delay 516 converting to Q-phase, via OR-gate 477, to inhibit AND-gate 476 and clear initial Sel P at PP6 time from transfer store 454 and prevent AND-gate 506 from operating again. The counter will continue to operate at PP7 time if the make condition persists and when it reaches position 6, i.e., storage in stores 449 and 451, AND-gate 521, FIG. 51, is opened to the output leads 520 and 497 of stores 449 and 451, and leads 475 and 464.

This puts initial Sel P at PP7 time on output lead 522 and via OR-gate 523 connects it to lead 471 and via OR-gates 519 and 470, FIG. 50, and 472, FIG. 49, is written into transfer store 454. 100 microseconds later initial Sel P will appear on output lead 475 of transfer 474, i.e., at PP8 time, but will not circulate because it will be inhibited in AND-gate 476 by the output of OR-gate 477 from lead 3 on which P-phase pulses are permanently connected. The output on lead 475 at PP8 time is connected to AND-gate 525, FIG. 51, together with lead 465, so that initial Sel P at PP8 time is connected to output lead 526 and via OR-gate 527 to lead 481 connected via OR-gates 480, 482 and 483, FIG. 50, to AND-gate 484, FIG. 48, and is written into stores 448 and 449 representing position 1 to start the first stage interdigit pause timing.

The "make counter" (PP7 in counter) can then continue indefinitely counting by use of AND-gates 517 and 478, at every cycle the "first stage interdigit pause" counter being advanced as described above.

Special precautions must be taken against the case in which a spurious break occurs after the make count has reached position 5, but before resultant action is complete.

With the system described the operation of AND-gate 506 at PP6 time, is prepared for by the operation of AND-gate 498 at the previous PP7 time. Operation of AND-gate 498 depends on the "make counter" being in position 5, and since at the same time as it operates, AND-gate 478 also operates to advance the count, only one chance is given. If however, the make condition is temporarily removed immediately after AND-gate 498 has operated, AND-gate 506 will not operate since initial Sel P will no longer appear on lead 445, and AND-gate 498 will not be operated again. Thus AND-gate 506 will not be operated even when lead 445 is re-established, and the make condition will not be detected.

AND-gate 608, FIG. 51, is therefore arranged so that if the "make counter" reaches position 6 but AND-gate 506 is not operated, as shown by the absence of initial Sel P on lead 473, and if make counting is not in progress, as shown by the absence of initial Sel P on lead 475, initial Sel P is stored in transfer store 454 so that when the loop is re-established, and initial Sel P re-appears on lead 445, AND-gate 506 can operate and cause storage in auxiliary store 453 for make detected, as already described.

If the break turns out to be genuine, initial Sel P will be cleared from transfer store 454 when it is detected.

Now assuming that an interdigit pause has not yet been reached, another break will occur and with initial Sel P at PP6 time still stored in auxiliary store 453 indicating that make was last detected, initial Sel P will cease on lead 445 and appear on lead 447. Then as before, AND-gate 545, FIG. 50, will open and initial Sel P at PP6 time will appear on output lead 547 which:

(a) Via OR-gate 548 is connected to lead 549 and via OR-gates 550 and 551 to inhibit AND-gate 590, FIG. 49, to clear initial Sel P at PP6 time from auxiliary store 453.

(b) Via OR-gate 502 is connected to lead 501 and via OR-gates 503 and 504, and 1 microsecond delay 505, FIG. 49, converting to Q-phase, to OR-gate 472 and is written into transfer store 454.

Then, as before, clearance of initial Sel P at PP6 time allows AND-gate 560 to open at the next PP6 time if the break condition persists, putting initial Sel P at PP6 time on output lead 561 connected via OR-gate 482 to lead 481 and via OR-gate 483 is written into the counter.

This operation can repeat until the count reaches 6. As before, "make or break counters" (PP7 and PP6 in counter) can run according to the line condition and one will reach its detected condition before the other.

Assuming the break condition persists, the break count (PP6 in counter) will eventually reach position 6, i.e. initial Sel P at PP6 time in stores 449 and 451. Output leads 520 and 497 of these stores, together with initial Sel P at PP6 time on leads 447 and 389 are applied to AND-gate 562, FIG. 50, together with lead 463, so that initial Sel P appears on output lead 563, so that as before it is written into auxiliary store 452 via 1 microsecond delay 564, and into auxiliary store 453 via OR-gate 510 to indicate break detected, and also into transfer store 454 via OR-gate 504. As before this allows AND-gate 557 to open at the next PP7 time, clearing the "make counter" (PP7 in counter) and also the transfer store 454.

When a pulse is written into auxiliary stores 452 and 453 in a given PP pulse period, it will not appear at the outputs until the next corresponding PP pulse period, so that at the same time as AND-gate 562 opened, AND-gate 566 also opened (this once only) to the same inputs as AND-gate 562 plus the output lead 546 of auxiliary store 452. Initial Sel P on output lead 567 of AND-gate 566 via OR-gate 568 is connected to lead 569 and 1 microsecond delay 570, FIG. 49, converting to Q-phase, and via OR-gate 571 is written into transfer store 455 to appear as P-phase on output lead 582 applied to AND-gate 583, FIG. 51, together with lead 465 so that initial Sel P at PP8 time appears on output lead 584 and via OR-gate 585 is connected to lead 553 connected via OR-gates 559, 552, 554 and 555 and OR-gate 556, FIG. 49, to clear the "first stage interdigit pause" counter (PP8 in counter). Output lead 582 is also applied with lead 466 to AND-gate 586, FIG. 52, and when initial Sel P at PP9 time appears on lead 582, AND-gate 586 opens and initial Sel P on output lead 553 is connected via OR-gates 585 and 559, FIG. 51, 552, 554, 555 and 556, FIG. 49, to clear the "second stage interdigit pause" counter (PP9 in counter). Lead 582 is also applied to AND-gate 587, FIG. 52, together with lead 467, so that when initial Sel P at PP10 time appears on lead 582 AND-gate 587 opens, and initial Sel P at PP10 time on lead 588 is connected via OR-gate 589, FIG. 51, to lead 549 connected via OR-gates 548, 550 and 551 to inhibit on AND-gate 590 and clear initial Sel P at PP10 time from auxiliary store 453. Output lead 588 is also connected via OR-gate 591 to lead 592, which via 1 microsecond delay 593, FIG. 49, converting to Q-phase, is connected via OR-gate 594 to inhibit gate 595 and clear transfer store 455 at PP10 time.

It is necessary at this stage to advance the digit count by one. As already stated, the first digit, which if genuine is always either 2, 3 or 4, is counted at PP11 time in the counter, while the second, third and fourth digits, which are decimal, are counted in the hundreds, tens and units counters at PP10 time. To take the latter, simpler case first, if the "digit distributor" (PP10 in the counter) is at hundreds position 2 (storage in stores 449 and 450), AND-gate 609, FIG. 52, will open to put initial Sel P at PP10 time on output lead 610, if at tens position 3 (storage in stores 450 and 451), AND-gate 611 will open to put initial Sel P at PP10 time on output lead 612, or if at units position 4 (storage in stores 448 and 451), AND-gate 613 will open to put initial Sel P at PP10 time on output lead 614.

Leads 610, 612 and 614 connect to the appropiate hundreds, tens and units counters in the cords.

If the "digit distributor" is at thousands position 1 (storage in stores 448 and 449), however, a transfer operation must be made to move the pulse from PP10 to PP11 time. In this case, AND-gate 596, FIG. 52 opens instead of AND-gates 609, 611, 613 and 538 and initial Sel P at PP10 time on output lead 569 of AND-gate 596 is connected via OR-gate 568 and 1 microsecond delay 570, converting to Q-phase and OR-gate 571 is written into transfer store 455, FIG. 49. This overrides the simultaneous erasure, performed by AND-gate 587, FIG. 52.

Output lead 582 of transfer store 455 connected to

AND-gate 597, FIG. 52, together with lead 468, allows initial Sel P at PP11 time to appear on its output lead 598 connected via OR-gate 591 to lead 592 and via 1 microsecond delay 593, FIG. 49, converting to Q-phase, and OR-gate 594 to inhibit AND-gate 595 to clear the transfer store 455 at PP11 time. Output lead 598 of AND-gate 597, FIG. 52, is also connected via OR-gate 599 to lead 481 and via OR-gates 540, FIG. 52, 533, 527 and 480, FIG. 51, 482 and 483, FIG. 50, to advance the count in the counter.

The dial break has then been recognised and counted, but the "break counter" can continue to run by way of AND-gate 600, FIG. 50, since initial Sel P at PP6 time continues to appear on the output of auxiliary store 452 for as long as the break condition persists, i.e. as long as initial Sel P appears on lead 447.

Eventually an interdigit pause will occur. The "make counter" will then cycle continuously making one revolution every 6.6 milliseconds, at each revolution the "first stage interdigit pause" counter (PP8 in counter) being advanced by one.

Interdigit pause is recognised when the "second stage interdigit pause" counter (PP9 in counter) reaches position 2, i.e. after about 100 milliseconds. When interdigit pause is recognised the "digit distributor" (PP10 in counter) is to be shifted.

The operation of the "interdigit pause" counter is exactly as already described when it is used to detect initial genuine loop and to set the "digit distributor" to its first position.

When the "second stage interdigit pause" counter (PP9 in counter) reaches position 2 (storage in stores 449 and 450), initial Sel P at PP9 time appears on the output leads 520 and 534 of stores 449 and 450, FIG. 48, after 1100 microseconds and is taken to indicate that an interdigit pause exists. At PP9 time when the "second stage interdigit pause" counter is advanced by initial Sel P from transfer store 454, FIG. 49, AND-gate 535, FIG. 51, to which is applied output leads 520 and 534, together with the output lead 475 of store 474 and lead 466, opens, and initial Sel P at PP9 time appears on output lead 536 connected via OR-gate 537 to lead 471 and via OR-gates 530, 523, 519 and 470, FIG. 50, and 472, FIG. 49, is written into transfer store 454 again. After 100 microseconds initial Sel P therefore appears on the output lead 475 of 1 microsecond delay 474, i.e. at PP10 time, and as long as PP10 is not stored in auxiliary store 453, AND-gate 538, FIG. 52, is opened to put initial Sel P at PP10 time on output lead 539 connected via OR-gate 540 to lead 481 connected via OR-gates 533, 527 and 480, FIG. 51, 482 and 483, FIG. 50, and is written into the counter, thus advancing the "digit distributor" (PP10 in counter) by one.

At the same time AND-gate 541, FIG. 52, opens to leads 475 and 467 and initial Sel P at PP10 time on output lead 542 is connected via OR-gate 543 to lead 509 and via OR-gate 508 and 510, FIG. 50, and 511, FIG. 49, is written into auxiliary store 453, to indicate that the "digit distributor" has been shifted and the output lead 544 of auxiliary store 453 closes AND-gate 538, FIG. 52, against repetition until it is cleared when the next break is detected.

With the "digit distributor" (PP10 in counter) in the position 2, initial Sel P at PP10 time will be stored in stores 449 and 450, so that the next digit to be counted will be passed via AND-gate 609, FIG. 52, to the hundreds store.

Means are also provided for noting the first interdigit pause and indicating that the first dialled digit is 2, 3 or 4 or inadmissible (N.U.).

If the "digit distributor" (PP10 in counter) is in position 1 when AND-gate 538, FIG. 52, is opened to shift it, then AND-gate 615 will also open to output leads 496 and 520 of stores 448 and 449 and leads 475 and 467, so that initial Sel P at PP10 time appears on output lead 471 connected via OR-gates 537, 530 and 523, FIG. 51, 519 and 470, FIG. 50, and 472, FIG. 49, and is written into transfer store 454 so that it appears on output lead 475, 100 microseconds later, i.e. at PP11 time, at which time the first digit count takes place.

Figure 53:
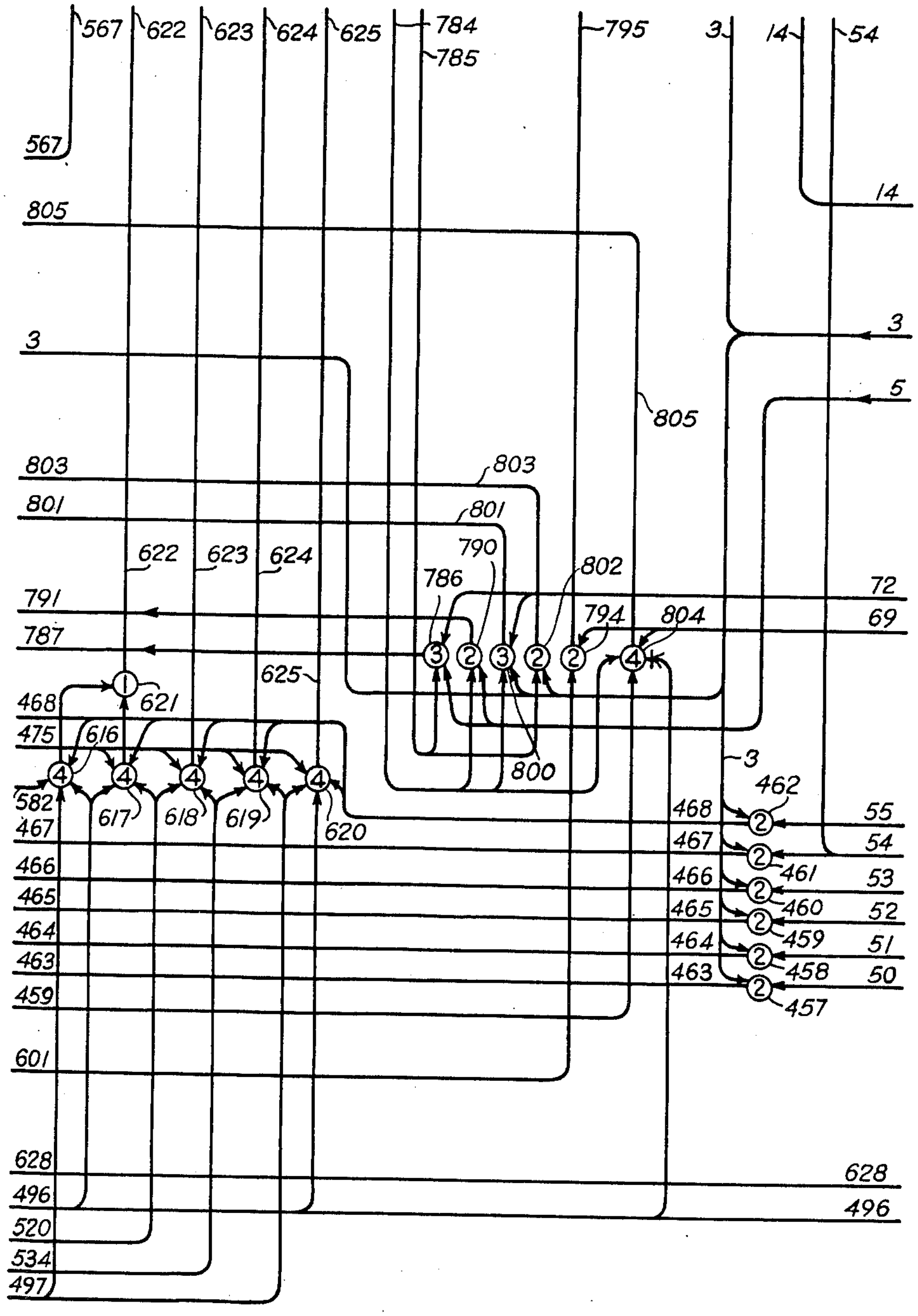

Digit (or N.U.) indication is performed by AND-gates 616–620, FIG. 53, to which output leads 496, 497, 520 and 534 of appropriate pairs of counter stores are connected.

If the first digit counted is 1 when the interdigit pause is detected, AND-gate 617 is opened by leads 496, 520, 475 and 468 to put initial Sel P at PP11 time via OR-gate 621 on output lead 622, as 1 is not a valid first digit.

If the first digit counted is 2, AND-gate 618 opens to leads 520, 534, 475 and 468, to put initial Sel P at PP11 time on output lead 623. Likewise if the first digit is 3, AND-gate 619 opens to output leads 534, 497, 475 and 468 to put initial Sel P at PP11 time on output lead 624, and if 4, AND-gate 620 opens to output leads 497, 496, 475 and 468, to put initial Sel P aat PP11 time on output lead 625.

Any attempt to advance the first digit counter above 4 must result in an unobtainable number being recorded. If the "digit distributor" (PP10 in counter) is at position 1, AND-gate 596, FIG. 52, open, as each break is counted (to output leads 496, 520, 582 and 467) and puts initial Sel P at PP10 time on output lead 569, FIG. 50, connected via OR-gate 568, 1 microsecond delay 570, FIG. 49, converting to Q-phase, and via OR-gate 571 is written into transfer store 455, as already described, thus allowing a count to be made at PP11 time. Then if the first digit count already stands at 4 (storage in stores 448 and 451) AND-gate 616, FIG. 53, opens to output leads 496, 497, 582 and 468 to put initial Sel P at PP11 time via OR-gate 621 on to output lead 622. Any first digit greater than 4 is thus rejected.

End of dialling is indicated when an interdigit pause is detected and the "digit distributor" (PP10 in counter) is already in its fourth position. Detection of interdigit pause causes, as already described, AND-gate 535, FIG. 51, to open at PP9 time and initial Sel P at PP10 time to appear on output lead 475 of transfer store 454. If at the same time the "digit distributor" is at position 4, AND-gate 626, FIG. 52, opens and puts initial Sel P at PP10 time on output lead 627 and is written via OR-gate 571, FIG. 49, into transfer store 455. This is the only use made of this lead 627 as input to transfer store 455, and the P-phase pulse written in via this lead appears on output lead 582 of the 99 microsecond section 455 as Q-phase, and on output lead 628 of the additional 1 microsecond section 629, as P-phase. As both leads 582 and 628 are later gated with a P-phase pulse train the functions are effectively separated.

N.U. TONE ON IMPERMISSIBLE FIRST DIGIT

As already mentioned under "Sending of Dial Tone to Calling Line," the selected channel's Q-phase is stored in the register cord's thousand store 4 to indicate that N.U. tone is to be sent. When the N.U. tone condition is deduced from dialling of an impermissible first digit, initial Sel P at P11 time is put on lead 622 the output of OR-gate 621, FIG. 53, to appear via a 1 microsecond delay 630, converting to Q-phase, on lead 631, FIG. 45. Lead 622 is common to the five cords and in each cord is connected via OR-gate 578, FIG. 37, to inhibit register store 383.

Since any channel busy in register store 383 is excluded from initial selection, a given channel can only be stored in one register store 383 at a time and only the appropriate store will be cleared. The register function of the cord associated with the calling line is thus cancelled since initial Sel P is deleted from its register store 383. At the same time, the last output appearance of initial Sel P from the register store 383 concerned, delayed by 1 microsecond 575 FIG. 36, to give Q-phase on output lead 576, opens AND-gate 632, FIG. 37, to lead 631, and initial Sel P at PP11 time from register store 383 is passed via OR-gate 633 to lead 634 and written into the cord's thousands store 4.

Initial Sel Q is therefore now stored in the initial selected cord's register store 383 and thousands store 4. Output leads 389 and 635 of these stores are connected to the cord's AND-gate 636, FIG. 36, to which is also connected the common N.U. tone lead 637 and Q-phase pulse train lead 388, so that initial Sel Q modulated by N.U. tone is passed on to the cord's tone lead 390 and via OR-gate 391 to the outward speech path 392 and thence to the calling line unit.

DIALLED DIGIT COUNTING AND CALLED LINE INDICATION

Any genuine first digit must be 2, 3 or 4 and is indicated by the appearance of initial Sel P at PP11 time on the output leads 623, 624 or 625 of AND-gates 618, 619 or 620 FIG. 53, respectively. These output leads, 623, 624 and 625, are each delayed by 1 microsecond 638, 639 and 640, FIG. 45, to give initial Sel Q at PP11 time on the output leads 641, 642, and 643 respectively. These leads are common to the five cords and in each cord the leads are connected to AND-gates 644, 645 and 646 respectively, to which are also connected the output of the cord's register store delayed by 1 microsecond, on lead 576. In the cord in which initial Sel P was stored in register store 383 the appropriate gate will be opened and via the corresponding lead 647, 648 or 634, a pulse is written into the appropriate thousands store 141 of the register cord.

The second, third and fourth digits are recorded by counting dial breaks directly into the hundreds, tens and units stores of the register cord, using initial Sel P at PP10 time in the counter circuits, as for line scanning. As already explained, as each dial break in the second, third and fourth digit is detected, initial Sel P at PP10 time is gated by AND-gates 609, 611 or 613, FIG. 52, on to lead 610, 612 or 614 according to the position of the "digit distributor" (PP10 in counter). Each of these leads 610, 612 and 614 is connected via a 1 microsecond delay 649, 650 and 651, so that initial Sel Q at PP10 time appears on its corresponding lead 652, 653 or 654 which are connected to the hundreds, tens and units stores in exactly similar ways. For example, consider the hundreds stores. Lead 652 is connected via OR-gate 127, FIG. 42, to lead 128 into the hundreds counter gates. These gates are connected to the hundreds stores of each cord by AND-gates such as 134 and 135, FIG. 34, controlled by common lead 45, the output of OR-gate 655, on which is not only the PP1 pulse characterising the cord but also PP10 pulse on lead 54 gated through AND-gate 656 by output lead 389 of the cord's register store 383. The same lead 45 also controls AND-gate 657 which connects lead 128 via OR-gate 658 to lead 659 common to the hundreds stores of the cord. Thus when a dial break is to be counted for the second dialled digit, the register cord's hundreds stores are connected to the hundreds gating circuit and initial Sel Q at PP10 time is applied via lead 128 to the hundreds counter gates. The counter operates as previously described under line scanning and initial Sel Q is stored in the pair of hundreds stores appropriate to the dial break counted.

Similarly, by operation of the digit distributor (PP10 in counter) the third and fourth digits are counted by the tens and units stores of the register cord and finally initial Sel Q will be stored appropriate to the dialled digits of the called line.

When initial Sel Q is circulating in the cord's stores in order to perform this digit count, it is necessary to prevent it from becoming effective in any connection gates. Under these conditions initial Sel P is stored in the cord's register store 383, FIG. 37, and will thus appear at initial Sel Q on lead 576 having been through a 1 microsecond delay 575. Lead 576 is applied to AND-gate 660, FIG. 36, to which is also applied a Q-phase pulse train lead 388, derived from the P-phase pulse train lead 14 through a 1 microsecond delay 661. In this way, by using P-phase pulses delayed by 1 microsecond in order to convert to Q-phase pulses, there is no interference with the Q-phase pulses stored in the register store for tone sending.

The output leads 662 of AND-gate 660 inhibits on AND-gate 157, FIG. 28, connections to the units and tens AND-gates 159–178, FIGS. 24 and 25, and to the sub-group/cord AND-gates such as 235, FIG. 28. Thus no false connections can arise because initial Sel Q uses the stores to count dialled digits. All group/cord leads remain connected to the exchange common equipment since their indications are required to identify the called group as will be seen later.

CONNECTION BETWEEN CALLING AND CALLED LINES

Connection is now required between the calling and called lines but the initial selected channel may or may not be suitable for connection to the called line, whose identity was unknown until the completion of dialling. It is therefore necessary to select a channel available for both the calling and called lines for the final connection.

As already described, when all four digits have been received and counted, initial Sel P at PP11 time appears on lead 628, FIG. 46. If a setting-up operation is possible, toggles free condition is given on output lead 245 of AND-gate 293, FIG. 47, and this will open AND-gate 663, FIG. 46, a P-phase and connect initial Sel P at PP11 time on lead 628 to lead 664 connected in common to each cord. In a cord, lead 664 is connected to AND-gate 665, FIG. 37, to which is also applied output lead 389 of the cord's register store. The output of AND-gate 665 via OR-gate 666 operates the cord's identify toggle 667 to indicate that all dialled digits have been counted. For one thing, the operate output lead 668 of toggle 667 gates the PP pulse of the cord via AND-gate 669, FIG. 38, to common lead 670.

Figure 30:
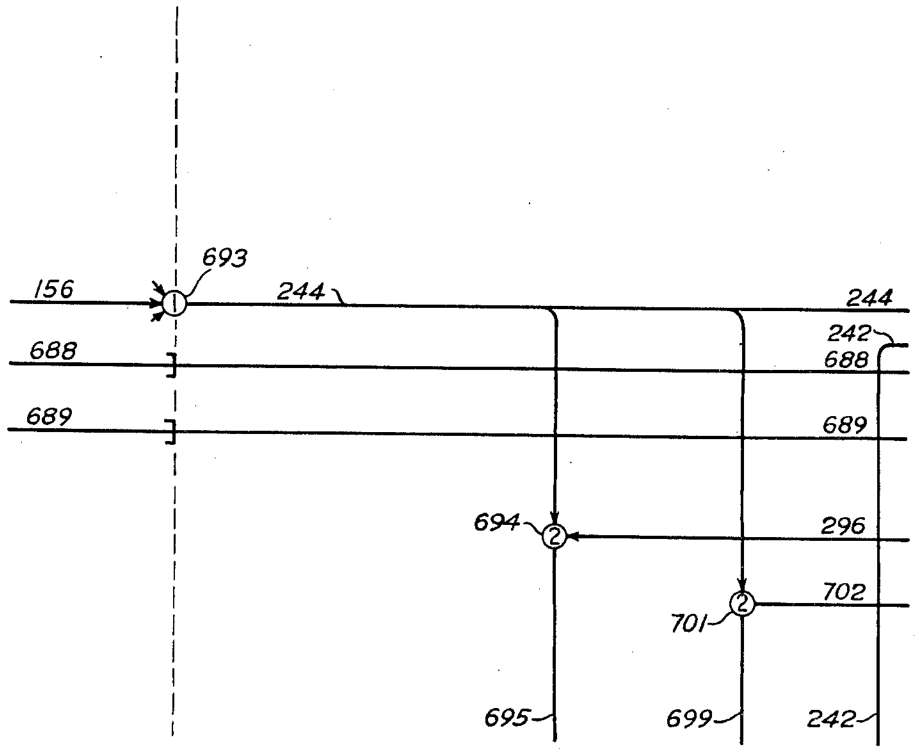

Initial Sel P on output lead 664 of AND-gate 663 also operates the select final toggle 671, FIG. 46, thus disconnecting the reset condition from AND-gate 293, FIG. 47, and removing the toggles free condition from lead 672, and via OR-gate 673, FIG. 30, is written into store 674 to appear on output lead 675 as P-phase and via 1 microsecond delay 676 as Q-phase on lead 677.

Operation of select final toggle 671, FIG. 46, permits called line identification and selection of a channel for the final connection. The operate output lead 678 of toggle 671 is connected to AND-gate 679, FIG. 47, to which are also applied lead 677 the Q-phase output of store 674 and lead 670 the output of toggle 667 in the cord and on which appears a PP pulse train of the cord. Thus, initial Sel Q at PP time of the cord is connected to output lead 681 and via OR-gate 257 to lead 258, this lead being connected in common to the fifteen identify gates 259–273 associated with the hundreds, tens and units stores in the common equipment, FIGS. 40, 41 and 42.

As a result of the dial break counting, initial Sel Q is already stored in the cord's stores in accordance with the called line's number and this cord is connected to the common equipment during its PP pulse period. Thus initial Sel Q will appear during the PP pulse period at both inputs of those identify gates corresponding to the combination of stores. These gates will open and pass initial Sel Q to operate the associated identify toggles, thus setting-up the pattern of hundreds, tens and units toggles corresponding to the called line's number.

FINAL CHANNEL SELECTION

Operation of the select final toggle 671, FIG. 46, also governs the selection of a channel suitable for the final connection. As previously described for initial channel selection, all busy channels appear on 30 group/cord leads (there is a group/cord lead per group per cord, i.e., 2 groups per block, 3 blocks and 5 cords equals 30). For example, any channel in use in group A in the 2 block is connected via OR-gate 155, FIG. 26, to lead 156 which is connected as one input to AND-gate 157, FIG. 28, and there are thirty such leads and gates. On these leads the busy channels appear as P-phase when the group is calling and as Q-phase when the group is called.

In the cord providing register facilities for the calling line, an identify toggle 667, FIG. 37, is already operated and the output lead 668 of this toggle applied to AND-gate 682 gates the output of store 674 on lead 675 to lead 683 and through a 1 microsecond delay 684 to lead 685. Each of these leads is common to the three blocks and in each block to the two groups. Lead 683 is applied as input to AND-gate 686, FIG. 29, and likewise lead 685 is applied to AND-gate 687. Each of the leads 683 and 685 therefore controls six gates.

To each of the AND-gates 686 and 687 is applied the group/cord indication lead 156 relative to the group and the cord concerned. For the calling groups, output lead 688 of each gate, such as AND-gate 686, is commoned with the four other similar leads from the other cords, while the output lead 689 of AND-gate 687 is commoned with the four other cords for the called groups.

The output of store 674 gated by the operate output of toggle 667 in AND-gate 682 will therefore appear at P-phase on lead 688 and at Q-phase on lead 689.

Thus, if the P-phase of the channel stored in store 674 coincides with a channel pulse on the group/cord lead 156 corresponding to one of the groups and the register cord, that group, will be the calling group and the channel will appear on its lead 688 and operate its calling line detected toggle 249, FIG. 31. As described under "Selection of Initial Channel," this permits operation of the start selecting toggle 304, FIG. 39, and resets the channel selected toggle 306. The reset output lead 308 of channel selected toggle 306 is applied as one input to final channel selector AND-gate 690, FIG. 38. The other inputs to this gate are:

(a) The operated output lead 678 of select final toggle 671.

(*b*) Lead 309 on which appears all free Q-phase pulse trains. These free Q-phase pulse trains are derived as in initial selection, by using the outputs on lead 142 of all thousands stores, to inhibit on AND-gate 691, FIG. 37, coincident P-phase pulses, the uninhibited pulses appearing on output lead 330 of AND-gate 691 and being delayed by 1 microsecond delay 692, FIG. 38, to give Q-phase pulses on lead 309.

(c) Calling busy pulses on lead 312 connected as inhibition on this lead at Q-phase appears all the channel pulses busy in all the groups. Each group/cord indication lead 156 for each cord is connected via OR-gate 693, FIG. 30, to lead 244 on which all channel pulses busy in the group will appear. When a group is marked as calling its calling line detected toggle 249, FIG. 31, is operated and its output will contain all the busy channel pulses, which via AND-gate 294 will appear on lead 296 applied to AND-gate 694, FIG. 30, to which lead 244 is also applied. Lead 695 the output of AND-gate 694 is commoned with similar outputs from other groups to lead 696, FIG. 38, which in turn is commoned with similar leads from other blocks to lead 697. Thus on this lead appears at P-phase the busy channel pulses from all groups and via a 1 microsecond delay 698 are converted to Q-phase and appear on lead 312.

(d) Called busy pulses on lead 699 connected as inhibition. These are derived in a manner similar to that described for the calling busy pulses, but using the output of the called toggle 700, FIG. 31, and AND-gate 701, FIG. 30.

(e) Test pulse at Q-phase connected as inhibition on lead 305.

CALLED GROUP DETECTION

Now consider again the lead 677, FIG. 39, already described. If for example, the Q-phase of the channel stored in store 674 coincides in AND-gate 687, FIG. 29, with the channel pulse on the group/cord indication lead 156 corresponding to the register cord and a group, it indicates that the group is the one into one of whose combinations of stores, initial Sel Q has been written by the dial digit counting procedure already described. A pulse will therefore appear on output lead 689 of AND-gate 687 common to the five cords and this will operate the called group's toggle 700, FIG. 31, and via output lead 702 will open AND-gate 701, FIG. 30, to appear on lead 699 applied as inhibition to AND-gate 690, FIG. 38. Channel pulses will appear on this lead in both P- and Q-phases, but only those in Q-phase, i.e. those which are not available for use with the called group, can be effective in AND-gate 690 since selection is made from the Q-phase pulse trains.

Thus when the select final toggle 671, FIG. 46, is operated and the channel selected toggle 306, FIG. 39, is reset, AND-gate 690 will open and on its output lead will appear only the pulses that are free in both the calling and called groups. The first pulse to emerge from AND-gate 690 is connected via OR-gates 314 and 318 to operate the channel selected toggle 306, FIG. 39, and thereby close AND-gate 690 by removal of the reset output on lead 308 of toggle 306 and via OR-gates 314 and 315 is written into the channel selected store 316, FIG. 38. Thus a suitable final channel at Q-phase has been selected and stored and will be known as final Sel Q.

Available channels will appear on the output of AND-gate 690 at 100 microseconds intervals so that if any exist a selection must occur and operate the channel selected toggle 306 before the next appearance of test pulse TP after that which prepared the toggle by resetting it. Therefore if the channel selected toggle 306 is still reset and the start selecting toggle 304 is operated when the test pulse TP arrives, the no free channels AND-gate 321, FIG. 39, will be opened and via OR-gate 322 and lead 323, busy toggle 324 will be operated.

If however the channel selected toggle 306 has been operated before the next test pulse TP arrives, then with this toggle and the start selecting toggle 304 operated, AND-gate 703 will open and via lead 704 the compare toggle 705 will be operated.

FINAL CORD SELECTION

Having selected a final channel, it is now necessary to select a cord in which this channel is free and this is done in exactly the same manner as in the selection for the initial cord.

Final Sel Q on the output of channel selected store 316, FIG. 38, is offered in common to the five cords and to each cord during its PP pulse period via AND-gate 326, FIG. 37, to which is also applied on lead 330, the output of AND-gate 691, the P phase pulses free in the cord. In the first cord in which the final selected channel is found free, AND-gate 326 will open and operate the cord selected toggle 325, the output of which via OR-gate 332 and lead 333, FIG. 38, inhibits AND-gate 329 to prevent any further selection operation. The output of toggle 325 also gates the cord's PP pulse train via AND-gate 334 to the common lead 336.

TESTING OF CALLED LINE

Both the calling and called lines have now been identified, the initial selected channel and initial selected cord are still held, and in addition a final channel and a final cord have been selected suitable for connecting the calling and called lines together. It is not known however whether the called line is free or busy.

As already described, when a channel is selected, the compare toggle 705, FIG. 39, is operated. Output lead 706 of this toggle is applied to two AND-gates 707 and 708, FIG. 47. To each of these gates are also applied:

(a) Output lead 678 of select final toggle 671.

(b) Test pulse train TP on lead 14.

(c) Lead 418 on which appears test pulse TP at the called line's particular time in the scan cycle, because when the line is scanned test pulse TP appears from the line's combination of hundreds, tens and units stores on leads 416, 415 and 414 and via AND-gate 417 on lead 418.

(d) Lead 709 connected as input to AND-gate 708 and as inhibition to AND-gate 707. This lead is common to the three blocks and in each block is the output lead of an AND-gate such as 710, FIG. 39, in the 2 block. The inputs to this gate 710 are the output lead 254 of the busy line store 253 and the common output lead 702 from each of the called group toggles 700 of the two groups forming the block.

If the called line is busy, test pulse TP will have been stored in the busy line store 253 and as already explained, the delay time of this store is such that it will coincide with test pulse TP again only at the scan time of the line.

Therefore only if the called line is busy will an output appear on lead 709 and this will open AND-gate 708, passing test pulse TP to output lead 711 and via OR-gate 322 and lead 323, FIG. 39, to operate busy toggle 324.

CALLED LINE FREE

If the called line is free, there will be no output on lead 709 so that AND-gate 707, FIG. 47, will open and test pulse TP will be connected to lead 712 which operates write final called toggle 713, FIG. 46, and also via OR-gate 714, FIG. 47, to lead 715 common to the three blocks, to open AND-gate 716, FIG. 39, to which output lead 702 of the called line's group's toggle 700 is also applied, so that test pulse TP is written into busy line store 253 of the called line's block, thus marking the called line busy.

SETTING-UP FINAL CONNECTION

The output lead 717 of toggle 713, FIG. 46, opens AND-gate 718, FIG. 38, to which are also applied lead 320 on which appears final Sel Q from channel selected store 317, and lead 336 on which appears the PP pulse train of the final selected cord. Final Sel Q at PP time of the final selected cord therefore appears on output lead 719 and is written via OR-gate 339 and lead 340 into the identified combination of hundreds, tens and units stores of the final selected cord and also via AND-gate 720, FIG. 38, opened by lead 702 from toggle 700 of called line's group, to OR-gate 374 and lead 375 common to the five cords, and gated by the PP pulse of the cord through AND-gate 376 into the thousands store 141 of the final selected cord. Final Sel P at PP time of final selected cord on output lead 719 is also connected via OR-gate 721, FIG. 38, and lead 722, common to the five cords, and gated through AND-gate 723 by the PP pulse of the cord on to lead 724 and via OR-gate 725, FIG. 37, is written into the supervisory store 726 of the final selected cord.

When final Sel Q has been written into the called line's hundreds, tens and units stores of the final selected cord, it will appear on lead 418, FIG. 47, during the cord's PP pulse period and be applied as an input to AND-gate 727, FIG. 46, to which are also applied lead 336 on which appears the PP pulse of the final selected cord, lead 320 on which appears final Sel Q from the channel selected store 317 and lead 717 the output of write final called toggle 713. Final Sel Q will therefore appear on the output lead of AND-gate 727 and via OR-gate 428 be connected to lead 429 to reset all operated identify toggles. It will also reset select final toggle 671 and write final called toggle 713, which, because of the removal of operate output 717 of this toggle, shuts AND-gates 718, FIG. 38, and 727, FIG. 46. It also operates write final calling toggle 728, FIG. 46.

IDENTIFICATION OF CALLING LINE

It is now necessary to perform another identification operation using initial Sel P which is still circulating in store 674, FIG. 39, so as to mark the store combination appropriate to the calling line and then write final Sel P into that combination of stores in the final selected cord.

The operate output lead 729 of the write final calling toggle 728, FIG. 46, controls AND-gate 730, FIG. 47, the other inputs of which are output lead 675 of Store 674 and lead 670 on which appears the PP pulse train of the final selected cord, gated through AND-gate 669 in the cord. Thus initial Sel P which is still stored in the calling line's combination of stores in the initial selected cord, appears on output lead 731 of AND-gate 730 and is connected via OR-gate 257 to lead 258 during the PP period of the initial selected cord. Lead 258 is connected in common to the identify operate input gates 259–273, FIGS. 40, 41 and 42 in the common equipment, to which is also connected the initial selected cord's stores, so that during the PP period of the cord, identify toggles corresponding to the calling line's combination will be operated.

The operate output lead 729 of the write final calling toggle 728 is also connected to AND-gate 732, FIG. 38, to which is connected final Sel P on output lead 319 of the channel selected store 316, and lead 336 on which is the PP pulse train of the final selected cord. Final Sel P at PP time of the final selected cord therefore appears on output lead 733 of AND-gate 732 and this passes via OR-gate 339 to lead 340 connected in common to the write identified AND-gates 341–355 associated with the identify toggles, FIGS. 40, 41 and 42. Those gates having inputs from operated identify toggles will open and final Sel P at PP time of final selected cord will appear on each of the gates' output lead and will be gated at the PP time of the final selected cord into the cord's combination of hundreds, tens and units stores.

Lead 733 output of gate 732 is also connected via OR-gate 371, FIG. 38, to lead 372 common to the three blocks, and in each block to AND-gate such as 373 for the 2 block which is opened by lead 298 common to the calling line detected toggles 249 of both groups of the block. Final Sel P at PP time of the final selected cord is therefore connected via OR-gate 374 on to lead 375 common to the five cords, and gated into the final selected cord by its PP pulse in AND-gate 376 to lead 377 and via OR-gate 140 is written into the thousands store 141, FIG. 37.

Final Sel P is now stored in the thousands, hundreds, tens and units stores of the final selected cord, appropriate to the calling line.

FINAL RELEASE

The operate output lead 729 of write final calling toggle 728, FIG. 46, is also connected to AND-gate 734 to which leads 418, 319 and 336 are connected. Since the identify toggles corresponding to the calling line are still operated, final Sel P at the PP period of the final selected cord will appear on lead 418 and be gated through AND-gate 734 to its output lead 735 which:

(a) Resets right final calling toggle 728.

(b) Via 1 microsecond delay 736 inhibits AND-gate 737, FIG. 38, to clear final Sel Q from the channel selected store 316 and 317, FIG. 38.

(c) Via OR-gate 738 and 1 microsecond delay 739, FIG. 46, and OR-gate 428 is connected to lead 429 to reset all of the operated identify toggles.

(d) Operates the final selection complete toggle 740, FIG. 47, the output lead 741 of which via OR-gate 742 is connected to general reset lead 743 applied to AND-gates 744 and 745.

AND-gate 744 also has connected to it the output lead 675 of store 674 in which initial Sel P is still stored, and lead 670 on which appears the PP pulse train of the initial selected cord, from AND-gate 669. Thus on the output lead of AND-gate 744 appears initial Sel P at the PP time of the initial selected cord.

Similarly on the output of AND-gate 745 appears initial Sel Q at the PP time of the initial selected cord.

Thus two outputs are connected via OR-gate 746 to lead 747 which via OR-gate 748 is connected to lead 749 and via OR-gate 421 to lead 422. Lead 747 is directly connected in common to the five cords and gated into each cord by the cord's PP pulse in AND-gate 750, FIG. 37, so that both initial Sel P and initial Sel Q will appear on lead 751 to clear the cord's thousands, hundreds, tens and units stores as well as the register store 383 and supervisory store 726.

Lead 749, FIG. 47, clears store 674, counter stores 448–451, FIG. 48, auxiliary stores 452 and 453 and transfer stores 454 and 455, FIG. 49.

Lead 422, FIG. 39, operates, via OR-gate 318, the channel selected toggle 306 and resets the start selecting toggle 304, the compare toggle 705, the called group toggle 700, FIG. 31, the calling line detected toggle 249 via AND-gate 423, the cord's toggles 325 and 667, FIG. 37, and clears the channel selected store 316 and 317, FIG. 38, via 1 microsecond delay 425, FIG. 39. Lead 422 is also connected via 1 microsecond delays 425 and 426, FIG. 39, and AND-gate 424 to lead 427 (the delay is to give the calling line detected toggle 249 time to reset and remove the inhibit condition from AND-gate 424). Lead 427 resets if operated, the final selection complete toggle 740, FIG. 47, the clear called complete toggle 752, the select initial toggle 291 and via OR-gate 428, FIG. 46, and lead 429 the identify toggles, FIGS. 40, 41 and 42.

ACTION IF BUSY CONDITION IS DETECTED

As already described under "No Free Channels Available for Initial Selection," the busy toggle 324, FIG. 39, may be operated either on an unsuccessful attempt to select a channel or if testing of called line proves it to be busy. In either case the select final toggle 671, FIG. 46, will also be operated, so that operate output lead 680 of busy toggle 324 together with the operate output lead 678 of select final toggle 671 will open AND-gate 753, FIG. 47, the output lead 754 of which is applied to AND-gates 755 and 756.

AND-gate 755 opens to pass initial Sel P on lead 675 at the PP time of initial selected cord on lead 670 via OR-gate 748 to lead 749 which clears initial Sel P from store 674, FIG. 39, from the counter stores 448–451, FIG. 48, from auxiliary stores 452 and 453 and from transfer stores 454 and 455, FIG. 49.

AND-gate 756, FIG. 47, opens to pass initial Sel Q on lead 677 at PP time of initial selected cord on lead 670 to output lead 757 which:

(a) Via OR-gate 378 and lead 379 common to the five cords, is gated via AND-gate 380 by the PP pulse of the initial selected cord to lead 381 and via OR-gate 382, FIG. 37, is written into the register store 383.

(b) Via lead 758, FIG. 38, is written into the thousands store of the 3 block.

(c) Via OR-gate 746 is connected to lead 747 and thus via OR-gate 421 to lead 422 and OR-gate 748 to lead 749.

With initial Sel Q stores in the register store 383 of the initial selected cord and in the thousands store of the 3 block, the initial selected cord's AND-gate 759, FIG. 36, can open with inputs from lead 760, the output of thousands store in the 3 block, output lead 389 of register store 383, lead 761 from common busy tone supply and the Q-phase pulse train lead 388. Thus busy tone will be connected to output lead 390 of AND-gate 759 connected via OR-gate 391 to the outward speech path 392 and thus to the calling line which is still connected to the initial selected cord.

Initial Sel Q on lead 747, FIG. 47, common to the five cords, is gated through AND-gate 750, FIG. 37, by the PP pulse of the initial selected cord to appear on output lead 751 which:

(a) Via OR-gate 762 inhibits AND-gate 763 to clear the supervisory store 726.

(b) Via OR-gate 579 and 578 inhibits AND-gate 764 to clear the initial store 383.

(c) Via OR-gate 579 is connected to lead 580 to inhibit and clear the thousands store 141.

(d) Via OR-gates 658, 765 and 766, FIG. 34, inhibits and clears the hundreds, tens and units stores.

It must be remembered that the lead 757 is writing into the register store 383 and thousand store 141 simultaneously as lead 751 is trying to clear them. Under this condition writing-in overrides clear in these stores and therefore Q-phase will still be stored in the register store 383 and thousands store 141 as long as busy tone is returned to the calling line.

The leads 422 and 427, FIG. 47, reset toggles as already described earlier, so that busy tone continues to be sent to the calling line and the common equipment is free for further use.

SUCCESSFUL CONNECTION AND SENDING OF TONES

As previously stated, if the called line is detected free, write final called toggle, 713, FIG. 46, is operated and final Sel Q is written into the supervisory store 726 of the final selected cord. Output lead 767 of this store is connected to AND-gate 768 in the cord together with the Q-phase pulse train lead 388 and the ring tone lead 769 from common equipment. Final Sel Q on lead 767 is also connected via 1 microsecond delay 770, converting to P-phase, to lead 771 connected to AND-gate 772 together with the P-phase pulse train lead 14 and the call tone lead 773 from the common equipment.

In the common equipment, FIG. 44, toggles 75 and 78 produce the appropriate interrupted pattern and this is applied via AND-gate 82 and 83 to which the tones are applied. On output lead 769 of AND-gate 83 appears ring tone modulated by Q-phase and this is connected to lead 390 and OR-gate 391 to the outward speech path 392, FIG. 36, to the calling line.

In a similar manner call tone modulated by P-phase appears on the output of AND-gate 82 and is connected to outward speech path 392 and so to the calling line.

SENDING N.U. TONE—CALLED NUMBER MARKED N.U.

The arrangement for sending N.U. tone to the calling line as a result of the thousand dialled digit being outside of the numbering scheme, has already been described.

Means are also provided for marking any one line, decade of lines or sub-group of lines, as N.U. by means of a wired-in strap. This is shown for a single line in FIG. 24, for a decade of lines in FIG. 25 and for a sub-group of lines in FIG. 27.

In each case the N.U. strap, if connected, earths the input to an AND-gate and this gate will open if the other input is also present. For example, suppose the N.U. strap 774, FIG. 24, is connected for line 2100. When this line's number is dialled as a called line, final Sel Q is written into the thousands, hundreds, tens and units stores of the final selected cord and therefore appears on the output of the units store on lead 201 applied to the line gate 202 to which earth from the N.U. strap 774 is also connected. AND-gate 202 will open and pass final Sel Q to AND-gate 775, FIG. 25, on the other input of which 233 final Sel Q will appear from the tens store. AND-gate 775 will open and pass final Sel Q to lead 776 connected as input to AND-gate 777, FIG. 28, to which Q-phase is also applied from the group/cord indication lead 156 through AND-gate 157. AND-gate 777 will open and pass final Sel Q to lead 778 connected as input to AND-gate 779 in the cord, FIG. 36, the other inputs being the Q-phase pulse train lead 388 and the N.U. tone lead 637 from the common equipment.

N.U. tone modulated by Q-phase is therefore passed via output lead 390 of AND-gate 779 and OR-gate 391 to the outward speech path 392 to the calling line.

Since, as previously described, sending of ring tones to the calling line was initiated by storing Q-phase in the cord's supervisory store 726 when the connection is set-up, it is necessary to inhibit the supervisory store 726 to prevent duplication of tone. This is done by the inward signal path 778, FIG. 28, applied via OR-gate 762 as inhibition on the supervisory store recirculation AND-gate 763.

Figure 27:
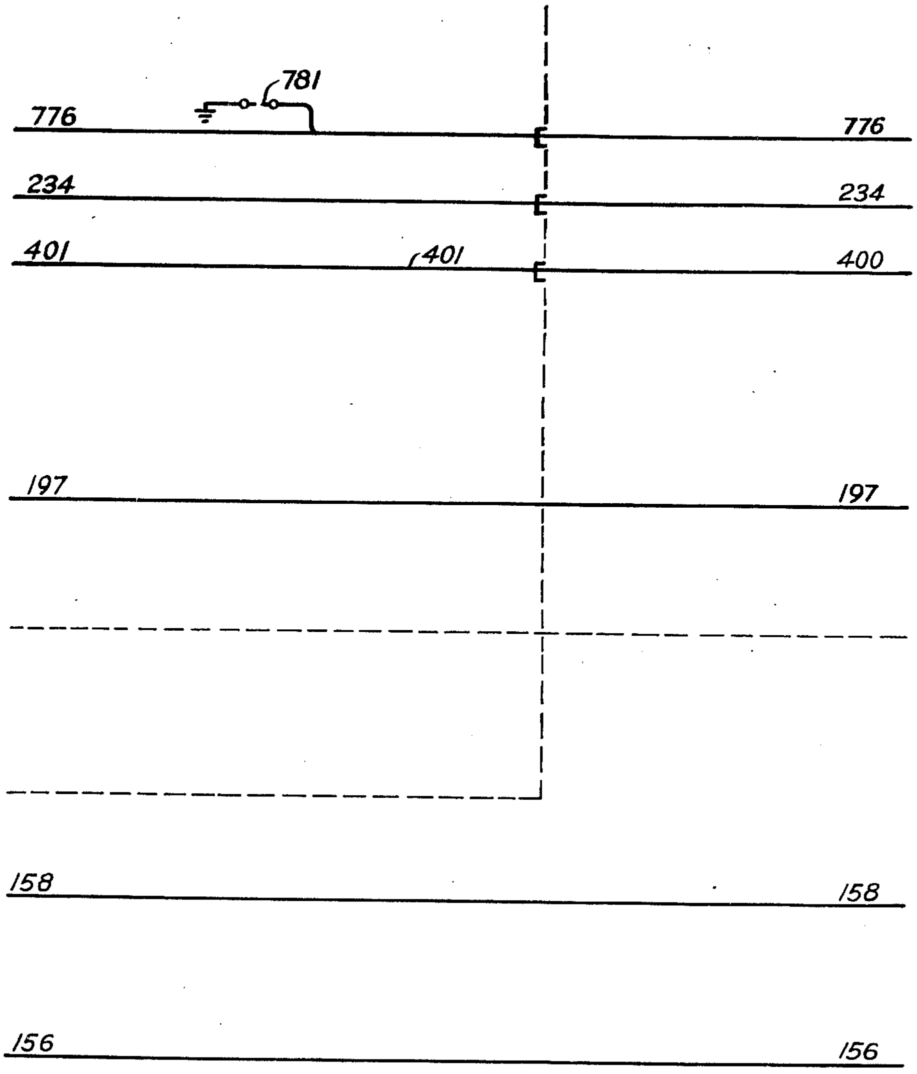

Similarly a decade of lines can be marked N.U. by connection of strap 780, FIG. 25, and a sub-group of lines by strap 781, FIG. 27.

ANSWER DETECTION, RING TRIP AND REMOVAL OF LINE SPLIT

Detection of called line answer and calling line clear conditions require persistence timing over comparatively long periods of the order of 150 milliseconds.

For these purposes, two timing waveforms TW1 and TW2 on leads 72 and 69 are provided from toggles 67 and 66, FIG. 54, and their associated delay circuits. Toggle 67 is operated for 1 millisecond and is then reset. 150 milliseconds thereafter toggle 66 is operated and remains operated for 1 millisecond after which it is reset and toggle 67 is reoperated.

Final Sel Q has already been stored in the final selected cord's thousands, hundreds, tens and units stores.

Output lead 241 of the pulse amplitude detector 240, FIG. 36, in the cord is connected as an input to AND-gate 782 and as inhibit to AND-gate 783 and each of these gates has as other inputs, lead 142 the output of thousands store 141 and the PP pulse train lead 45 of the cord. Final Sel Q is therefore being offered to each of these gates on lead 142. When the called line is not looped, there will be no output on lead 241 from the pulse amplitude detector 240 and final Sel Q will be gated by the PP pulse of the cord through AND-gate 783 to common lead 784. When the called line is looped final Sel Q will appear on output lead 241 of pulse amplitude detector 240 thus closing AND-gate 783 and being gated through AND-gate 782 to common lead 785 which is connected to AND-gate 786, FIG. 53, to which are also connected lead 72 and the Q-phase pulse train lead 5.

If the called line's loop condition persists into the TW1 period, final Sel Q at the PP time of the final selected cord will appear on output lead 787 of AND-gate 786, connected via OR-gate 788, FIG. 51, to lead 789 and via OR-gate 565, FIG. 49, will be written into auxiliary store 452 having a circulation time of 1100 microseconds, so that both final Sel Q and the PP pulse of the final selected cord are stored. Any break in the called line's loop condition will cause final Sel Q at PP time of the final selected cord to disappear from lead 785 and appear on lead 784, which is connected together with the Q-phase train lead 5, to AND-gate 790, FIG. 53. Output lead 791 is connected via OR-gate 792, FIG. 51, to lead 793 which via OR-gate 607, FIG. 49, clears the auxiliary store 452 if the break condition lasts for more than 1100 microseconds.

If however the answer condition persists unbroken for 150 milliseconds, final Sel P at PP time of the final selected cord will appear on the output lead 601 of auxiliary store 452 during the next TW2 period of lead 69, both of these outputs being connected to AND-gate 794, FIG. 53, and gated to output lead 795 common to the five cords. Final Sel P will be gated into the final selected cord through AND-gate 796, FIG. 37, to lead 797 and via 1 microsecond delay 798, converting to Q-phase, and OR-gate 762, will delete final Sel Q from the cord's supervisory store 726. Final Sel P on lead 797 via OR-gate 725 is written into supervisory store 726 instead.

Deletion of final Sel Q from supervisory store 726 removes call tone from the called line's line unit and ring tone from the calling line's line unit.

Storage of final Sel P in supervisory store 726 completes the connection between the inward and outward speech paths in the cord by final Sel P on output lead 767 opening AND-gate 799, FIG. 36, and removing the line split condition and establishing speech connection between the calling and called lines. In speech path common lead 239 is connected as input to each of AND-gates 799 and 830. Speech from the calling line at P-phase on lead 239 is gated through AND-gate 799 by the P-phase pulse train lead 14 and the output lead 767 of supervisory store 726, to output lead 831 and via 2 microsecond delay 832 and OR-gate 391 to appear on out speech path common lead 392 at P+2 phase and thence to the called line.

Speech from the called line at Q-phase on lead 239 is gated through AND-gate 830 by the Q-phase pulse train lead 388 and output of supervisory store 726 on lead 767 delayed by 1 microsecond delay 770 to output lead 833 and OR-gate 391 to appear on out speech path common lead 392 still at Q-phase and thence to calling line.

CLEARING

During an established connection between the calling and called lines, pulses are maintained in stores as follows:

(a) Final Sel P in the calling line's combination of thousands, hundreds, tens and units stores in the final selected cord.

(b) Final Sel Q in the called line's combination of thousands, hundreds, tens and units stores in the final selected cord.

(c) Final Sel P in the supervisory store 726 of final selected cord.

(d) Test pulse TP in the busy line store 253 in the block of each line, at the scan cycle time of the line, to mark it busy.

Clearing is under control of the calling line and is detected and its persistence checked, in a manner similar to that used to detect called line answer condition, the same timing waveforms TW1 and TW2 being used.

When a line ceases to be looped, the P-phase of the channel in use by it will not appear on the output lead 241 of the cord's pulse amplitude detector 240, FIG. 36, and will therefore appear on the barred input lead to AND-gate 783 and be gated by the cord's PP pulse on to the common lead 784 connected to AND-gate 800, FIG. 53, to which is also connected the P-phase pulse train on lead 3 and the TW1 pulse train on lead 72, so that at TW1 time the P-phase at PP time of the cord will appear on output lead 801 connected via OR-gate 543 to lead 509 via OR-gates 508 and 510, FIG. 50, and 511, FIG. 49, to be written into the auxiliary store 453. If at any time during the following 150 milliseconds the line should be looped again for more than 1100 microseconds (the delay time of auxiliary store 453) the P-phase will disappear from lead 784 and appear on lead 785 instead, which will open AND-gate 802 and via output lead 803 connected via OR-gate 589 to lead 549, will, via OR-gates 548, 550 and 551, clear auxiliary store 453. However, if the line loop remains broken, the P-phase pulse remains in auxiliary store 453 and if it is there at the next TW2 period, i.e. 150 milliseconds after TW1, the output lead 459 will open AND-gate 804, FIG. 53, and P-phase on output lead 805 connected via OR-gates 599 and 540, FIG. 52, to lead 481 and via OR-gates 533, 527 and 480, FIG. 51, and 482 and 483, FIG. 50, is written into counter stores 448 and 449, the output lead 496 of counter store 448 being applied to inhibit AND-gate 804, FIG. 53. The appearance on output lead 496 of a P-phase channel pulse during any of the PP pulse period of the cords, indicates that the line using the channel has cleared. The clearing operation will require identification of the groups and cord involved in the connection, as well as the calling and called lines and this is performed partly by the same common equipment as is used in setting-up the connection.

This common equipment must therefore be free as indicated by toggles free condition on lead 245, FIG. 47, which allows the P-phase at PP time of the cord on output lead 496 of counter store 448, to open AND-gate 806, FIG. 46, and appear on output lead 807. P-phase on lead 807 operates toggle 808, FIG. 47, so that the loss of reset output on lead 809 closes AND-gate 293 and so removes the toggles free condition on lead 245, FIG. 47, and via OR-gate 673, FIG. 39, is written into store 674. Lead 807 is common to the five cords so that P-phase is gated by the cord's PP pulse into the cord carrying the connection via AND-gate 810, FIG. 38, and via OR-gate 666, FIG. 37, operates toggle 667.

The calling and called groups can now be identified and marked. Toggle 667 of the cord concerned, gates the P-phase output from store 674 through AND-gate 682 to lead 683 and via 1 microsecond delay 684 so that Q-phase appears on lead 685. Each of these leads is common to the three blocks and then to the two groups in each block, so that each of the leads 683 and 685 is common to six AND-gates, such as 686 for lead 683, FIG. 29, and each gate is also fed with the group/cord indication lead 156 appropriate to the cord and the group. P-phase pulse on lead 683 will find coincidence in the AND-gate of the calling group and via output lead such as 688 and OR-gate 248, FIG. 31, will operate the calling line detected toggle 249 of that group. Likewise Q-phase on lead 685 will find coincidence in the AND-gate of the called group and will operate toggle 700 of that group.

Calling and called groups are thus identified for the connection which is to be cleared down.

It is also necessary to identify the calling and called lines so that test pulse TP may be removed from their positions in the busy line store 253 of their blocks. Operation of the clear calling toggle 808, FIG. 47, opens AND-gate 811, the other inputs being output lead 675 of store 674 and the cord's PP pulse on output lead 670 of toggle 677 in the cord. P-phase at PP time of the cord appears on output lead 812 and via OR-gate 257 on lead 258 connected in common to the input AND-gates 259–273 of the hundreds, tens and units identify toggles 274–288, FIGS. 40, 41 and 42. The calling line's combination of identify toggles is then operated during the PP period of the cord concerned. This, as before, causes test pulse TP to appear on lead 418, FIG. 46, during the calling line's scan period and thus at the time at which the line's busy pulse emerges from the appropriate busy line store 253. Lead 418 is connected to AND-gate 813, FIG. 47, to which are also connected test pulse TP on lead 14 and output lead 814 of the clear calling toggle 808. Test pulse TP produced at the calling line's scan time on output lead 815 is connected via OR-gate 433 to output lead 434 common to the three blocks, and is gated by output lead 296 of calling detected toggle 249 through AND-gate 435 and OR-gate 436 to inhibit the busy line store 253 and erase the busy indication of the calling line. Test pulse TP on output lead 815 of AND-gate 813, FIG. 47, resets the clear calling toggle 808 and via OR-gate 738, FIG. 46, 1 microsecond delay 739 and OR-gate 428 is connected to lead 429 to reset the identify toggles.

If a group has been marked as called, there will be an output from the called group's toggle 700, FIG. 31, on lead 816 and this, together with the output of AND-gate 813 will open AND-gate 817, FIG. 47, the output lead 818 of which will operate the clear called toggle 819. This causes identification of the called line by opening AND-gate 821 to output lead 820, lead 670 on which appears the PP pulse of the cord, and lead 677 on which appears the Q-phase output of store 674, so that Q-phase passes via output lead 822 and OR-gate 257, to lead 258.

In a manner similar to that described for the calling line identification, the called line's combination of toggles will be operated and test pulse TP will appear on lead 418 at the called line's scan time to be gated through AND-gate 823, FIG. 47, to output lead 824 and via OR-gate 825 to lead 826, which via AND-gate 827 and OR-gate 436 inhibits the busy line store 253 to remove the called line's busy condition.

Test pulse TP from AND-gate 823, FIG. 47, resets the clear called toggle 819 and operates via OR-gate 828 the clear called complete toggle 752, the operate output lead of which via OR-gate 742 is connected to lead 743 to open AND-gates 744 and 745 to connect the P and Q-phases via OR-gate 746 to lead 747 at the PP time of the cord. Lead 747 is common to the five cords and is gated into a cord by the cord's PP pulse through AND-gate 750 to output lead 751, FIG. 37, which clears the hundreds, tens and units stores via OR-gate 762 clears the cord's supervisory store 726, thus breaking the connection between the inward and outward speech paths and via OR-gate 579 clears the thousands store 141. Leads 747 is also connected via OR-gate 748 to lead 749 to clear store 674 by inhibiting AND-gate 829, FIG. 39, and also via OR-gate 750 clears the counter stores 448–451 and auxilitary stores 452 and 453. It is also connected via OR-gate 421, FIG. 47, to lead 422 which resets the calling and called groups' toggles 249 and 700, FIG. 31, together with toggle 667.

Lead 422 is connected via two 1 microsecond delays 425 and 426 and in the absence of called group indication, is connected via AND-gate 424 to lead 427 which resets the clear called complete toggle 752, FIG. 47, thus restoring toggles free condition on lead 245, and via OR-gate 428, FIG. 46, is connected to lead 429 to reset the operated identify toggles.

This permits another setting-up of clearing operation to be initiated.

CALLER CLEARS ON RECEIPT OF BUSY TONE OR FOR ANY OTHER REASON BEFORE THE FINAL SELECTION AND CONNECTION OF CORD TO CALLED GROUP HAS BEEN MADE

Calling line clear condition will be detected as in the previous case and the clear calling toggle 808, FIG. 47, will be operated, resulting in the production of test pulse TP on output lead 815 of AND-gate 813. No connection will have been set up between the cord in use and any called line however, so that the Q-phase of the channel will not be stored in the cord, and the called group toggle 700, FIG. 31, cannot be operated. Lead 816 is therefore not energised and this condition causes the clear called complete toggle 752 to be operated instead of the clear called toggle 819. The process of identifying the called line and clearing its busy condition from the busy line store 253 is thus omitted, the clearance operation otherwise being exactly as already described.

I claim:

1. A telecommunication switching system comprising in combination a plurality of blocks of lines, for each block, a time division multiplex bothway communication path, gates interconnecting said path with the lines of said block, a plurality of further time division multiplex bothway communication paths, further gates interconnecting each of said further paths with some at least of the communication paths of said blocks of lines, and, for each further path, storage means interconnected with all said gates for selectively establishing communication from one of said lines via the communication path of the block containing said one line and one of said further paths to another of said lines via the path of the block containing said other line.

2. A telecommunication switching system as claimed in claim 1 and further comprising, for each further time division multiplex bothway communication path, a line marking circuit for marking any line in any block of lines.

3. A telecommunication switching system as claimed in claim 1 and further comprising, for each further time division multiplex communication path, a line marking circuit comprising a marking lead for each block of lines, a set of hundreds-digit marking leads, a set of tens-digit marking leads and a set of units-digit marking leads, the sets of marking leads being common to all the blocks of lines which have access to the further communication paths.

4. A telecommunication switching system as claimed in claim 1 and further comprising line scanning means for scanning simultaneously the lines of the blocks and for detecting in each block whether a line is in a calling condition.

5. A telecommunication switching system as claimed in claim 1 and further comprising common equipment providing register and supervisory facilities and interconnecting pulse gates connecting said common equipment with the storage means of each said further time division multiplex bothway communication path.

6. A telecommunication switching system as claimed in claim 1 and further comprising common equipment comprising calling line identifying circuits, a selecting circuit for selecting an initial pair of channels available for use by the calling line and an initial further time divison multiplex communication path on which said initial pair of channels is not in use, and a pulse storing circuit for storing, in a manner identifying the calling line, in the storage means of said initial further time division multiplex communication path a pulse at the time position of one of said initial pair of channels.

7. A telecommunication switching system as claimed in claim 1 and further comprising common equipment comprising calling line identifying circuits, a selecting circuit for selecting an initial pair of channels available for use by the calling line and an initial further time division multiplex communication path on which said initial pair of channels is not in use, a pulse storage circuit for storing, in a manner identifying the calling line, in the storage means of said initial further time division multiplex communication path a pulse at the time position of one of said initial pair of channels, and for storing, in a manner characteristic of a wanted line, a pulse at the time position of the other of said initial pair of channels.

8. A telecommunication switching system as claimed in claim 7 in which storage of information designating a wanted line initiates the further selection of a pair of channels available for use by both the calling and wanted lines and the further selection of a further communication path on which the further selected pair of channels is not in use.

9. A telecommunication switching system as set forth in claim 8 and further comprising a storage circuit, for storing in the storage system of the further selected communication path information designating the calling line at the time of one of the channels of the further selected pair of channels and information designating the wanted line at the time of the other channel of the further selected pair of channels, for deleting the information designating both the calling and wanted lines stored at the time of the initial selected pair of channels, and for releasing that pair of channels.

10. A telecommunication switching system comprising in combination, a plurality of blocks of lines, and, for each block, a time division multiplex communication circuit consisting of an inward path and an outward path, gates connecting said inward and outward paths with the lines of the block, a plurality of further time division multiplex bothway communication paths, further gates interconnecting each said further path with some at least of said inward paths and some at least of said outward paths, for each further time division multiplex communication path information storage means and control connections from the storage means of each further path to the gates interconnecting that path with said some of said inward and outward paths.

11. A telecommunication switching system as claimed in claim 10 and further comprising, for each inward and outward path, line termination paths each common to several of said lines, sub-group paths each common to a number of different line termination paths, group paths common to a plurality of the sub-group paths, and a block path common to all the group paths and in which the block path of the inward path is interconnected with the block path of the outward path by the further communication paths.

12. A telecommunication switching system comprising in combination a plurality of blocks of lines, an inward line pulse gate and an outward line pulse gate for each said line, and, in each block, inward line termination paths each common to a number of said inward line pulse gates, inward line termination pulse gates connecting said inward line termination paths with inward sub-group paths, inward sub-group pulse gates interconnecting said inward sub-group paths to an inward group path for the block, a plurality of time division multiplex bothway communication paths joined to the inward group paths of all the blocks, said plurality of time division multiplex bothway communication paths also being joined via outward group pulse gates to each of several outward sub-group paths, a plurality of outward sub-group pulse gates joining each of said outward sub-group paths to a number of outward line termination paths each of which is connected via outward line termination pulse gates to a plurality of said outward line pulse gates, and for each said time division multiplex bothway communication path, a storage system, operative connections from each said storage system to all said aforementioned gates for selectively establishing communication between said lines.

13. A telecommunication system comprising in combination, a plurality of blocks of lines, and, for each block of lines, a time division multiplex communication path consisting of an inward path and an outward path, inward and outward line termination pulse gates connecting said inward and said outward paths respectively with the lines of the block, further time division multiplex bothway communication paths, further pulse gates interconnecting each of said further paths between said inward and outward paths, information storage means for each said further path, control connections from each of said storage means to said line termination pulse gates and said further pulse gates for communication control purposes, and, for each further path a marking lead for each block of lines, a set of hundreds-digit marking leads, a set of tens-digit marking leads and a set of units-digit marking leads, the sets of marking leads being common to all the blocks, a set of sub-group marking gates for each block, connections for each block from said sub-group marking gates of a block to the marking lead of that block and between each said sub-group marking gate and a different one of said hundreds-digit marking leads, an output lead from each said sub-group marking gate, each said output lead being connected to a different one of a plurality of inward units-digit marking gates and to a different one of a plurality of outward units-digit marking gates, each of the inward and outward units-digit marking gates also having joined to it a different one of the set of units-digit marking leads, each of the tens-digit marking leads being joined to a different one of the line termination gates in both the inward and outward paths, time delay units being connected between each of the tens-digit marking leads and the outward path line termination gates and between the units-digit marking leads and the outward units-digit marking gates.

14. A telecommunication switching system comprising in combination a plurality of blocks of lines, for each block, a time division multiplex bothway communication path, gates interconnecting said path with the lines of said block, a plurality of further time division multiplex bothway communication paths, further gates interconnecting each of said further paths with some at least of the communication paths of said blocks of lines, and, for each further path, storage means interconnected with all said gates for selectively establishing communication from one of said lines via the communication path of the block containing said one line and one of said further paths to another of said lines via the path of the block containing said other line, one of said further time division multiplex bothway communication paths being allotted to each block of lines for scanning purposes, the storage means of the allotted further path including test pulse storing means and test pulse applying circuits for applying a line test pulse sequentially to each line in the block and for modifying the manner of storage of said test pulse train after each application thereof to a line of the block.

15. A telecommunication switching system as claimed in claim 14 and further comprising line calling order precedent establishing circuit for deciding which of several lines found to be in a calling condition is to be dealt with.

16. A telecommunication switching system comprising in combination a plurality of blocks of lines, for each block, a time division multiplex bothway communication path, gates interconnecting said path with the lines of said block, a plurality of further time division multiplex bothway communication paths, further gates interconnecting each of said further paths with some at least of the communication paths of said blocks of lines, and, for each further path, storage means interconnected with all said gates for selectively establishing communication from one of said lines via the communication path of the block containing said one line and one of said further paths to another of said lines via the path of the block containing said other line, and, a circuit for determining the termination of a call between lines and for deleting from the storage means of the further communication path over which said call is made of pulses representing information relating to said call.

References Cited by the Examiner

UNITED STATES PATENTS

| | | | |
|---|---|---|---|
| 2,921,137 | 1/60 | Morris et al. | 179—18 |
| 2,968,698 | 1/61 | Brightman et al. | 179—18 |
| 2,986,602 | 5/61 | Tubinis | 179—18 X |
| 3,015,699 | 1/62 | Faulkner | 179—18 |

ROBERT H. ROSE, *Primary Examiner.*

WILLIAM C. COOPER, *Examiner.*